United States Patent
Orita

(10) Patent No.: US 8,428,780 B2
(45) Date of Patent: *Apr. 23, 2013

(54) EXTERNAL FORCE TARGET GENERATING DEVICE OF LEGGED MOBILE ROBOT

(75) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 13/036,274

(22) Filed: Feb. 28, 2011

(65) Prior Publication Data

US 2011/0213495 A1    Sep. 1, 2011

(30) Foreign Application Priority Data

Mar. 1, 2010  (JP) ................................. 2010-044711
Mar. 1, 2010  (JP) ................................. 2010-044712

(51) Int. Cl.
*G05B 19/18* (2006.01)

(52) U.S. Cl.
USPC ........... 700/254; 700/245; 700/246; 700/247; 700/260; 700/261; 180/8.2

(58) Field of Classification Search ........................ None
See application file for complete search history.

(56) References Cited

U.S. PATENT DOCUMENTS

| | | | |
|---|---|---|---|
| 4,826,392 A * | 5/1989 | Hayati | 700/260 |
| 5,872,893 A * | 2/1999 | Takenaka et al. | 700/245 |
| 7,308,336 B2 * | 12/2007 | Takenaka et al. | 700/245 |
| 7,339,340 B2 * | 3/2008 | Summer et al. | 318/568.12 |
| 7,554,787 B2 * | 6/2009 | Pelrine et al. | 361/234 |
| 7,606,634 B2 * | 10/2009 | Takenaka et al. | 700/260 |
| 7,734,375 B2 * | 6/2010 | Buehler et al. | 700/245 |
| 7,845,440 B2 * | 12/2010 | Jacobsen | 180/9.46 |
| 8,066,088 B2 * | 11/2011 | Asbeck et al. | 180/8.2 |
| 8,214,081 B2 * | 7/2012 | Choi et al. | 700/250 |
| 2011/0213495 A1 * | 9/2011 | Orita | 700/254 |
| 2011/0213496 A1 * | 9/2011 | Orita | 700/254 |
| 2011/0213498 A1 * | 9/2011 | Orita | 700/261 |

FOREIGN PATENT DOCUMENTS

JP    4246638    4/2009

* cited by examiner

*Primary Examiner* — Khoi Tran
*Assistant Examiner* — Jonathan L Sample
(74) *Attorney, Agent, or Firm* — Rankin, Hill & Clark LLP

(57) ABSTRACT

An external force target generating device of a legged mobile robot uses virtual surfaces S3a, S2a, and S2b to approximate a plurality of surfaces to be contacted FL, WL1, and WL2 in an operating environment of a robot 1, and determines provisional values of translational forces (required virtual surface translational forces) to be applied from the virtual surfaces S3a, S2a, and S2b to the robot 1 in order to implement a compensation total translational external force related to a translational motion of the robot 1. Further, in order to implement a compensation total moment external force related to a rotational motion of the robot 1, the external force target generating device determines moment compensation amounts to be combined with the provisional values of the required virtual surface translational forces and then determines the desired external forces to be applied from the surfaces to be contacted to the robot 1 and the desired external force action points on the basis of the combinations of the provisional values of the required virtual surface translational forces and the moment compensation amounts.

15 Claims, 19 Drawing Sheets

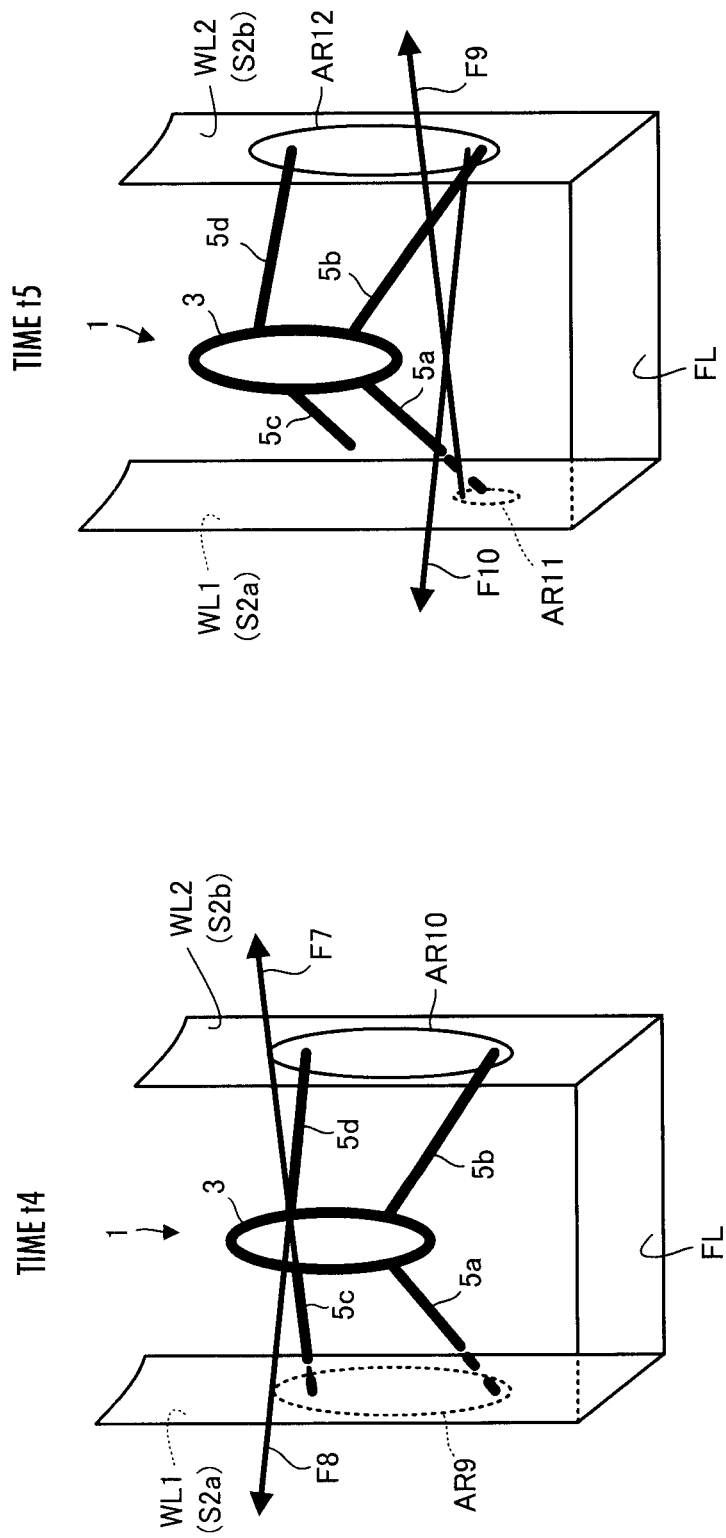

EXTERNAL FORCE TARGET GENERATING DEVICE OF LEGGED MOBILE ROBOT

BACKGROUND OF THE INVENTION

1. Field of the Invention

The present invention relates to a device which generates a target related to an external force to be applied to a legged mobile robot while causing the robot to implement a motion.

2. Description of the Related Art

As a technique for controlling a motion of a legged mobile robot (hereinafter referred to simply as a robot in some cases), there has conventionally been known a technique disclosed in, for example, Japanese Patent Publication No. 4246638 proposed by the applicant of the present application.

With this technique, a state amount related to a posture of the robot (for example, a posture of an upper body of the robot) is sequentially observed while the robot is in motion in order to prevent the posture of the robot from becoming unstable due to, for example, a difference between a floor configuration assumed in a desired motion of the robot and an actual floor configuration, or the like.

In addition, an added floor reaction force (a floor reaction force to be added to a basic floor reaction force in order to attain a desired motion) to be applied to the robot is determined as a feedback manipulated variable for approximating a difference between an observed value of the state amount and a desired value of the state amount as defined by the desired motion of the robot to zero.

Furthermore, by controlling an actual motion of the robot and a floor reaction force actually applied to the robot so as to respectively follow a desired motion of the robot and a desired floor reaction force to which the added floor reaction force has been added, a smooth motion of the robot is achieved.

To cause the robot to perform a variety of jobs, there are cases where it is required to cause the robot to perform a predetermined motion while maintaining a plurality of portions of the robot in contact with a plurality of surfaces to be contacted existing outside the robot (e.g., maintaining the distal end of a leg and the distal end of an arm of the robot in contact with a floor surface and a wall surface, respectively), rather than simply causing the robot to travel on a floor.

In this case, unlike the case where the robot simply travels on a floor, external forces act on a plurality of portions of the robot from the plurality of surfaces to be contacted in an outside world of the robot.

Therefore, in such a case, in order to cause the robot to properly implement a motion, it is necessary to appropriately set targets (such as a desired external force and a desired position of an action point of the external force) related to external forces to be respectively applied from the plurality of surfaces to be contacted, and control the motion of the robot so that external forces that are respectively applied to the robot from the plurality of surfaces to be contacted follow desired external forces while having the actual motion of the robot follow a desired motion. In this case, targets related to external forces are desirably set while adjusting an actual value (observed value) of a predetermined motional state amount of the robot so as to suppress the actual value from deviating from a desired value of the predetermined motional state amount.

However, when external forces are respectively applied to the robot from the plurality of surfaces to be contacted as described above, unlike a case where a floor reaction force is the only external force applied to the robot, how to adjust the external forces respectively applied to the robot from the plurality of surfaces to be contacted becomes a problem if the actual value (observed value) of a predetermined motional state amount of the robot deviates from the desired value of the predetermined motional state amount.

Hence, when generating a desired gait of the robot in the situation where external forces act on the robot from a plurality of surfaces to be contacted, it is essential to adopt a guideline that makes it possible to determine proper targets for the external forces to be applied to the robot from the plurality of surfaces to be contacted.

Hitherto, however, sufficient technological studies have not been carried out with respect to a guideline for setting targets related to the external forces to be applied to the robot from the plurality of surfaces to be contacted while causing the robot to implement a motion in a situation where external forces act on the robot from a plurality of surfaces to be contacted as described above. Accordingly, there has been a demand for establishing a technique that makes it possible to properly generate targets (such as a desired external force and a desired position of an action point of the external force) related to the external forces to be applied to the robot from the plurality of surfaces to be contacted in such a situation.

SUMMARY OF THE INVENTION

The present invention has been made with the view of the background described above, and it is an object of the present invention to provide an external force target generating device capable of properly determining targets, such as a desired external force and a desired position of an action point thereof, related to an external force to be applied to a robot while causing the robot implement a motion in a situation where an external force acts on the robot from a plurality of surfaces to be contacted.

To this end, an external force target generating device of a legged mobile robot in accordance with the present invention is an external force target generating device of a legged mobile robot, which sequentially generates a target related to an external force to be applied to the robot in a state where a motion of the robot is being controlled so that an actual motion of the robot follows a desired motion of the robot, to cause the robot to implement a motion while having a plurality of portions of the robot in contact with a plurality of different surfaces to be contacted, which exists in an operating environment of the robot, the external force target generating device including:

a virtual surface group setting unit which uses a virtual surface group that is constituted of a plurality of virtual surfaces having a predetermined posture relationship to each other to virtually set the virtual surface group in the space of an operating environment of the robot such that the plurality of virtual surfaces of the virtual surface group turn into surfaces that match or approximate the plurality of surfaces to be contacted;

a basic required total external force determining unit which determines, on the basis of the desired motion, a basic required total translational external force, which is a translational force component of a total external force to be applied to the robot to implement the desired motion and a basic required total moment external force, which is a moment component of the total external force about a predetermined reference point fixed relative to the virtual surface group;

a translational external force compensation amount determining unit which sequentially calculates a first motional state amount error that is a difference between an observed value of a predetermined first motional state amount of the robot and a desired value of the first motional state amount in the desired motion, and based on the first motional state amount error, determines a translational external force compensation amount that is a translational force to be additionally applied to the robot in order to approximate the first motional state amount error to zero;

a moment external force compensation amount determining unit which sequentially calculates a second motional state amount error that is a difference between an observed value of a predetermined second motional state amount of the robot and a desired value of the second motional state amount in the desired motion, and based on the second motional state amount error, determines a moment external force compensation amount that is a moment generated about the reference point to be additionally applied to the robot in order to approximate the second motional state amount error to zero;

a provisional required virtual surface translational force determining unit, which is a unit that determines a provisional value of a required virtual surface translational force, which is the translational force to be applied to the robot from each of the plurality of virtual surfaces of the virtual surface group to attain a compensation total translational external force obtained by adding the determined translational external force compensation amount to the determined basic required total translational external force, and determines the provisional value of the required virtual surface translational force in each virtual surface such that at least a first requirement that the resultant force of the required virtual surface translational forces in the plurality of virtual surfaces coincide with the determined compensation total translational external force, and, regarding a virtual surface normal force component of a required virtual surface translational force in each virtual surface, which is a component perpendicular to the virtual surface, and a virtual surface frictional force component, which is a component parallel to the virtual surface, a second requirement that the magnitude of the virtual surface frictional force component be not more than a first predetermined value set on the basis of at least the virtual surface normal force component, are satisfied;

a provisional required virtual surface translational force dependent moment calculating unit which calculates a provisional value of a required virtual surface translational force dependent moment, which is a total moment generated about the predetermined reference point by a required virtual surface translational force on each of the plurality of virtual surfaces, assuming that the provisional value of the determined required virtual surface translational force in each virtual surface acts on a provisional on-virtual-surface external force action point, which is a point obtained by projecting a provisional external force action point that is an external force action point provisionally set on the surface to be contacted corresponding to the virtual surface, onto the virtual surface;

a moment compensation amount determining unit that calculates a moment error, which is a difference between a compensation total moment external force obtained by adding the determined moment external force compensation amount to the determined basic required total moment external force and the calculated provisional value of the required virtual surface translational force dependent moment, and determines, by using the moment error, a moment compensation amount which is formed of a correction amount of one or more of the provisional on-virtual-surface external force action points and includes at least one of a first compensation amount which satisfies an external force action point existence region condition that each provisional on-virtual-surface external force action point after having been corrected using the correction amount exists in an on-virtual-surface external force action point permissible region obtained by projecting an external force action point existence permissible region set on the surface to be contacted corresponding to a virtual surface, on which the provisional on-virtual-surface external force action point exists, onto the virtual surface, a second compensation amount which is composed of the correction amounts of virtual surface frictional force components in two or more virtual surfaces and the total sum of the correction amounts is zero, and a third compensation amount composed of a twisting force additionally applied to the robot from the virtual surface about an axis in a direction perpendicular to one or more virtual surfaces, as a compensation amount for canceling the moment error; and a desired surface-to-be-contacted external force and action point determining unit which determines a desired external force to be applied to the robot from a surface to be contacted corresponding to each virtual surface and a desired external force action point, which indicates the desired position of the action point of the desired external force, on the basis of at least the provisional value of the required virtual surface translational force determined in association with each virtual surface and the determined moment compensation amount, then outputs the determined desired external force and the determined desired external force action point as constituent elements of the target related to the external force (a first aspect of the invention).

In the present invention (including the second to the fifteenth aspects of the invention, which will be discussed later), the plurality of surfaces to be contacted, which exist in the operating environment of the robot and which are different from each other, means a plurality of surfaces to be contacted in which any two surfaces to be contacted included in the plurality of surfaces to be contacted (or planes individually including the two surfaces to be contacted) intersect with each other or oppose each other in parallel or substantially in parallel with an interval provided therebetween. In this case, each surface to be contacted does not have to be a surface having an area that is larger than a portion of the robot to be in contact therewith (e.g., an ordinary floor surface), and it may be, for example, a local surface having an area that is approximately as large as or smaller than the portion.

Further, in the desired motion, the number of portions of the robot brought into contact with each surface to be contacted does not have to be one and may be two or more. In this case, if two or more portions of the robot are brought into contact with a certain one surface to be contacted, then the desired translational force to be applied to the robot from the surface to be contacted means a desired value of the resultant force of the translational forces to be applied to the two or more portions of the robot from the surface to be contacted.

Further, the external force action point in each surface to be contacted means a point at which a component of a moment, which is generated about the action point, about an axis parallel to the surface to be contacted becomes zero by the total external force acting on the robot from the surface to be contacted. The same applies to the external force action point in each virtual surface.

According to the first aspect of the invention, the virtual surface group formed of a plurality of virtual surfaces, the mutual posture relationship of which has been established beforehand, is used as substitutional surfaces of the aforesaid plurality of surfaces to be contacted in order to determine the desired external force and the desired external force action point as the targets related to an external force to be applied to the robot from each of the plurality of surfaces to be contacted. Then, the virtual surface group is virtually set in the space of the operating environment of the robot by the virtual surface group determining unit such that the plurality of virtual surfaces of the virtual surface group become surfaces which match or approximate the plurality of surfaces to be contacted.

In the processing carried out by the virtual surface group setting unit, virtually setting the virtual surface group in the space of the operating environment of the robot means determining the arrangement of the individual virtual surfaces, which constitute the virtual surface group in the space, more specifically, determining the position and the posture (spatial orientation) of each virtual surface in the space.

Further, the basic required total external force determining unit determines the basic required total translational external force, which is the translational force component of a total external force to be applied to the robot in order to implement the desired motion, and the basic required total moment external force of the total external force, which is a moment component about a predetermined reference point fixed relative to the virtual surface group.

Here, the basic required total translational external force is, in other words, a translational force which balances the resultant force of the translational inertial force (the translational force component of an inertial force) of the entire robot generated by the aforesaid desired motion and the gravitational force acting on the entire robot. Further, the basic required total moment external force is, in other words, a moment which balances the inertial force moment (the moment component of an inertial force) of the entire robot generated about the aforesaid reference point by the desired motion.

In this case, the desired motion of the robot defines the motion of each portion, i.e., each link, of the robot and the movement of the overall center-of-gravity point of the robot, so that the translational inertial force and the inertial force moment of the entire robot can be determined on the basis of the desired motion by using an appropriate geometric model (a rigid link model) of the robot. Further, the gravitational force acting on the entire robot is the product of the total mass and the gravitational acceleration of the robot. Thus, the basic required total translational external force and the basic required total moment external force can be determined on the basis of the desired motion.

In the present invention, including the second to the fifteenth aspects of the invention to be discussed later, the aforesaid desired motion may be generated according to, for example, the type of motion required of the robot (e.g., the way the distal portion of a leg link of the robot is moved or the way a contact target surface is contacted).

In addition, in the first aspect of the invention, the translational external force compensation amount that is a translational force to be additionally applied to the robot in order to approximate the first motional state amount error (the difference between an observed value and a desired value of the predetermined first motional state amount) to zero is determined based on the first motional state amount error by the translational external force compensation amount determining unit.

Furthermore, the moment external force compensation amount that is a moment about the reference point to be additionally applied to the robot in order to approximate the second motional state amount error (the difference between an observed value and a desired value of the predetermined second motional state amount) to zero is determined based on the second motional state amount error by the moment external force compensation amount determining unit.

Here, the first motional state amount is a motional state amount of a type that can be manipulated by a translational force to be applied to the robot, and the second motional state amount is a motional state amount of a type that can be manipulated by a moment to be applied to the robot.

For example, state amounts that are conceivably desirably controlled to take predetermined desired values in order to ensure stability of a motion of the robot can be adopted as the motional state amounts. For example, a position of an overall center-of-gravity point of the robot or the like can be adopted as the first motional state amount. In addition, an angular momentum, a posture of a specific portion (such as the body), or the like of the robot can be adopted as the second motional state amount.

Basically, the first motional state amount and the second motional state amount may be selected as necessary in consideration of a motion mode of the robot to be realized by a desired motion, a posture of the entire robot in the motion mode, stability of a posture of a specific portion in the motion mode, or the like. Moreover, the first motional state amount and the second motional state amount need not be state amounts of different types and may be state amounts of the same type.

Furthermore, for example, the translational external force compensation amount can be determined by a suitable feedback control law from the first motional state amount error. In a similar manner, for example, the moment external force compensation amount can be determined by a suitable feedback control law from the second motional state amount error.

Further, in the first aspect of the invention, the required virtual surface translational force (provisional value), which is a translational force to be applied to the robot from each of the plurality of virtual surfaces of the virtual surface group to attain a compensation total translational external force obtained by adding the determined translational external force compensation amount to the determined basic required total translational external force, is determined by the provisional required virtual surface translational force determining unit. Incidentally, each virtual surface corresponds to each surface to be contacted, so that the required virtual surface translational force in each virtual surface corresponds to the translational force to be applied to the robot from a surface to be contacted corresponding to the virtual surface.

In this case, the provisional required virtual surface translational force determining unit determines the provisional value of a required virtual surface translational force in each virtual surface such that at least a first requirement that the resultant force of the required virtual surface translational force in each of the plurality of virtual surfaces coincide with the determined compensation total translational external force and a second requirement that the magnitude of a virtual surface frictional force component, which is a component parallel to the virtual surface among the required virtual surface translational force of each virtual surface, be not more than a first predetermined value set on the basis of at least the virtual surface normal force component of the required virtual surface translational force on each virtual surface, which is a component perpendicular to the virtual surface among the required virtual surface translational force of each virtual surface.

Here, the first predetermined value in the second requirement corresponds to an upper limit value of the magnitude of a frictional force that can be generated on a virtual surface.

Hence, the provisional values of the required virtual surface translational forces in the respective virtual surfaces are determined such that the resultant force thereof coincides with the aforesaid compensation total translational external force and the magnitude of the virtual surface frictional force component in each virtual surface is not more than the first predetermined value, which corresponds to an upper limit value of a frictional force that can be generated in the virtual surface.

Accordingly, a required virtual surface translational force (provisional value) capable of realizing the compensation total translational external force is to be determined.

The first predetermined value related to the second requirement is preferably set to a value that coincides with or is slightly smaller than the upper limit value of the magnitude of the frictional force that can be generated in the surface to be contacted in the case where, for example, the normal force component in the surface to be contacted corresponding to each virtual surface is set to coincide with the normal force component in the virtual surface.

Subsequently, according to the first aspect of the invention, the processing by the provisional required virtual surface translational force dependent moment calculating unit is carried out. In this processing, the action points of the required virtual surface translational forces (provisional values) in the individual virtual surfaces are taken as the provisional external force action points on the virtual surfaces, and the provisional value of the required virtual surface translational force dependent moment, which is the total moment generated about the reference point by the required virtual surface translational forces (provisional values) is calculated.

Here, if the provisional value of the required virtual surface translational force dependent moment coincides with the compensation total moment external force obtained by adding the determined moment external force compensation amount to the determined basic required total moment external force, then the required virtual surface translational forces in the individual virtual surfaces and the provisional external force action points on the virtual surfaces serving as the action points thereof are appropriate for accomplishing the compensation total moment external force.

However, since the provisional external force action points on the virtual surfaces are provisional, the required virtual surface translational force dependent moment (provisional value) generally does not coincide with the compensation total moment external force, and an error (≠0) exists therebetween.

In the case where the required virtual surface translational force dependent moment (provisional value) does not coincide with the compensation total moment external force as described above, there are the following techniques for canceling the aforesaid error. According to a first technique, the position of the external force action point on a virtual surface (the action point of a required virtual surface translational force) is corrected on the basis of the provisional external force action point on the virtual surface. According to a second technique, the required virtual surface translational force on a virtual surface is corrected. According to a third technique, a twisting force (moment) is applied to a virtual surface, the twisting force being applied about an axis perpendicular to the virtual surface.

However, in the first technique, the external force action point on the virtual surface corresponds to the external force action point in the surface to be contacted corresponding to the virtual surface. In addition, the external force action point on the surface to be contacted is required to fall in a predetermined existence permissible region based on the surface of contact between the surface to be contacted and the robot. Therefore, it is necessary to limit the correction of the external force action point on the virtual surface to a correction within an area corresponding to the predetermined existence permissible region on the surface to be contacted.

In the second technique, if a required virtual surface translational force is arbitrarily corrected, then the required virtual surface translational force in each virtual surface after the correction may not satisfy the first requirement in some cases.

As a solution thereto, according to the first aspect of the invention, the moment compensation amount determining unit calculates a moment error, which is the difference between the compensation total moment external force and the calculated provisional value of the required virtual surface translational force dependent moment, and by using the moment error, the moment compensation amount determining unit determines, as a compensation amount for canceling the moment error, a moment compensation amount which includes at least one of a first compensation amount which is constituted of the correction amounts of the provisional external force action points on the aforesaid one or more virtual surfaces and satisfies an external force action point existence region condition that a provisional external force action point on each virtual surface after correction using the correction amounts exists in a permissible region of the external force action point on a virtual surface formed by projecting an external force action point existence permissible region set on the surface to be contacted corresponding to a virtual surface in which the action point of a provisional external force on the virtual surface onto the virtual surface, a second compensation amount which is composed of the correction amounts of virtual surface frictional force components in two or more virtual surfaces, the total sum of the correction amounts being zero, and a third compensation amount composed of a twisting force additionally applied to the robot from the virtual surface about an axis in a direction perpendicular to one or more virtual surfaces.

The first compensation amount, the second compensation amount, and the third compensation amount are the moment compensation amounts for canceling the moment error by the first technique, the second technique, and the third technique, respectively. In this case, the first compensation amount satisfies the external force action point existence permissible region condition, so that the external force action point on the virtual surface can be properly corrected.

Further, the second compensation amount is formed of the correction amounts of the virtual surface frictional force components in two or more virtual surfaces, and the total sum of the correction amounts becomes zero. Hence, even when the virtual surface frictional force component in the virtual surface to be corrected is corrected on the basis of the second compensation amount, the resultant force of the required virtual surface translational forces in the virtual surfaces remains the same before and after the correction. Hence, the state that satisfies the first requirement will be maintained.

The moment compensation amount determined by the moment compensation amount determining unit does not have to include all of the first compensation amount, the second compensation amount, and the third compensation amount. Instead, the moment compensation amount may include only one or two of the first compensation amount, the second compensation amount, and the third compensation amount, as long as the moment error can be canceled. In this case, which of the first to the third compensation amounts should be used as the moment compensation amount may be selected as necessary according to the type of a desired motion or the timing of a desired gait.

Further, according to the first aspect of the invention, the desired surface-to-be-contacted external force and action point determining unit determines a desired external force to be applied to the robot from a surface to be contacted corresponding to each virtual surface and a desired external force action point, which indicates the desired position of the action point of the desired external force, and outputs the determined desired external force and the determined desired external force action point as the desired constituent elements related to the external force on the basis of at least the provisional value of the required virtual surface translational force determined in association with each virtual surface and the determined moment compensation amount.

In this case, the desired external force to be applied to the robot from the surface to be contacted corresponding to a virtual surface may be determined, for example, as described below. The translational force component in a direction perpendicular to the surface to be contacted (the normal force component) in the desired external force may be determined such that, for example, the translational force component coincides with the provisional value of the virtual surface normal force component of a required virtual surface translational force in the virtual surface corresponding to the surface to be contacted.

In addition, the translational force component parallel to the surface to be contacted (the frictional force component) of the desired external force may be determined such that the translational force component coincides with the provisional value of a virtual surface frictional force component in the virtual surface corresponding to the surface to be contacted (in the case where no correction is made on the basis of the second compensation amount) or coincides with the value obtained by correcting the provisional value on the basis of the second compensation amount. Further, in a surface to be contacted corresponding to a virtual surface to which a twisting force based on the third compensation amount is applied, a twisting force of the virtual surface corresponding to the surface to be contacted (the third compensation amount) is taken as a desired value of a twisting force about the axis perpendicular to the surface to be contacted, and the desired value may be determined as a constituent element of a desired external force.

Further, the desired external force action point in the surface to be contacted corresponding to a virtual surface may be determined, for example, as follows. The desired external force action point in the surface to be contacted may be determined such that the desired external force action point coincides with a point obtained by projecting the provisional external force action point on a virtual surface in the virtual surface corresponding to the surface to be contacted onto the surface to be contacted (in the case where no correction is made on the basis of the first compensation amount) or coincides with a point acquired by projecting a point obtained by correcting the external force action point on the virtual surface on the basis of the first compensation amount onto the surface to be contacted.

According to the first aspect of the invention described above, first, a required virtual surface translational force necessary for implementing the compensation total translational external force is provisionally determined. In this case, the mutual posture relationship among the virtual surfaces is established beforehand, so that the algorithm of the processing for determining the required virtual surface translational force that satisfies the first requirement and the second requirement described above (the processing by the provisional required virtual surface translational force determining unit) can be easily formulated.

Then, a moment compensation amount is determined, the moment compensation amount being composed of at least one of the first compensation amount, the second compensation amount, and the third compensation amount as the manipulated variable (the manipulated variable for canceling the aforesaid moment error) for implementing the compensation total moment external force in combination with the provisional value of the required virtual surface translational force.

In this case, the first compensation amount, the second compensation amount, and the third compensation amount are compensation amounts that maintain the resultant force of all the required virtual surface translational forces in the virtual surfaces at a constant level before and after correcting a factor to be corrected by the compensation amounts (the position of the external force action point on a virtual surface, a virtual surface frictional force component, or the twisting force in a virtual surface).

Hence, simply combining a moment compensation amount to the provisional value of the required virtual surface translational force in each virtual surface previously determined will provide a set of a required virtual surface translational force and an external force action point on a virtual surface that implements both the compensation total translational external force and the compensation total moment external force or a set of a required virtual surface translational force, a twisting force in a virtual surface, and an external force action point on a virtual surface. Therefore, the desired external force and the desired external force action point in each surface to be contacted can be determined on the basis of the provisional value of the required virtual surface translational force and the moment compensation amount in each virtual surface.

Thus, according to the first aspect of the invention, targets related to external forces to be applied to the robot can be efficiently and properly determined while causing the robot to implement a motion in a situation where an external force is applied to the robot from a plurality of surfaces to be contacted.

In the first aspect of the invention described above, preferably, the provisional required virtual surface translational force determining unit determines the provisional value of the required virtual surface translational force in each virtual surface such that a first A requirement that the resultant force of the virtual surface normal force components of the plurality of virtual surfaces coincide with a component of the compensation total translational external force excluding a component parallel to all virtual surfaces of the virtual surface group and a first B requirement that the resultant force of the virtual surface frictional force components in the plurality of virtual surfaces coincide with a component of the compensation total translational external force, which component is parallel to all virtual surfaces of the virtual surface group are satisfied in order to satisfy the first requirement (a second aspect of the invention).

Here, the upper limit value of the magnitude of a frictional force component (the component parallel to a surface to be contacted) in a translational force that can be applied to the robot from the surface to be contacted corresponding to each virtual surface is influenced by the normal force component in the surface to be contacted (the component perpendicular to a surface to be contacted). As the magnitude of the normal force component decreases, the upper limit value of the magnitude of the frictional force component decreases accordingly. As the frictional force component increases, slippage between the surface to be contacted and the robot tends to frequently occur. In contrast to this, the normal force component in the surface to be contacted can be implemented in a wider range, as compared with the frictional force component.

Therefore, it is considered preferable to determine the required virtual surface translational force in the virtual surface corresponding to each surface to be contacted such that the required virtual surface translational force does not include the virtual surface frictional force component or the magnitude of the virtual surface frictional force component is minimized as much as possible. In other words, it is considered preferable to determine the provisional value of the required virtual surface translational force such that the compensation total translational external force can be achieved by the resultant force of the virtual surface normal force components of the virtual surfaces as much as possible.

Further, in the case where the virtual surface frictional force component in each virtual surface is required to obtain the compensation total translational external force, the magnitude of the virtual surface frictional force component is preferably set according to the magnitude of the virtual surface normal force component in the virtual surface or determined to be a predetermined value or less.

According to the second aspect of the invention, therefore, the provisional required virtual surface translational force determining unit determines the provisional value of the required virtual surface translational force in each virtual surface such that the first A requirement and the first B requirement are satisfied so as to satisfy the first requirement, as described above.

This arrangement enables the provisional required virtual surface translational force determining unit to determine the provisional value of the required virtual surface translational force in each virtual surface such that the compensation total translational external force is obtained by the resultant force of the virtual surface normal force components in the virtual surfaces and the virtual surface frictional force component is controlled to a minimum within a range that satisfies the second requirement as much as possible.

Thus, the desired external force applied to the robot from the surfaces to be contacted can be determined such that the compensation total translational external force can be accomplished by the resultant force of the normal force components of the desired external forces in the surfaces to be contacted and the frictional force components of the desired external forces are controlled to a minimum within the range of the magnitude of the frictional forces that can be generated in the surfaces to be contacted, as much as possible.

Further, restricting the first requirement to the set of the first A requirement and the first B requirement will further restrict the guideline for determining the provisional value of the required virtual surface translational force in each virtual surface (the guideline for distributing the compensation total translational external force to the required virtual surface translational force in each virtual surface). This makes it easier to formulate the algorithm of the processing for determining the provisional value of the required virtual surface translational force.

According to the second aspect of the invention, in the case where the component of the compensation total translational external force, which component is parallel to all the virtual surfaces of the virtual surface group, is not zero, the provisional required virtual surface translational force determining unit preferably determines the provisional value of the required virtual surface translational force in each virtual surface such that, in a virtual surface where the virtual surface normal force component is not zero among the plurality of virtual surfaces of the virtual surface group, the magnitude of the virtual surface frictional force component of the virtual surface increases as the first predetermined value set in association with the virtual surface increases, while satisfying the first A requirement, the first B requirement, and the second requirement (a third aspect of the invention).

According to the third aspect of the invention, the guideline for distributing the component of the compensation total translational external force, which component is parallel to all the virtual surfaces of the virtual surface group, to each of the virtual surfaces is further restricted, thus making it still easier to formulate the algorithm of the processing for determining the provisional value of the virtual surface translational force component in each virtual surface.

Further, the magnitude of the virtual surface frictional force component in each virtual surface can be set to match the magnitude of the first predetermined value corresponding to the upper limit value of the frictional force that can be generated in each virtual surface. As a result, the frictional force component of a desired translational force in each surface to be contacted can be determined such that the frictional force component falls in a balanced manner within a limited range of the magnitude of the frictional force that can be generated in the surface to be contacted (such that the frictional force component in any of the surfaces to be contacted does not come excessively close to the limit of the magnitude of the frictional force, as compared with the frictional force component in another surface to be contacted).

Further, in the first to the third aspects of the invention, in the case where the plurality of surfaces to be contacted include two surfaces to be contacted opposing each other with an interval provided therebetween and the virtual surface group includes opposing virtual surfaces, which is two virtual surfaces opposing each other in parallel as the virtual surfaces corresponding to the aforesaid two surfaces to be contacted, the virtual surface normal force components in the two opposing virtual surfaces provide translational forces in opposite directions from each other if the magnitudes of the virtual surface normal force components are not zero.

Hence, of the virtual surface normal force components in the two opposing virtual surfaces, if the virtual surface normal force component having a smaller magnitude is denoted as the first virtual surface normal force component and the virtual surface normal force component having a larger magnitude is denoted as the second virtual surface normal force component, then the first virtual surface normal force component and a component of the second virtual surface normal force component, which component has the same magnitude as that of the first virtual surface normal force component will function as internal forces that do not contribute to a motion of the robot. If the internal forces develop an excessive magnitude (=the magnitude of the first virtual surface normal force component), then the share, which is required to generate the internal forces, in the motive power that can be generated by an actuator of the robot increases, frequently leading to deficiency of the motive power of the actuator that can be used for changing the motion of the robot.

For the reason described above, in the first to the third aspects of the invention, if the plurality of surfaces to be contacted includes two surfaces to be contacted opposing each other with an interval provided therebetween and the virtual surface group includes two opposing virtual surfaces corresponding to the aforesaid two surfaces to be contacted, then the provisional required virtual surface translational force determining unit preferably determines the provisional value of the required virtual surface translational force in each virtual surface as described below.

In the case where the compensation total translational external force has an opposing virtual surface orthogonal component, which is a component in a direction orthogonal to the two opposing virtual surfaces, the provisional required virtual surface translational force determining unit preferably determines the provisional value of the required virtual surface translational force in each virtual surface such that a third requirement that the magnitude of the virtual surface normal force component which is the smaller one of the virtual surface normal force components in the two opposing virtual surfaces be not more than a preset second specified value is satisfied in addition to satisfying the first requirement and the second requirement (a fourth aspect of the invention).

In the fourth aspect of the invention, the second predetermined value in the third requirement corresponds to the upper limit value of the magnitude of the internal force between the two opposing virtual surfaces. Hence, according to the fourth aspect of the invention, if the compensation total translational external force has an opposing virtual surface orthogonal component, which is a component in a direction orthogonal to the two opposing virtual surfaces, then the provisional value of the required virtual surface translational force in each virtual surface can be determined while satisfying the first requirement and the second requirement in addition to restraining the magnitude of the internal force between the two opposing virtual surfaces from becoming excessive.

As a result, the desired translational force in each surface to be contacted can be determined to restrain the internal force generated in the robot between the two surfaces to be contacted corresponding to the two opposing virtual surfaces from becoming excessive. In other words, the desired translational force in each surface to be contacted can be determined while restraining the motive power usable for accomplishing the compensation total translational external force and the compensation total moment external force in the motive power that can be generated by an actuator of the robot from becoming insufficient due to the internal force.

In the first to the fourth aspects of the invention described above, the moment compensation amount determining unit selects any one of the first compensation amount, the second compensation amount, and the third compensation amount as the moment compensation amount. If, however, the magnitudes of the second compensation amount and the third compensation amount excessively increase, then the magnitude of the frictional force to be generated in a surface to be contacted corresponding to the virtual surface to be corrected by the second compensation amount and the third compensation amount will excessively increase. This may lead to slippage between the surface to be contacted and the robot. In contrast to the two compensation amounts, the first compensation amount does not influence the frictional force between a virtual surface and the robot and therefore does not influence the frictional force between the surface to be contacted and the robot.

Accordingly, in the first to the fourth aspects of the invention, the moment compensation amount determining unit preferably includes a first processor that determines, on the basis of the moment error, the first compensation amount, which makes it possible to reduce the moment error, within a range in which the external force action point existence region condition can be satisfied, a second processor that calculates a remaining error component, which is an error component obtained by removing an error component canceled by the determined first compensation amount from the moment error in the case where the entire moment error cannot be canceled by the determined first compensation amount, and a third processor that determines one or both of the second compensation amount and the third compensation amount on the basis of the remaining error component such that the remaining error component is canceled (a fifth aspect of the invention).

According to the fifth aspect of the invention, the moment compensation amount determining unit determines the first compensation amount by the first processor, and if the entire moment error cannot be canceled by the first compensation amount, then the moment compensation amount determining unit determines one or both of the second compensation amount and the third compensation amount on the basis of the remaining error component by carrying out the processing by the second processor and the third processor.

Hence, according to the fifth aspect of the invention, if the first compensation amount, which makes it possible to cancel the entire moment error, can be determined, then only the first compensation amount will be preferentially determined as the moment compensation amount. If the entire moment error cannot be canceled by the first compensation amount, then one or both of the second compensation amount and the third compensation amount is determined so as to cancel only the remaining error component.

This arrangement makes it possible to prevent the second compensation amount and the third compensation amount, which cause an increase in the frictional force between a surface to be contacted corresponding to a virtual surface and the robot, from being determined as the moment compensation amount, as much as possible. Further, even if one or both of the second compensation amount and the third compensation amount are determined as the moment compensation amount, the magnitude of the second compensation amount or the third compensation amount can be controlled to a minimum.

In the fifth aspect of the invention, the first processor may determine the first compensation amount, for example, as described below. The restriction placed under the external force action point existence region condition is removed, a candidate value of the first compensation amount is determined such that the moment error is canceled, and it is determined whether the candidate value satisfies the external force action point existence region condition.

If the determination result is affirmative, then the candidate value is directly determined as the first compensation amount. If the determination result is negative, then the first compensation amount is forcibly limited to a value that satisfies the external force action point existence region condition (e.g., a value that causes the external force action point on a virtual surface after corrected by the value to turn into a point on a boundary of the external force action point permissible region on the virtual surface).

If the virtual surface group has the opposing virtual surfaces, then the resultant force of the required virtual surface translational forces in the virtual surfaces is not influenced even when the internal force in the opposing virtual surfaces is changed. In other words, the internal force can be adjusted within a range that satisfies the third requirement while satisfying the first requirement.

The upper limit value (the first predetermined value) of the frictional force that can be generated in the opposing virtual surfaces can be changed by adjusting the internal force.

Accordingly, in the fifth aspect of the invention, in the case where the plurality of surfaces to be contacted includes two surfaces to be contacted which oppose each other with an interval provided therebetween, the virtual surface group includes opposing virtual surfaces, which are two virtual surfaces opposing each other in parallel as the virtual surfaces corresponding to the two surfaces to be contacted, and the moment compensation amount determined by the moment compensation amount determining unit includes the second compensation amount, preferably, the external force target generating device includes:

a first determining unit which determines after the second compensation amount is determined by the moment compensation amount determining unit, whether or not the provisional value of a virtual surface frictional force component corrected on the basis of the second compensation amount satisfies the second requirement in each virtual surface in which the virtual surface frictional force component is corrected on the basis of the determined second compensation amount among the plurality of virtual surfaces of the virtual surface group; and a provisional required virtual surface translational force re-determining unit which re-determines, in the case where there is the virtual surface in which the determination result of the first determining unit is negative and the virtual surface with the negative determination result is one of the two opposing virtual surfaces, the provisional value of the required virtual surface translational force in each virtual surface such that at least the first requirement is satisfied and the magnitudes of the virtual surface normal force components in the two opposing virtual surfaces including the virtual surface in which the determination result given by the first determining unit is negative are larger than that of the virtual surface normal force component in the provisional value of the determined required virtual surface translational force, wherein in the case where the provisional value of the required virtual surface translational force is re-determined by the provisional required virtual surface translational force re-determining unit, the provisional required virtual surface translational force dependent moment calculating unit uses the provisional value of the re-determined required virtual surface translational force and the provisional external force action point on a virtual surface that has been corrected by the first compensation amount determined by the first processor so as to re-calculate the provisional value of the required virtual surface translational force dependent moment, and the moment compensation amount determining unit re-executes processing for determining the moment compensation amount by using the moment error which has been re-calculated on the basis of the compensation total moment external force and the re-calculated provisional value of the required virtual surface translational force dependent moment (a sixth aspect of the invention).

According to the sixth aspect of the invention, in the case where there is a virtual surface in which the result of determination (the determination result of the first determining unit) whether the provisional value of a virtual surface frictional force component that has been corrected on the basis of the second compensation amount determined by the third processor satisfies the second requirement is negative, and the virtual surface with the negative determination result is one of the two opposing virtual surfaces, the provisional value of the required virtual surface translational force in each virtual surface is re-determined such that at least the first requirement is satisfied and the magnitudes of the virtual surface normal force components in the two opposing virtual surfaces including the virtual surface with the negative determination result are larger than that of the virtual surface normal force component in the provisional value of the determined required virtual surface translational force. This leads to increased upper limit values (the first predetermined values) of the frictional forces in the opposing virtual surfaces.

In this case, the provisional required virtual surface translational force re-determining unit further preferably re-determines the provisional value of the required virtual surface translational force in each virtual surface such that the third requirement, which has been described in relation to the fourth aspect of the invention, is satisfied in addition to satisfying the first requirement.

Further, in the sixth aspect of the invention, when the provisional value of the required virtual surface translational force is re-determined as described above, the processing by the provisional required virtual surface translational force dependent moment calculating unit is carried out again by using the provisional value of the re-determined required virtual surface translational force, and the processing by the moment compensation amount determining unit (the processing by the first processor, the second processor and the third processor) is also carried out again.

Thus, the second compensation amount can be determined as the moment compensation amount such that the provisional value of the virtual surface frictional force component that has been corrected on the basis of the second compensation amount satisfies the second requirement as much as possible while maintaining a state where the resultant force of the required virtual surface translational forces in the virtual surfaces satisfies the first requirement. In other words, the second compensation amount can be determined while preventing the correction of the virtual surface frictional force component on the basis of the second compensation amount from impairing the second requirement.

Further, in the fifth aspect of the invention, in the case where the plurality of surfaces to be contacted includes two surfaces to be contacted which oppose each other with an interval provided therebetween, the virtual surface group includes opposing virtual surfaces, which are two virtual surfaces opposing each other in parallel as the virtual surfaces corresponding to the two surfaces to be contacted, and the moment compensation amount determined by the third processing unit includes the third compensation amount, preferably, the external force target generating device includes:

a second determining unit which determines whether or not a fourth requirement that the magnitude of a twisting force added to a virtual surface on the basis of the determined third compensation amount in the virtual surface, to which the twisting force is added on the basis of the determined third compensation amount, among a plurality of virtual surfaces of the virtual surface group after the third compensation amount is determined by the moment compensation amount determining unit be not more than a third predetermined value set on the basis of at least the virtual surface normal force component of the provisional value of the determined required virtual surface translational force in the virtual surface is satisfied; and a provisional required virtual surface translational force re-determining unit which re-determines the provisional value of the required virtual surface translational force in each virtual surface such that at least the first requirement is satisfied and the magnitudes of the virtual surface normal force components in the two opposing virtual surfaces including the virtual surface in which the determination result given by the second determining unit is negative are larger than that of the virtual surface normal force component in the provisional value of the determined required virtual surface translational force in a case where there is the virtual surface in which the determination result of the second determining unit is negative and the virtual surface with the negative determination result is one of the two opposing virtual surfaces, wherein in the case where the provisional value of the required virtual surface translational force is re-determined by the provisional required virtual surface translational force re-determining unit, the provisional required virtual surface translational force dependent moment calculating unit uses the provisional value of the re-determined required virtual surface translational force and the provisional external force action point on a virtual surface that has been corrected by the first compensation amount determined by the first processor so as to re-calculate the provisional value of the required virtual surface translational force dependent moment, and the moment compensation amount determining unit re-executes processing for determining the moment compensation amount by using the moment error which has been re-calculated on the basis of the compensation total moment external force and the re-calculated provisional value of the required virtual surface translational force dependent moment (a seventh aspect of the invention).

The second predetermined value in the fourth requirement corresponds to the upper limit value of the magnitude of a twisting force that can be generated by the frictional force between a virtual surface and the robot. In the case where, for example, the normal force component in a surface to be contacted corresponding to a virtual surface is set to coincide with the virtual surface normal force component in the virtual surface, the second predetermined value is preferably set to a value that coincides or is slightly smaller than the upper limit value of the magnitude of a twisting force that can be generated about the provisional external force action point (more accurately, about an axis which passes the provisional external force action point and which is perpendicular to the surface to be contacted) by the frictional force between the surface to be contacted and the robot.

According to the seventh aspect of the invention, in the case where there is a virtual surface in which the result of determination (the determination result of the second determining unit) whether the twisting force to be applied to a virtual surface on the basis of the third compensation amount included in the moment compensation amount satisfies the fourth requirement is negative, and the virtual surface with the negative determination result is one of the two opposing virtual surfaces, the provisional value of the required virtual surface translational force in each virtual surface is re-determined such that at least the first requirement is satisfied and the magnitudes of the virtual surface normal force components in the two opposing virtual surfaces including the virtual surface with the negative determination result are larger than that of the virtual surface normal force component in the provisional value of the determined required virtual surface translational force. This leads to an increased upper limit value (the second predetermined value) of the magnitude of the twisting force that can be generated in the virtual surface.

Further, according to the seventh aspect of the invention, as with the sixth aspect of the invention, in the case where the provisional value of the required virtual surface translational force is re-determined as described above, the processing by the provisional required virtual surface translational force dependent moment calculating unit is carried out again by using the provisional value of the re-determined required virtual surface translational force. Further, the processing by the moment compensation amount determining unit (the processing by the first processor, the second processor and the third processor) is carried out again.

Thus, the third compensation amount can be determined as the moment compensation amount such that the twisting force to be applied to the virtual surface on the basis of the third compensation amount satisfies the fourth requirement as much as possible. In other words, the third compensation amount can be determined while preventing the frictional force that must be generated in a virtual surface from becoming excessive due to the twisting force applied to the virtual surface on the basis of the third compensation amount.

The sixth aspect of the invention and the seventh aspect of the invention may be combined. In this case, if there is a virtual surface in which the determination result given by one of the first determining unit and the third determining unit turns to be negative after the third processor determines the second compensation amount and the third compensation amount and if the virtual surface with the negative determination result is one of the two opposing virtual surfaces, then the processing by the provisional required virtual surface translational force determining unit may be carried out.

Supplementarily, according to the fifth to the seventh aspects of the invention, the first compensation amount has preferentially been determined as the moment compensation amount, and if the moment error cannot be canceled by the first compensation amount, then one or both of the second compensation amount and the third compensation amount have been determined as an additional moment compensation amount. However, if the moment error cannot be canceled by one or both of the second compensation amount and the third compensation amount after one or both of the second compensation amount and the third compensation amount have preferentially been determined as the moment compensation amount, then the first compensation amount may be determined.

For example, if the second compensation amount is included in the moment compensation amount, then the moment compensation amount determining unit is provided with a first processor that determines the second compensation amount, which makes it possible to reduce the moment error, on the basis of the moment error within a range in which the second requirement can be satisfied, a second processor which calculates a remaining error component obtained by removing the error component that is canceled by the determined second compensation amount from the moment error when the entire moment error cannot be canceled by the determined second compensation amount, and a third processor which determines the first compensation amount to cancel the remaining error component on the basis of the remaining error component.

Further, if the third compensation amount is included in the moment compensation amount, then the moment compensation amount determining unit is provided with a first processor that determines the third compensation amount, which makes it possible to reduce the moment error on the basis of the moment error within a range in which the fourth requirement can be satisfied, a second processor which calculates a remaining error component obtained by removing the error component that is canceled by the determined third compensation amount from the moment error when the entire moment error cannot be canceled by the determined second compensation amount, and a third processor which determines the first compensation amount to cancel the remaining error component on the basis of the remaining error component.

Further, if the second compensation amount and the third compensation amount are included in the moment compensation amount, then the moment compensation amount determining unit is provided with a first processor that determines the second compensation amount and the third compensation amount, which make it possible to reduce the moment error, on the basis of the moment error within a range in which the second requirement and the fourth requirement can be satisfied, a second processor which calculates a remaining error component obtained by removing the error component that is canceled by the determined second and third compensation amounts from the moment error when the entire moment error cannot be canceled by the determined second and third compensation amounts, and a third processor which determines the first compensation amount to cancel the remaining error component on the basis of the remaining error component.

If there are two surfaces to be contacted that oppose each other with an interval provided therebetween in an operating environment of the robot and consequently the virtual surface group includes the opposing virtual surfaces, then the moment about the reference point can be changed while maintaining the total sum of the virtual surface normal force components in the two opposing virtual surfaces at a constant value (i.e., while maintaining the resultant force of the required virtual surface translational forces in the virtual surfaces of the virtual surface group by adjusting the magnitude of the internal force between the two opposing virtual surfaces in addition to the first to the third compensation amounts. Hence, the correction amount of the internal force can be used as the moment compensation amount.

Thus, the external force target generating device of a legged mobile robot in accordance with the present invention may adopt the following embodiments.

That is, another embodiment of the external force target generating device of a legged mobile robot in accordance with the present invention is an external force target generating device which generates targets related to external forces to be applied to the robot in a state where a motion of the robot is controlled so that an actual motion of the robot follows a desired motion of the robot for causing the robot to implement a motion while keeping a plurality of portions of the robot in contact with a plurality of surfaces to be contacted, which is a plurality of mutually different surfaces to be contacted, which exists in an operating environment of the robot, and which includes two surfaces to be contacted opposing each other with an interval provided therebetween, the external force target generating device including:

a gait basic element generating unit which generates a desired motion of the robot and a provisional external force action point, which is the provisional value of a desired position of the action point of an external force in each surface to be contacted, the external force acting from each of the plurality of surfaces to be contacted onto the robot;

a virtual surface group setting unit which uses a virtual surface group that is constituted of a plurality of virtual surfaces having a predetermined mutual posture relationship and which includes opposing virtual surfaces, which are two virtual surfaces opposing each other in parallel, to virtually set the virtual surface group in the space of an operating environment of the robot such that the plurality of virtual surfaces of the virtual surface group turns into surfaces that match or approximate the plurality of surfaces to be contacted and the two opposing virtual surfaces turn into virtual surfaces corresponding to the two surfaces to be contacted that oppose each other with an interval provided therebetween;

a basic required total external force determining unit which determines, on the basis of the desired motion, a basic required total translational external force, which is a translational force component of a total external force to be applied to the robot to implement the desired motion and a basic required total moment external force, which is a moment component of the total external force about a predetermined reference point fixed relative to the virtual surface group;

a translational external force compensation amount determining unit which sequentially calculates a first motional state amount error that is a difference between an observed value of a predetermined first motional state amount of the robot and a desired value of the first motional state amount in the desired motion, and based on the first motional state amount error, determines a translational external force compensation amount that is a translational force to be additionally applied to the robot in order to approximate the first motional state amount error to zero;

a moment external force compensation amount determining unit which sequentially calculates a second motional state amount error that is a difference between an observed value of a predetermined second motional state amount of the robot and a desired value of the second motional state amount in the desired motion, and based on the second motional state amount error, determines a moment external force compensation amount that is a moment generated about the reference point to be additionally applied to the robot in order to approximate the second motional state amount error to zero;

a provisional required virtual surface translational force determining unit, which is a unit that determines a provisional value of a required virtual surface translational force, which is the translational force to be applied to the robot from each of the plurality of virtual surfaces of the virtual surface group to attain a compensation total translational external force obtained by adding the determined translational external force compensation amount to the determined basic required total translational external force, and determines the provisional value of the required virtual surface translational force in each virtual surface such that at least a first requirement that the resultant force of the required virtual surface translational forces in the plurality of virtual surfaces coincide with the determined compensation total translational external force, and, regarding a virtual surface normal force component of a required virtual surface translational force in each virtual surface, which is a component perpendicular to the virtual surface, and a virtual surface frictional force component, which is a component parallel to the virtual surface, a second requirement that the magnitude of the virtual surface frictional force component be not more than a first predetermined value set on the basis of at least the virtual surface normal force component, are satisfied;

a provisional required virtual surface translational force dependent moment calculating unit which calculates a provisional value of a required virtual surface translational force dependent moment, which is a total moment generated about the predetermined reference point by a required virtual surface translational force on each of the plurality of virtual surfaces, assuming that the provisional value of the determined required virtual surface translational force in each virtual surface acts on a provisional on-virtual-surface external force action point, which is a point obtained by projecting a provisional external force action point that is an external force action point provisionally set on the surface to be contacted corresponding to the virtual surface, onto the virtual surface;

a moment compensation amount determining unit that calculates a moment error, which is a difference between a compensation total moment external force obtained by adding the determined moment external force compensation amount to the determined basic required total moment external force and the calculated provisional value of the required virtual surface translational force dependent moment, and determines, by using the moment error, a moment compensation amount which includes at least one of a first compensation amount which is constituted of the correction amount of one or more of the provisional on-virtual-surface external force action points, and which satisfies an external force action point existence region condition that each provisional on-virtual-surface external force action point after having been corrected using the correction amount exists in an on-virtual-surface external force action point permissible region obtained by projecting an external force action point existence permissible region set on the surface to be contacted corresponding to a virtual surface, on which the provisional on-virtual-surface external force action point exists, onto the virtual surface, a second compensation amount which is composed of the correction amounts of virtual surface frictional force components in two or more virtual surfaces and the total sum of the correction amounts is zero, a third compensation amount composed of a twisting force additionally applied to the robot from the virtual surface about an axis in a direction perpendicular to one or more virtual surfaces, and a fourth compensation amount, which is a correction amount for correcting the magnitudes of the virtual surface normal force components of the individual opposing virtual surfaces by the same amount while maintaining the total sum of the virtual surface normal force components in the two opposing virtual surfaces at a constant level, as a compensation amount for canceling the moment error; and a desired surface-to-be-contacted external force and action point determining unit which determines a desired external force to be applied to the robot from a surface to be contacted corresponding to each virtual surface and a desired external force action point, which indicates the desired position of the action point of the desired external force, on the basis of at least the provisional value of the required virtual surface translational force determined in association with each virtual surface and the determined moment compensation amount, then outputs the determined desired external force and the determined desired external force action point as constituent elements of the target related to the external force (an eighth aspect of the invention).

According to the eighth aspect of the invention, the processing carried out by the virtual surface group setting unit, the basic required total external force determining unit, the translational external force compensation amount determining unit, the moment external force compensation amount determining unit, and the provisional required virtual surface translational force determining unit is the same as that of the first aspect of the invention. In the eighth aspect of the invention, the virtual surface group set by the virtual surface group setting unit includes the opposing virtual surfaces.

Meanwhile, according to the eighth aspect of the invention, the moment compensation amount determining unit determines, by using the moment error, a moment compensation amount which includes at least one of the first compensation amount, the second compensation amount, the third compensation amount, and the fourth compensation amount, which is a correction amount for correcting the magnitudes of the virtual surface normal force components of the individual opposing virtual surfaces by the same amount while maintaining the total sum of the virtual surface normal force components in the two opposing virtual surfaces at a constant level as the moment compensation amount for canceling the moment error.

The fourth compensation amount is a moment compensation amount serving as a correction amount of the magnitude of the internal force between the two opposing virtual surfaces. Hence, a moment compensation amount which includes at least one of the first to the fourth compensation amounts is a compensation amount that makes it possible to maintain the total resultant force of the required virtual surface translational forces in the virtual surfaces at a constant level before and after a correction based on the moment compensation amount. Thus, as with the first aspect of the invention, simply combining a moment compensation amount to the provisional value of the required virtual surface translational force in each virtual surface previously determined will provide a set of a required virtual surface translational force and an external force action point on a virtual surface that implements both the compensation total translational external force and the compensation total moment external force or a set of a required virtual surface translational force, a twisting force in a virtual surface, and an external force action point on a virtual surface.

Further, according to the eighth aspect of the invention, as with the first aspect of the invention, the desired surface-to-be-contacted external force and action point determining unit determines a desired external force to be applied to the robot from the surfaces to be contacted corresponding to virtual surfaces, and a desired external force action point, which indicates the desired position of the action point of the desired external force, then outputs the determined desired external force and the determined desired external force action point as the target related to the external force.

In this case, in the desired external force to be applied to the robot from the surface to be contacted corresponding to each virtual surface, the translational force component parallel to the surface to be contacted (the frictional force component) and the twisting force may be determined as described in relation to the first aspect of the invention. Further, a desired external force action point in the surface to be contacted corresponding to each virtual surface may be also determined as described in relation to the first aspect of the invention. Similarly, in the desired external force to be applied to the robot from the surface to be contacted corresponding to each virtual surface except for opposing virtual surfaces, the translational force component in a direction perpendicular to the surface to be contacted (the normal force component) may be also determined as described in relation to the first aspect of the invention.

Meanwhile, in the desired external force to be applied to the robot from a surface to be contacted corresponding to an opposing virtual surface, the translational force component in a direction perpendicular to the surface to be contacted (the normal force component) may be determined such that the translational force component coincides with the provisional value of the virtual surface normal force component in the opposing virtual surface corresponding to the surface to be contacted (if no correction based on the fourth compensation amount is made) or coincides with a value obtained by correcting the provisional value by using the fourth compensation amount.

According to the eighth aspect of the invention described above, as with the first aspect of the invention, targets related to external forces to be applied to the robot can be efficiently and properly determined while causing the robot to implement a motion in a situation where an external force is applied to the robot from a plurality of surfaces to be contacted.

In the eighth aspect of the invention, the same embodiments as those in the second to the fifth aspects of the invention are preferably adopted.

Preferably, the provisional required virtual surface translational force determining unit determines the provisional value of the required virtual surface translational force in each virtual surface such that a first A requirement that the resultant force of the virtual surface normal force components of the plurality of virtual surfaces coincide with a component of the compensation total translational external force excluding a component parallel to all virtual surfaces of the virtual surface group and a first B requirement that the resultant force of the virtual surface frictional force components in the plurality of virtual surfaces coincide with a component of the compensation total translational external force, which component is parallel to all virtual surfaces of the virtual surface group are satisfied in order to satisfy the first requirement (a ninth aspect of the invention).

According to the ninth aspect of the invention, as with the second aspect of the invention, the desired external force applied to the robot from the surfaces to be contacted can be determined such that the compensation total translational external force can be accomplished by the resultant force of the normal force components of the desired external forces in the surfaces to be contacted and the frictional force components of the desired external forces are controlled to a minimum within the range of the magnitude of the frictional forces that can be generated in the surfaces to be contacted, as much as possible.

Further, restricting the first requirement to the set of the first A requirement and the first B requirement makes it easier to formulate the algorithm of the processing for determining the provisional value of the required virtual surface translational force.

According to the ninth aspect of the invention, in the case where the component of the compensation total translational external force, which component is parallel to all the virtual surfaces of the virtual surface group, is not zero, the provisional required virtual surface translational force determining unit preferably determines the provisional value of the required virtual surface translational force in each virtual surface such that, in a virtual surface where the virtual surface normal force component is not zero among the plurality of virtual surfaces of the virtual surface group, the magnitude of the virtual surface frictional force component of the virtual surface increases as the first predetermined value set in association with the virtual surface increases, while satisfying the first A requirement, the first B requirement, and the second requirement (a tenth aspect of the invention).

According to the tenth aspect of the invention, as with the third aspect of the invention, the guideline for distributing the component of the compensation total translational external force, which component is parallel to all the virtual surfaces of the virtual surface group, to each of the virtual surfaces is further restricted, thus making it still easier to formulate the algorithm of the processing for determining the provisional value of the virtual surface translational force component in each virtual surface.

Further, the magnitude of the virtual surface frictional force component in each virtual surface can be set to match the magnitude of the first predetermined value corresponding to the upper limit value of the frictional force that can be generated in each virtual surface. This makes it possible to determine the frictional force component of a desired translational force in each surface to be contacted such that the frictional force component falls in a balanced manner within a limited range of the magnitude of the frictional force that can be generated in the surface to be contacted.

Further, in the eighth to the tenth aspects of the invention, in the case where the compensation total translational external force has an opposing virtual surface orthogonal component, which is a component in a direction orthogonal to the two opposing virtual surfaces, the provisional required virtual surface translational force determining unit preferably determines the provisional value of the required virtual surface translational force in each virtual surface such that a third requirement that the magnitude of the virtual surface normal force component which is the smaller one of the virtual surface normal force components in the two opposing virtual surfaces be not more than a preset second specified value is satisfied in addition to satisfying the first requirement and the second requirement (an eleventh aspect of the invention).

As with the fourth aspect of the invention described above, according to the eleventh aspect of the invention, if the compensation total translational external force has an opposing virtual surface orthogonal component, which is a component in a direction orthogonal to the two opposing virtual surfaces, then the provisional value of the required virtual surface translational force in each virtual surface can be determined while satisfying the first requirement and the second requirement in addition to restraining the magnitude of the internal force between the two opposing virtual surfaces from becoming excessive.

As a result, the desired translational force in each surface to be contacted can be determined to restrain the internal force generated in the robot between the two surfaces to be contacted corresponding to the two opposing virtual surfaces from becoming excessive.

Further, in the eighth to the eleventh aspects of the invention, the moment compensation amount determining unit preferably includes a first processor that determines, on the basis of the moment error, the first compensation amount, which makes it possible to reduce the moment error, within a range in which the external force action point existence region condition can be satisfied, a second processor which calculates a remaining error component, which is an error component obtained by removing an error component canceled by the determined first compensation amount from the moment error in the case where the entire moment error cannot be canceled by the determined first compensation amount, and a third processor which determines at least one of the second compensation amount, the third compensation amount, and the fourth compensation amount on the basis of the remaining error component such that the remaining error component is canceled (a twelfth aspect of the invention).

As with the fifth aspect of the invention, according to the twelfth aspect of the invention, if the first compensation amount, which makes it possible to cancel the entire moment error, can be determined, then only the first compensation amount will be preferentially determined as the moment compensation amount. If the entire moment error cannot be canceled by the first compensation amount, then at least one compensation amount (one or a plurality of compensation amounts) among the second compensation amount, the third compensation amount, and the fourth compensation amount will be determined so as to cancel only the remaining error component.

This arrangement makes it possible to prevent the second compensation amount, the third compensation amount, or the fourth compensation amount, which influences the frictional force between a surface to be contacted corresponding to a virtual surface and the robot, from being determined as the moment compensation amount, as much as possible. Further, even if at least one compensation amount among the second compensation amount, the third compensation amount, and the fourth compensation amount is determined as the moment compensation amount, the magnitudes of the second compensation amount, the third compensation amount, and the fourth compensation amount can be controlled to a minimum.

As has been described in relation to the second aspect of the invention, in the case where the robot is caused to implement a motion while having a plurality of portions of the robot in contact with a plurality of mutually different surfaces to be contacted, which exists in an operating environment of a legged mobile robot, preferably, the compensation total translational external force is achieved by the resultant force of the normal force components of the desired external forces in the individual surfaces to be contacted and the frictional force components of the desired external forces are controlled to a minimum within the range of the magnitude of the frictional force that can be generated in the surface to be contacted.

In particular, therefore, when attention is focused on the desired translational force (the target of a translational force to be applied to the robot from each surface to be contacted), the external force target generating device of a legged mobile robot in accordance with the present invention preferably adopts the following embodiments.

Still another embodiment of the external target force generating device of a legged mobile robot in accordance with the present invention is an external force target generating device of a legged mobile robot, which sequentially generates a target related to an external force to be applied to the robot in a state where a motion of the robot is being controlled so that an actual motion of the robot follows a desired motion of the robot, to cause the robot to implement a motion while having a plurality of portions of the robot in contact with a plurality of different surfaces to be contacted, which exists in an operating environment of the robot, the external force target generating device including:

a virtual surface group setting unit which uses a virtual surface group that is constituted of a plurality of virtual surfaces having a predetermined posture relationship to each other to virtually set the virtual surface group in the space of an operating environment of the robot such that the plurality of virtual surfaces of the virtual surface group turn into surfaces that match or approximate the plurality of surfaces to be contacted;

a basic required total translational external force determining unit which determines, on the basis of the desired motion, a basic required total translational external force, which is a translational force component of a total external force to be applied to the robot so as to implement the desired motion;

a translational external force compensation amount determining unit which sequentially calculates a motional state amount error that is a difference between an observed value of a predetermined motional state amount of the robot and a desired value of the motional state amount in the desired motion, and based on the motional state amount error, determines a translational external force compensation amount that is a translational force to be additionally applied to the robot in order to approximate the motional state amount error to zero;

a required virtual surface translational force determining unit, which is a unit determining a required virtual surface translational force, which is a translational force to be applied to the robot from each of the plurality of virtual surfaces of the virtual surface group to achieve a compensation total translational external force obtained by adding the determined translational external force compensation amount to the determined basic required total translational external force and which determines the required virtual surface translational force in each virtual surface such that at least a first A requirement that the resultant force of the virtual surface normal force components, which are the components of the required virtual surface translational forces in the plurality of virtual surfaces, the components being perpendicular to the virtual surfaces, coincide with a component of the compensation total translational external force excluding a component parallel to all virtual surfaces of the virtual surface group, a first B requirement that the resultant force of the virtual surface frictional force components, which are the components of the required virtual surface translational forces in the plurality of virtual surfaces, the components being parallel to the virtual surfaces, coincide with a component of the compensation total translational external force, which component is parallel to all virtual surfaces of the virtual surface group, and a second requirement that the magnitude of a virtual surface frictional force component in each virtual surface be not more than a first predetermined value set on the basis of at least the virtual surface normal force component in the virtual surface, are satisfied; and a desired surface-to-be-contacted translational force determining unit which determines a desired translational force to be applied to the robot from a surface to be contacted corresponding to each virtual surface on the basis of at least the required virtual surface translational force determined in association with each of the virtual surfaces and outputs the determined desired translational force as a constituent element of the target related to the external force (a thirteenth aspect of the invention).

According to the thirteenth aspect of the invention, the virtual surface group determining unit virtually sets the virtual surface group composed of a plurality of virtual surfaces having a predetermined mutual posture relationship in the space of an operating environment of the robot in order to determine the desired translational force serving as a target related to an external force to be applied to the robot from each of the plurality of surfaces to be contacted. This processing is the same processing carried out by the virtual surface group determining unit in the first aspect or the eighth aspect of the invention.

Further, the basic required total translational external force, which is a translational force component of the total external force to be applied to the robot so as to implement the desired motion, is determined by the basic required total translational external force determining unit. This processing is the same processing for determining the basic required total translational external force by the basic required total external force determining unit in the first aspect or the eighth aspect of the invention.

As described in relation to the first aspect of the invention, the desired motion may be generated according to, for example, the type of motion required of the robot (e.g., how the distal end of a leg link of the robot should be moved or how a surface to be contacted should be touched).

Further, in the thirteenth aspect of the invention, the required virtual surface translational force, which is a translational force to be applied to the robot from each of the plurality of virtual surfaces of the virtual surface group to attain a compensation total translational external force obtained by adding the determined translational external force compensation amount to the determined basic required total translational external force, is determined by the required virtual surface translational force determining unit.

Here, the required virtual surface translational forces in the individual virtual surfaces determined by the required virtual surface translational force determining unit mean, in other words, the translational forces, the resultant force of which coincides with the compensation total translational external force. Further, the required virtual surface translational force in each virtual surface is constituted of one or both of the virtual surface normal force component, which is a component perpendicular to the virtual surface, and a virtual surface frictional force component, which is a component parallel to the virtual surface.

In this case, according to the present invention, external forces are applied to the robot from the plurality of virtual surfaces of the virtual surface group when external forces are applied to the robot from the plurality of surfaces to be contacted. Generally, therefore, countless different combinations of required virtual surface translational forces in virtual surfaces are possible for implementing the compensation total translational external force.

However, as described in relation to the second aspect of the invention, the upper limit value of the magnitude of a frictional force component of a translational force that can be applied to the robot from a surface to be contacted corresponding to each virtual surface (a component parallel to the surface to be contacted) is influenced by a normal force component in the surface to be contacted (a component perpendicular to the surface to be contacted). As the magnitude of the normal force component decreases, the upper limit value of the magnitude of the frictional force component decreases accordingly. As the frictional force component increases, slippage between the surface to be contacted and the robot tends to frequently occur. In contrast to this, the normal force component in the surface to be contacted can be implemented in a wider range, as compared with the frictional force component.

Therefore, as described in relation to the second aspect of the invention, it is considered preferable to determine the required virtual surface translational force such that the compensation total translational external force is achieved by the resultant force of the virtual surface normal force components in the virtual surfaces as much as possible. Further, in the case where the virtual surface frictional force component in each virtual surface is required to obtain the compensation total translational external force, the magnitude of the virtual surface frictional force component is preferably set according to the magnitude of the virtual surface normal force component in the virtual surface or determined to be a predetermined value or less.

According to the thirteenth aspect of the invention, therefore, as with the provisional required virtual surface translational force determining unit in the second aspect of the invention, the required virtual surface translational force determining unit determines the required virtual surface translational force in each virtual surface such that the first A requirement that the resultant force of the virtual surface normal force components of the required virtual surface translational forces in the plurality of virtual surfaces coincide with a component of the compensation total translational external force excluding the components parallel to all virtual surfaces of the virtual surface group, a first B requirement that the resultant force of the virtual surface frictional force components of the required virtual surface translational forces in the plurality of virtual surfaces coincide with a component of the compensation total translational external force, which component is parallel to all virtual surfaces of the virtual surface group, and a second requirement that the magnitude of a virtual surface frictional force component in each virtual surface is not more than a first predetermined value set on the basis of at least the virtual surface normal force component in the virtual surface are at least satisfied.

This arrangement enables the required virtual surface translational force determining unit to determine the required virtual surface translational force in each virtual surface such that the compensation total translational external force is obtained by the resultant force of the virtual surface normal force components in the virtual surfaces and the virtual surface frictional force component is controlled to a minimum within a range that satisfies the second requirement as much as possible.

Further, according to the thirteenth aspect of the invention, the desired surface-to-be-contacted translational force determining unit determines a desired translational force to be applied to the robot from a surface to be contacted corresponding to each virtual surface on the basis of at least the required virtual surface translational force determined in association with each of the virtual surfaces and outputs the determined desired translational force as a constituent element of the target related to the external force.

In this case, the desired translational force to be applied to the robot from the surface to be contacted corresponding to each virtual surface may be determined such that, for example, the component of the desired translational force in the direction perpendicular to the surface to be contacted (a normal force component) and a component parallel to the surface to be contacted (a frictional force component) coincide with the virtual surface normal force component and the virtual surface frictional force component, respectively, of the required virtual surface translational force in the virtual surface corresponding to the surface to be contacted.

As described above, the thirteenth aspect of the invention enables the required virtual surface translational force determining unit to determine the required virtual surface translational force in each virtual surface such that the compensation total translational external force is obtained by the resultant force of the virtual surface normal force components in the virtual surfaces and the virtual surface frictional force component is controlled to a minimum within a range that satisfies the second requirement as much as possible.

Thus, the desired translational force applied to the robot from the surfaces to be contacted can be determined such that the compensation total translational external force can be accomplished by the resultant force of the normal force components of the desired translational forces in the surfaces to be contacted and the frictional force components of the desired translational forces are controlled to a minimum within the range of the magnitude of the frictional forces that can be generated in the surfaces to be contacted, as much as possible.

Further, in this case, the processing carried out by the required virtual surface translational force determining unit uses the first A requirement, the first B requirement, and the second requirement, thereby restricting the guideline for determining the required virtual surface translational force in the virtual surface corresponding to each surface to be contacted (the guideline for distributing the compensation total translational external force to the required virtual surface translational force in each virtual surface). Hence, a mode is excluded in which at least a component from which a component parallel to all virtual surfaces of the virtual surface group has been removed is distributed or set to coincide with the virtual surface frictional force component in any one of the virtual surfaces.

Further, each virtual surface has a predetermined mutual posture relationship, thus making it easy to formulate the algorithm of the processing for determining the required virtual surface translational force that makes it possible to satisfy the first A requirement, the first B requirement, and the second requirement.

In addition, since the compensation total translational external force is obtained by adding a translational external force compensation amount for approximating the motional state amount error to zero to a basic required total translational external force for implementing a desired motion (more specifically, a translational motion of the entire robot among the desired motion), a desired translational force to be applied to the robot from each surface to be contacted can be determined so as to enable the motional state amount error to approximate to zero while having an actual motion of the robot follow the desired motion.

Hence, according to the thirteenth aspect of the invention, the desired value of the translational force of the external force to be applied to the robot can be determined on the basis of a proper guideline so as to enable the robot to implement a motion in a smooth manner while having the robot implement a motion in a situation where an external force acts on the robot from a plurality of surfaces to be contacted.

In the thirteenth aspect of the invention, as with the provisional required virtual surface translational force determining unit in the third aspect of the invention, in the case where the component of the compensation total translational external force, which component is parallel to all the virtual surfaces of the virtual surface group, is not zero, the required virtual surface translational force determining unit preferably determines the required virtual surface translational force in each virtual surface such that, in a virtual surface where the virtual surface normal force component is not zero among the plurality of virtual surfaces of the virtual surface group, the magnitude of the virtual surface frictional force component of the virtual surface increases as the first predetermined value set in association with the virtual surface increases, while satisfying the first A requirement, the first B requirement, and the second requirement (a fourteenth aspect of the invention).

According to the fourteenth aspect of the invention, the guideline for distributing the component of the compensation total translational external force, which component is parallel to all the virtual surfaces of the virtual surface group to each of the virtual surfaces, is further restricted, thus making it still easier to formulate the algorithm of the processing for determining the virtual surface translational force component in each virtual surface.

Further, the magnitude of the virtual surface frictional force component in each virtual surface can be set to match the magnitude of the first predetermined value corresponding to the upper limit value of the frictional force that can be generated in each virtual surface. As a result, the frictional force component of a desired translational force in each surface to be contacted can be determined such that the frictional force component falls in a balanced manner within a limited range of the magnitude of the frictional force that can be generated in the surface to be contacted (such that the frictional force component in any of the surfaces to be contacted does not come excessively close to the limit of the magnitude of the frictional force, as compared with the frictional force component in another surface to be contacted).

In the thirteenth or the fourteenth aspect of the invention, if the plurality of surfaces to be contacted includes two surfaces to be contacted opposing each other with an interval provided therebetween and the virtual surface group includes two opposing virtual surfaces corresponding to the aforesaid two surfaces to be contacted, then, as described in relation to the fourth aspect of the invention, the required virtual surface translational force determining unit preferably determines the required virtual surface translational force in each virtual surface as described below.

In the case where the compensation total translational external force has an opposing virtual surface orthogonal component, which is a component in a direction orthogonal to the two opposing virtual surfaces, the required virtual surface translational force determining unit preferably determines the required virtual surface translational force in each virtual surface such that a third requirement that the magnitude of the virtual surface normal force component which is the smaller one of the virtual surface normal force components in the two opposing virtual surfaces be not more than a preset second specified value is satisfied in addition to satisfying the first A requirement, the first B requirement, and the second requirement (a fifteenth aspect of the invention).

In the fifteenth aspect of the invention, the second predetermined value in the third requirement corresponds to the upper limit value of the magnitude of the internal force between the two opposing virtual surfaces. Hence, according to the fifteenth aspect of the invention, if the determined required total translational external force has an opposing virtual surface orthogonal component, which is a component in a direction orthogonal to the two opposing virtual surfaces, then the required virtual surface translational force in each virtual surface can be determined while restraining the magnitude of the internal force between the two opposing virtual surfaces from becoming excessive in addition to satisfying the first A requirement, the first B requirement, and the second requirement.

As a result, the desired translational force in each surface to be contacted can be determined to restrain the internal force generated in the robot between the two surfaces to be contacted corresponding to the two opposing virtual surfaces from becoming excessive. In other words, the desired translational force in each surface to be contacted can be determined while restraining the motive power usable for accomplishing the compensation total translational external force in the motive power that can be generated by an actuator of the robot from becoming insufficient due to the internal force.

BRIEF DESCRIPTION OF THE DRAWINGS

FIGS. 4(a) and 4(b) are diagrams illustrating in a time-series manner the instantaneous motional states of the robot after the motional states shown in FIGS. 3(a) to 3(c);

DETAILED DESCRIPTION OF THE PREFERRED EMBODIMENTS

[First Embodiment]

A first embodiment of the present invention will be described below with reference to FIG. 1 to FIG. 13.

Figure 1:
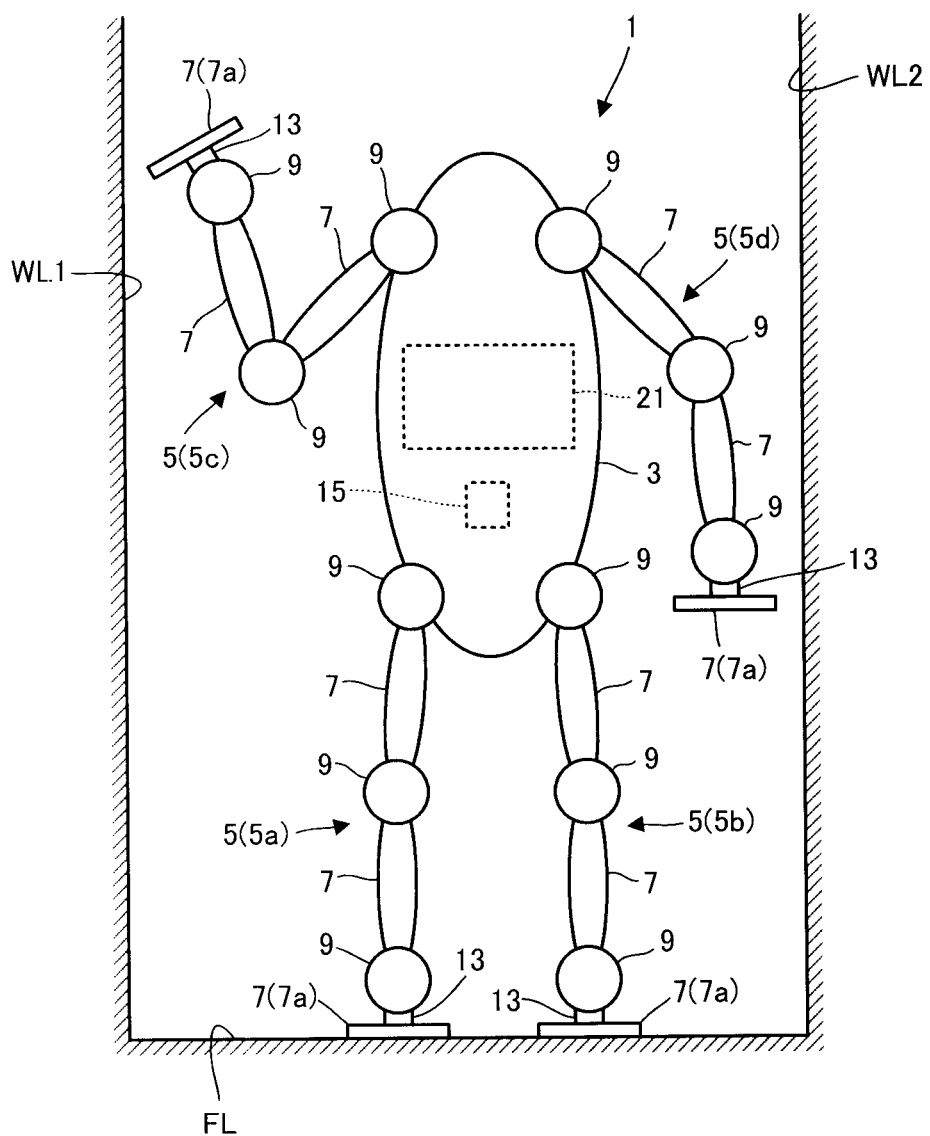
FIG. 1 is a diagram illustrating the mechanical external force configuration of a legged mobile robot in an embodiment of the present invention.

Referring first to FIG. 1, the mechanical schematic construction of a legged mobile robot 1 in the present embodiment (hereinafter referred to simply as the robot 1) will be described.

This robot 1 has a body 3 and a plurality of link mechanisms 5 extended from the body 3. Each of the link mechanisms 5 is a mechanism capable of functioning as a leg of the robot 1. The quantity of the link mechanisms 5 is four in the present embodiment.

In the description of the present embodiment, the fact that the link mechanisms 5 are capable of functioning as the legs of the robot 1 means that the link mechanisms 5 are capable of receiving from a surface to be contacted an external force supporting all or a part of the self weight of the robot 1 (more accurately, the resultant force of the gravitational force acting on the robot 1 and the inertial force generated by a motion of the robot 1) when the distal portions of the link mechanisms 5 are brought in contact with the surface to be contacted, such as a floor or a wall, in an outside world (operating environment) of the robot 1.

Each of the link mechanisms 5 is constructed of a plurality of element links 7 and a plurality of joints 9, which connect these element links 7 in order from the side of the body 3. In this case, if the element link 7 constituting the distal end of each of the link mechanisms 5 (hereinafter referred to as a distal link 7a or simply as the distal end of the link mechanism 5) is the portion to be brought in contact with a surface to be contacted, such as a floor or a wall, in an outside world of the robot 1 when the link mechanism 5 functions as a leg. Each of the distal links 7a is shaped like a plate, and the front surface, which is the surface to be in contact with an outside world, is coated with an elastic resin material, such as a rubber material (not shown).

Each of the joints 9 of each of the link mechanisms 5 is, for example, a rotary joint having a publicly known construction. Each of the joints 9 has one or a plurality of degrees of freedom. In this case, the degree of freedom of each joint 9 of each of the link mechanisms 5 is set such that the total degree of freedom of all the joints 9 included in each of the link mechanisms 5 is six or more. Hence, each of the spatial position and posture (spatial orientation) of each of the distal links 7a relative to the body 3 has three degrees of freedom. Each of the link mechanisms 5 may include a linear-motion joint in addition to a rotary joint.

Although not shown in FIG. 1, the robot 1 is provided with a plurality of joint actuators 11 (shown in FIG. 2), such as electric motors, which drive the joints 9. Further, a driving force is transmitted from the joint actuator 11 corresponding to each of the joints 9 of the link mechanisms 5 through a motive power transmitting mechanism, including a speed reducer (not shown).

The above has described the mechanical schematic construction of the robot 1 in the present embodiment.

Supplementarily, regarding the robot 1 illustrated in FIG. 1, the construction of each of the link mechanisms 5, including the size and quantity of the element links 7 of each link mechanism 5, the quantity of the joints 9, and the total degree of freedom, has been described that every one of the link mechanisms 5 shares the same construction. However, the constructions of the link mechanisms 5 do not need to be the same.

Further, referring to FIG. 1, the robot 1 has been described as a two-legged mobile robot (a robot similar to a humanoid robot) which travels on a level ground by using two link mechanisms 5a and 5b as legs. Alternatively, however, the robot 1 may be, for example, a robot which travels on a level ground by using all the link mechanisms 5 (e.g., a 4-legged robot).

Further, the quantity of the link mechanisms 5 does not have to be four, and may be, for example, three or five or more.

Figure 2:
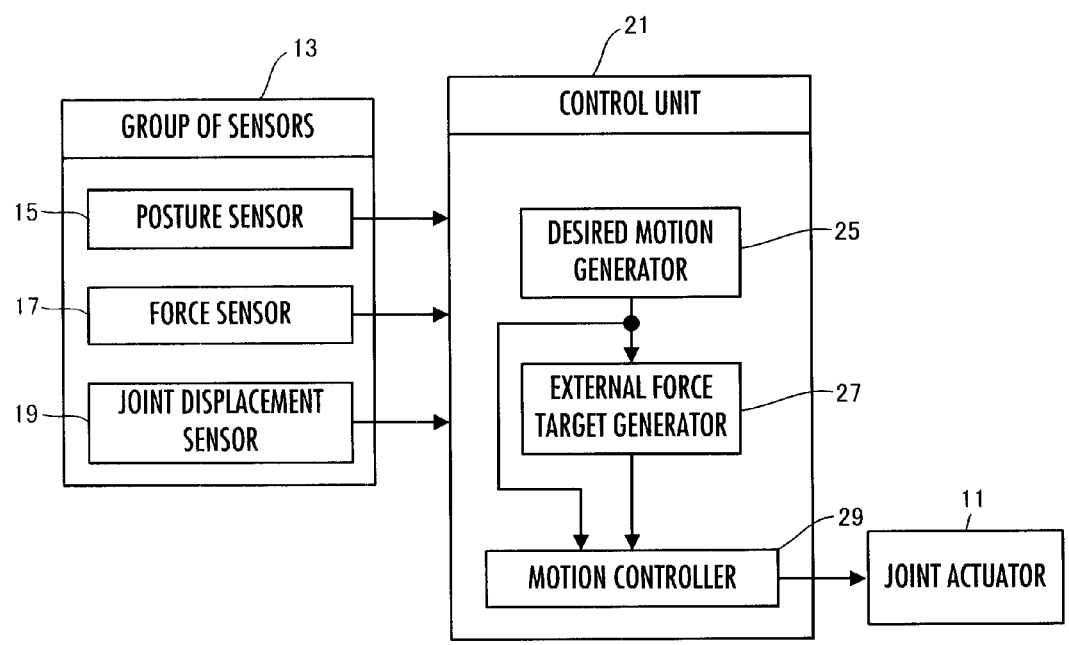
FIG. 2 is a block diagram illustrating the functions of a control unit and a group of sensors provided in the robot shown in FIG. 1.

Referring now to FIG. 2, the robot 1 constructed as described above is provided with a group of sensors 13 used for controlling the motion of the robot 1 and a control unit 21 constructed of an electronic circuit unit, which primarily includes a CPU, a RAM, a ROM, and a drive circuit of the joint actuator 11.

The group of sensors 13 in the present embodiment has a posture sensor 15 for measuring the spatial posture of the body 3 as a representative link (representative portion) of the robot 1, force sensors 17 for measuring external forces acting on the distal ends of the link mechanisms 5, and joint displacement sensors 19 for measuring the displacement amounts of the joints 9 (the rotational angles in the present embodiment).

In this case, the posture sensor 15 composed of, for example, an angular velocity sensor (rate sensor), such as a gyro-sensor, and an acceleration sensor is mounted on the body 3, as illustrated in FIG. 1. Each of the force sensors 17 composed of a 6-axis force sensor capable of detecting, for example, translational forces in the directions of three axes, and moments about three axes, is interposed between the joint 9 located at the most distal end of each of the link mechanisms 5 and the distal link 7a, as illustrated in FIG. 1. Further, each of the joint displacement sensors 19 is formed of, for example, an encoder or a potentiometer, installed in each of the joints 9.

The control unit 21 is installed in a proper portion of the robot 1, such as the body 3. As major features of the control unit 21 which are implemented by an installed program or the like, the control unit 21 has a desired motion generator 25 that sequentially generates and outputs a desired motion of the robot 1, an external force target generator 27 that sequentially generates a target related to an external force to be applied to the robot 1 from the outside using the desired motion and outputs of the group of sensors 13, and a motion controller 29 which controls a motion of the robot 1 (controls driving of the joint actuator 11) according to the desired motion and the target related to the external force.

While details of processing by the desired motion generator 25 and the external force target generator 27 will be described later, a desired motion (an instantaneous value) generated by the desired motion generator 25 is composed of a desired displacement amount of each of the joints 9 and a desired position and a desired posture in a global coordinate system of a representative link (the body 3 in the present embodiment) of the robot 1. To be more accurate, the desired position of the representative link (the body 3) is a desired position of a representative point set in the representative link. In addition, the global coordinate system is fixed relative to the outside world of the robot 1.

When the distal links 7a of one or more link mechanisms 5 are brought into contact with a surface to be contacted in an outside world, the target related to an external force (instantaneous value) generated by the external force target generator 27 is composed of a desired value of an external force (a desired external force) to be applied to the robot 1 from the surface to be contacted and desired external force action points serving as the desired positions of the action points of the external force. In this case, the desired external force in the present embodiment is composed of a desired value of a translational external force (a desired translational force), which is a translational force component of the external force, and a desired value of a twisting force, i.e., a moment external force (a desired twisting force) in the external force, about the axis in a direction perpendicular to the surface to be contacted in the outside world among the external force.

The action point of the external force to be applied to the robot 1 from a surface to be contacted means a point at which a component of a moment about an axis parallel to the surface to be contacted is zero, the moment being generated about the action point by entire external force acting on the robot from the surface to be contacted. If the robot 1 simply travels on a floor, then the action point is a point corresponding to the so-called floor reaction force central point. The same applies to the external force action points on the virtual surfaces to be described later.

Supplementarily, according to the present embodiment, in addition to processing for generating a desired motion, the desired motion generator 25 also executes processing for setting an existence permissible region of the desired external force action point and a provisional external force action point that is a provisional desired external force action point.

Further, if the total degree of freedom of one of the link mechanisms 5 of the robot 1 is six degrees, then specifying the position and the posture of the distal link 7a of the link mechanism 5 in relation to the body 3 will uniquely determine the displacement amount of the joint 9 of the link mechanism 5. Hence, in the link mechanism 5 having the six degrees of freedom, the desired position and the desired posture of the distal link 7a of the link mechanism 5 may be used as a constituent element of the desired motion in place of the desired displacement amount of the joint 9 of the link mechanism 5.

Further, as necessary, the desired values of a predetermined motional state amount of the robot 1, such as the desired values of the position, the velocity and the acceleration of an overall center-of-gravity point of the robot 1 or the desired values of the position and the posture of a particular portion of the robot 1 other than the body 3 may be included in the constituent elements of a desired motion generated by the desired motion generator 25.

In addition, according to the present embodiment, the external force target generator 27 also has a function for assessing a desired motion generated by the desired motion generator 25. Next, if the generated desired motion is appropriate, then the external force target generator 27 sequentially carries out the processing for determining desired external forces and desired external force action points. If the result of the assessment indicates that the desired motion is inappropriate, then the external force target generator 27 interrupts the processing for determining the desired external forces and the desired external force action points.

The motion controller 29 controls the respective joints 9 of the robot 1 through the intermediary of the joint actuators 11 corresponding thereto such that an actual motion of the robot 1 follows the desired motion generated by the desired motion generator 25 and the desired external force generated by the external force target generator 27. This control is performed by, for example, a known compliance control.

The processing by the desired motion generator 25 and the external force target generator 27 will now be described in detail. In the following description, to distinguish the four link mechanisms 5, reference characters 5a, 5b, 5c and 5d will be used, as illustrated in FIG. 1.

The control unit 21 according to the present embodiment is capable of controlling motions of the robot 1 in a variety of operating environments.

However, the control processing by the control unit 21 and, more particularly, the processing by the external force target generator 27 according to the present embodiment becomes characteristic when a desired motion of the robot 1 is a desired motion for causing the robot 1 to implement a motion while having a plurality of portions of the robot 1 in contact with a plurality of mutually different surfaces to be contacted existing in an outside world (an operating environment) of the robot 1.

Hence, in the following description, for the convenience of understanding the present embodiment, a desired motion, which is an example for causing the robot 1 to carry out a motion while keeping the distal links 7a of the plurality of link mechanisms 5 of the robot 1 in contact with a plurality of surfaces to be contacted, will be presented as a reference. Further, processing by the desired motion generator 25 and the external force target generator 27 will be described by explaining the processing for generating the example desired motion, as appropriate.

As illustrated in FIG. 1, the operating environment of the robot 1 related to the desired motion to be referentially illustrated in the following description of the present embodiment has, for example, a floor surface FL, two wall surfaces WL1 and WL2 standing substantially vertically from the floor surface FL, as the mutually different surfaces to be contacted in the outside world of the robot 1. In this case, the two wall surfaces WL1 and WL2 are surfaces to be contacted opposing in parallel or substantially in parallel to each other with an interval provided therebetween.

Further, the desired motion to be referentially illustrated in the description of the present embodiment is a desired motion for causing the robot 1 to climb the two wall surfaces WL1 and WL2 from the floor surface FL between the wall surfaces. Hereinafter, this desired motion may be referred to as the wall climbing gait in some cases.

The motion mode of the robot 1 in the wall climbing gait will be described below with reference to FIGS. 3(a), 3(b), and 3(c) and FIGS. 4(a) and 4(b). The instantaneous motional states of the robot 1 in the wall climbing gait (the motional states from time t1 to time t5) are illustrated in a time-series order in FIGS. 3(a), 3(b), and 3(c) and FIGS. 4(a) and 4(b).

In these figures, for the sake of convenience, the element links 7 of the link mechanisms 5 and the joints 9 of the robot 1 are not shown, and the link mechanisms 5 are shown as line segments connecting the proximal ends thereof (the ends thereof adjacent to the body 3) and the distal ends thereof. In this case, in the figures, the distal ends of the link mechanisms 5 are shown in the form of dots, while they are actually the aforesaid plate-shaped distal links 7a.

Arrows F1 to F10 in the figures visually denote examples of external forces (translational external forces) acting on the robot 1 from the surface to be contacted FL or WL1 or WL2 in the motional states of the robot 1 illustrated in the figures. In this case, the start points of the translational external forces F1 to F10 correspond to the action points (external force action points) of the translational external forces applied to the robot 1 from the surface to be contacted FL or WL1 or WL2.

Further, in the figures, circled areas AR1 to AR12 indicated on the surface to be contacted FL or WL1 or WL2 visually denote approximate areas in which the action points of external forces applied from the surface to be contacted FL or WL1 or WL2 to the robot 1 may exist in the motional states of the robot 1 illustrated in the figures. In a surface to be contacted with which only the distal end of a single one of the link mechanisms 5 is in contact, the area in which external force action points may exist is an area in the surface of contact between the distal link 7a of the single link mechanism 5 and the surface to be contacted.

Further, the area in which the external force action points may exist in the surface to be contacted with which the distal ends of the plurality of link mechanisms 5 are in contact is an area composed of combined areas in the contact surfaces between each of the distal links 7a of the plurality of link mechanisms 5 and the surface to be contacted (i.e., an area corresponding to a supporting polygon).

Figure 3C:
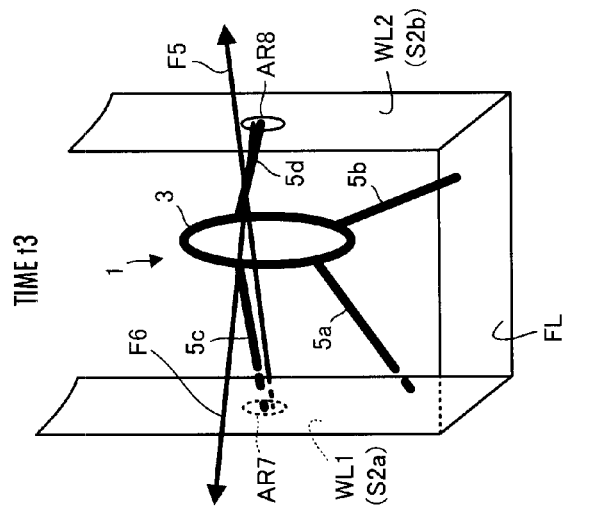
FIGS. 3(a) to 3(c) are diagrams illustrating in a time-series manner the instantaneous motional states of the robot in a wall climbing gait given as an example of a desired gait of the robot shown in FIG. 1.

The following will describe the wall climbing gait with reference to the figures. FIG. 3(a) illustrates the initial state of the wall climbing gait. In the initial state, the robot 1 stands on the floor surface FL between the wall surfaces WL1 and WL2 with the distal ends of the two link mechanisms 5a and 5b of the robot 1 in contact with the floor surface FL (the ground). To begin the motion of the wall climbing gait of the robot 1, the robot 1 moves the distal end of a link mechanism 5c adjacent to the wall surface WL1 out of the remaining link mechanisms 5c and 5d into contact with the wall surface WL1 and also the distal end of the link mechanism 5d adjacent to the wall surface WL2 into contact with the wall surface WL2.

In this case, in the initial state illustrated in FIG. 3(a), as the external force for supporting the self weight of the robot 1 (more accurately, the resultant force of the gravitational force acting on the robot 1 and the inertial force generated by a motion of the robot 1), an external force indicated by, for example, the arrow F1 acts on the robot 1 from the area AR1 of the floor surface FL. In the illustrated example, the external force acting from the wall surfaces WL1 and WL2 onto the robot 1 is zero.

Subsequently, the motional state of the robot 1 shifts to the state illustrated in FIG. 3(b). The motional state shown in FIG. 3(b) indicates the shift from the initial state shown in FIG. 3(a) effected by lifting the distal end of one of the link mechanisms 5a and 5b (the link mechanism 5a in the illustrated example) from the floor surface FL while pushing the distal ends of the link mechanisms 5c and 5d in contact with the wall surfaces WL1 and WL2, respectively, in the initial state shown in FIG. 3(a) against the wall surfaces WL1 and WL2, respectively.

Figure 3B:
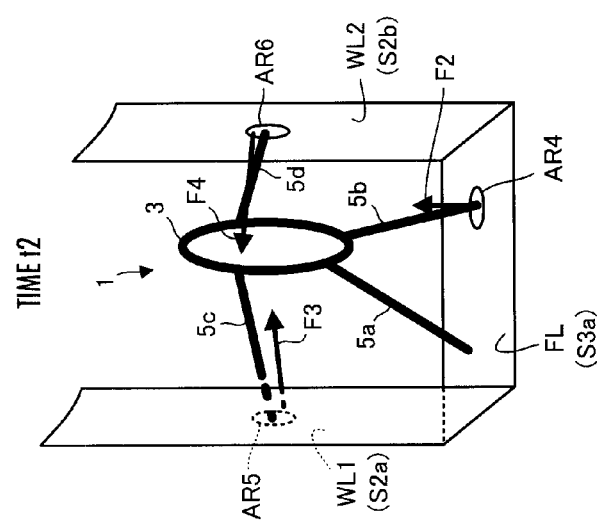
Figure 3A:
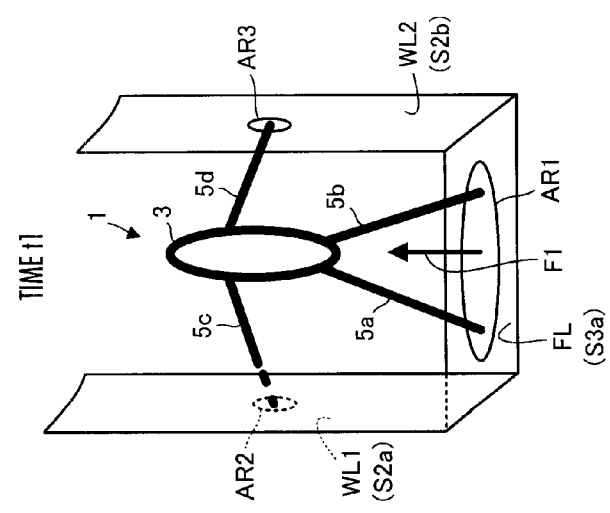

In this case, in the motional state shown in FIG. 3(b), as the external forces for supporting the self weight of the robot 1, the external force indicated by, for example, the arrow F2 acts from the area AR4 of the floor surface FL onto the robot 1 and also the external forces indicated by the arrows F3 and F4 (the external forces having upward frictional force components) act onto the robot 1 from the area AR5 of the wall surface WL1 and the area AR6 of the wall surface WL2.

Subsequently, the motional state of the robot 1 shifts to the state illustrated in FIG. 3(c). The motional state shown in FIG. 3(c) indicates the shift from the motional state shown in FIG. 3(b) effected by increasing the pressing force of the distal ends of the link mechanisms 5c and 5d pushed against the wall surfaces WL1 and WL2 in the motional state shown in FIG. 3(b) and also lifting the link mechanism 5b, which has been in contact with the floor surface FL in the motional state shown in FIG. 3(b), off the floor surface FL (i.e., lifting both the link mechanisms 5a and 5b off the floor surface FL).

In this case, in the motional state shown in FIG. 3(c), as the external forces for supporting the self weight of the robot 1, the external forces indicated by, for example, the arrows F5 and F6 (external forces having upward frictional force components) act from the area AR7 of the wall surface WL1 and the area AR8 of the wall surface WL2 onto the robot 1.

Subsequently, the motional state of the robot 1 shifts to the state illustrated in FIG. 4(a). The motional state in FIG. 4(a) illustrates the shift from the motional state in FIG. 3(c) effected by bringing the distal end of the link mechanism 5a out of the link mechanisms 5a and 5b, which have been lifted off the floor surface FL by the shift to the motional state in FIG. 3(c), into contact with the wall surface WL1 at below the distal end of the link mechanism 5c and also bringing the distal end of the link mechanism 5b into contact with the wall surface WL2 at below the distal end of the link mechanism 5d.

In this case, the motional state in FIG. 4(a) illustrates a state immediately after the link mechanisms 5a and 5b are brought into contact with the wall surfaces WL1 and WL2, respectively. In this state, for example, an external force indicated by the arrow F7 (an external force having an upward frictional force component) acts on the robot 1, using a point adjacent to the distal end of the link mechanism 5c as the external force action point in the area AR9 of the wall surface WL1, and an external force indicated by the arrow F8 (an external force having an upward frictional force component) acts on the robot 1, using a point adjacent to the distal end of the link mechanism 5d as the external force action point in the area AR10 of the wall surface WL2.

Then, while maintaining the motional state of the robot 1 illustrated in FIG. 4(a) where the link mechanisms 5a and 5c are in contact with the wall surface WL1 and the link mechanisms 5b and 5d in contact with the wall surface WL2, the pressing forces of the link mechanisms 5a and 5b on the lower side applied to the wall surfaces WL1 and WL2, respectively, are gradually increased, whereas the pressing forces of the link mechanisms 5c and 5d on the upper side applied to the wall surfaces WL1 and WL2, respectively, are gradually decreased.

Thus, the point of action of the external force applied from the wall surface WL1 to the robot 1 is moved closer toward the distal end of the link mechanism 5a in the area AR9, while the point of action of the external force applied from the wall surface WL2 to the robot 1 is moved toward the distal end of the link mechanism 5b in the area AR10. Eventually, the point of action of the external force applied from the wall surface WL1 to the robot 1 is moved into a contact surface between the distal end of the link mechanism 5a and the wall surface WL1, while the point of action of the external force applied from the wall surface WL2 to the robot 1 is moved into a contact surface between the distal end of the link mechanism 5b and the wall surface WL2.

Subsequently, the motional state of the robot 1 shifts to the state illustrated in FIG. 4(b). The motional state in FIG. 4(b) illustrates the shift from the motional state in FIG. 4(a) effected by detaching one of the distal ends of the link mechanisms 5c and 5d (the distal end of the link mechanism 5c in the illustrated example) from the wall surface WL1 while maintaining the state in which the link mechanisms 5a and 5b are pressed against the wall surfaces WL1 and WL2 after moving the action points of the external forces applied to the robot 1 from the wall surfaces WL1 and WL2 as described above in the motional state of FIG. 4(a).

In this case, in the motional state illustrated in FIG. 4(b), as the external forces for supporting the self weight of the robot 1, the external force indicated by the arrow F9 (an external force having an upward frictional force component) acts on the robot 1 from the area AR11 of the wall surface WL1 and the external force indicated by the arrow F10 (an external force having an upward frictional force component) acts on the robot 1 from the area AR12 of the wall surface WL2.

After that, the distal end of the link mechanism 5d is also detached from the wall surface WL2. Then, the distal ends of the link mechanisms 5c and 5d which have been detached from the wall surfaces WL1 and WL2 are brought back into contact with the wall surfaces WL1 and WL2 at higher levels than those in the motional state illustrated in FIG. 4(a). Thereafter, the series of the same motions from the motional state illustrated in FIG. 3(b) is repeated, thereby causing the robot 1 to climb the wall surfaces WL1 and WL2.

The above is the outline of the wall climbing gait.

The desired motion generator 25 that generates a desired motion such as the wall climbing gait described above receives travel command data stored and retained beforehand in the control unit 21 or travel command data input to the control unit 21 from an external source through radio communication, and environmental information related to surfaces to be contacted and the like existing in the outside world of the robot 1.

The travel command data mainly includes data that specifies, for example, the travel start time, the travel route, how to travel and the like of the robot 1. The environmental information is composed of, for example, the information necessary for recognizing the relative position and the relative posture of a surface to be contacted (e.g., the floor surface FL, the wall surface WL1 or WL2) in the outside world of the robot 1 with respect to the robot 1 and the information necessary for recognizing the properties (e.g., a frictional coefficient) of each surface to be contacted.

The environmental information may be the one input to the control unit 21 through wireless communication from an outer source or the one stored and retained beforehand in the control unit 21, or may be information recognized by the control unit 21 on the basis of an output of a sensor for recognizing an environment, such as an imaging camera (not shown) mounted on the robot 1.

Based on the travel command data and environmental information, the desired motion generator 25 sets a condition that restricts the motion of the robot 1 (a condition to be satisfied by a desired motion of the robot 1) and sequentially generates and outputs a desired motion of the robot 1 by arithmetic processing of inverse kinematics such that the condition is satisfied.

In this case, basically, the conditions that restrict the motion of the robot 1 are set as appropriate according to a required type of motion of the robot 1. The restricting conditions may include, for example, a condition that restricts the motion of the distal end of each of the link mechanisms 5 (e.g., the desired time at which the distal link 7a of each of the link mechanisms 5 is brought into contact with a surface to be contacted in the outside world, the desired contact position on the surface to be contacted at the time of the contact, the desired posture of the distal link 7a at the time of the contact, and the desired position and posture of the distal link 7a that is not in contact with a surface to be contacted in the outside world at certain time or period of time) and a condition that restricts the motion of the body 2 (e.g., the desired position and posture of the body 2 at certain time or in a period of time).

In place of or in addition to the conditions that restrict the motion of the body 2, a condition that restricts a predetermined state amount related to the motion of the robot 1 (e.g., the translational momentum of the entire robot 1 or a desired angular momentum) may be used. Further, the restricting conditions generally include a mechanical restricting condition, such as the movable range of the joints 9 of the robot 1 or the permissible range of the moving velocity (the changing velocity of the displacement amount of the joint 9).

When generating the wall climbing gait, the desired motion generator 25 determines a condition that restricts the motion of the robot 1 (e.g., a restricting condition that includes a condition that restricts the motion of the distal end of each of the link mechanisms 5 and a condition that restricts the motion of the body 3) such that a motion is performed to cause the distal end of each of the link mechanisms 5 of the robot 1 to come in contact with one of the surfaces to be contacted FL, WL1, and WL2 in a time-series manner described with reference to FIG. 3 and FIG. 4. Then, the desired motion generator 25 generates the time-series of a desired motion of the robot 1 by the arithmetic processing of inverse kinematics such that the restricting condition is satisfied. The desired motion is generated not to discontinuously change (in steps).

Further, the desired motion generator 25 determines the existence permissible region of the desired external force action point and the provisional external force action points in each surface to be contacted (a surface with which the distal link or links 7a of one or a plurality of link mechanisms 5 are in contact) on the basis of the desired motion determined as described above.

In this case, the desired motion generator 25 first sets the existence permissible region of an external force action point in each surface to be contacted on the basis of the desired motion generated as described above. More specifically, the desired motion generator 25 sets the existence permissible region of an external force action point in a contact surface between the surface to be contacted and the distal link 7a in a surface to be contacted with which only the distal link 7a of one of the link mechanisms 5 is to be brought into contact in the desired motion generated as described above. In the contact surface between the surface to be contacted and the distal link 7a, the existence permissible region is set to an area which is not excessively close to the boundary of the contact surface.

Further, in the surface to be contacted with which the distal links 7a of two or more link mechanisms 5 are to be brought into contact, the desired motion generator 25 sets the existence permissible region of the external force action point in an area formed by connecting each contact surface between the surface to be contacted and each of the distal links 7a (a so-called supporting polygon area). The existence permissible region is set in the supporting polygon area such that the area is not excessively close to the boundary of the supporting polygon area.

Subsequently, the desired motion generator 25 determines the point in the existence permissible region of the external force action point set as described above (e.g., the central point in the existence permissible region) as the provisional external force action point. The provisional external force action point on each surface to be contacted is determined such that the position of the action point will not discontinuously change (in steps) in a period of time during which the state, where any one of the link mechanisms 5 is in contact with the surface to be contacted, continuously continues.

Figure 5A:
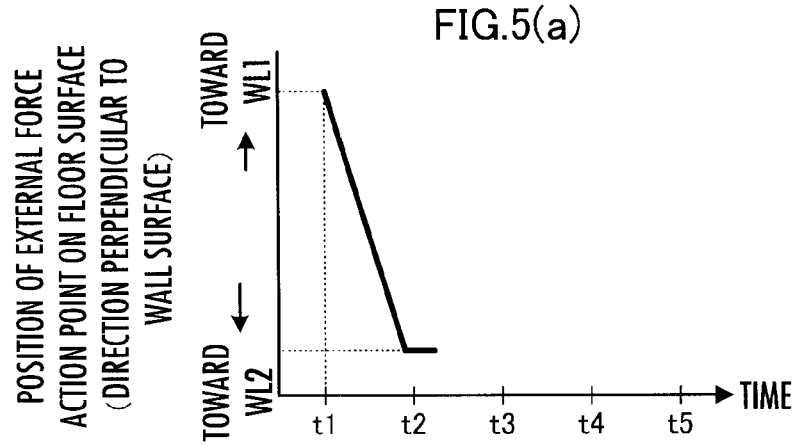
FIG. 5(a) to FIG. 5(c) are graphs illustrating examples of the time-dependent changes in a set position of an external force action point in the wall climbing gait.
Figure 5B:
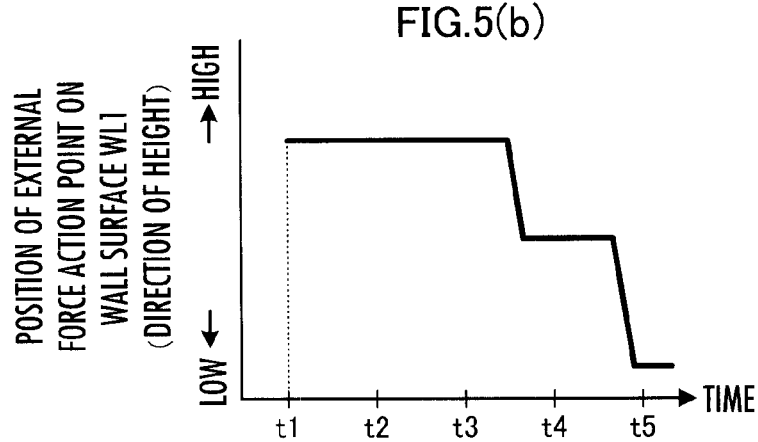
Figure 5C:
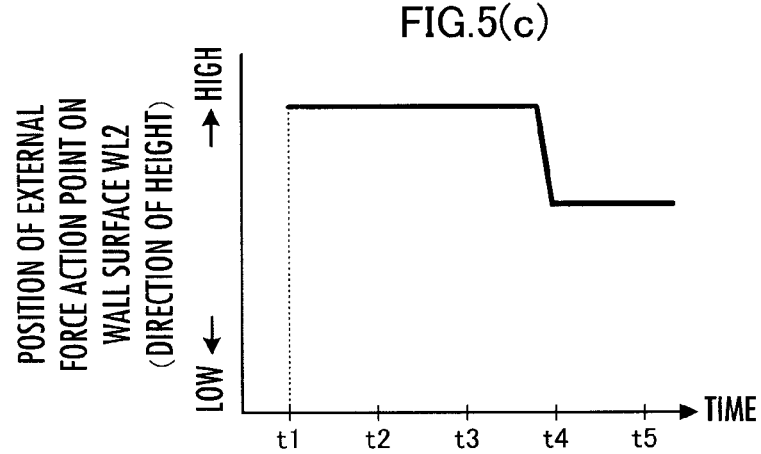

When the desired motion generator 25 generates the wall climbing gait illustrated in FIG. 3 and FIG. 4, the provisional external force action point is generated in the time-series patterns illustrated in, for example, FIGS. 5(a), 5(b) and 5(c), respectively. Time t1 to t5 on the axes of abscissas in FIGS. 5(a) to 5(c) indicate the time corresponding to the motional states shown in FIG. 3(a), FIG. 3(b), FIG. 3(c), FIG. 4(a) and FIG. 4(b), respectively, in this order.

In the examples illustrated in FIGS. 5(a) to 5(c), the position of the provisional external force action point on the floor surface FL (the position in a direction perpendicular to the wall surfaces WL1 and WL2) is determined such that the provisional external force action point continuously moves from the wall surface WL1 to the wall surface WL2 by immediately before time t2 from time t1, as illustrated in FIG. 5(a).

Further, the position of the provisional external force action point (the position in the direction of height) on the wall surface WL1 is determined such that the position of the provisional external force action point is maintained at a fixed position (a position within the contact surface between the wall surface WL1 and the distal end of the link mechanism 5c) until the midway time between time t3 and time t4, then continuously moves downward from the midway time to immediately before time t4, as illustrated in FIG. 5(b).

Subsequently, the position of the provisional external force action point on the wall surface WL1 is determined such that the position is maintained at a fixed position (an intermediate position between the surface of contact of the distal end of the link mechanism 5c with the wall surface WL1 and the surface of contact of the distal end of the link mechanism 5a with the wall surface WL1) until the midway time between time t4 and time t5, then continuously moves downward until the time immediately before time t5, and maintained again at a fixed position (a position in the contact surface between the wall surface WL1 and the distal end of the link mechanism 5a) during a period before and after time t5.

Further, the position of the provisional external force action point on the wall surface WL2 (the position in the direction of height) is determined such that the position is maintained at a fixed position (a position in the contact surface between the wall surface WL2 and the distal end of the link mechanism 5d) until the midway time between time t3 and time t4, then continuously moves downward from the midway time until the time immediately before time t4, and thereafter maintained again at a fixed position (an intermediate position between the surface of contact of the distal end of the link mechanism 5d with the wall surface WL2 and the surface of contact of the distal end of the link mechanism 5b with the wall surface WL2) during a period until the time immediately after time t5.

Figure 6:
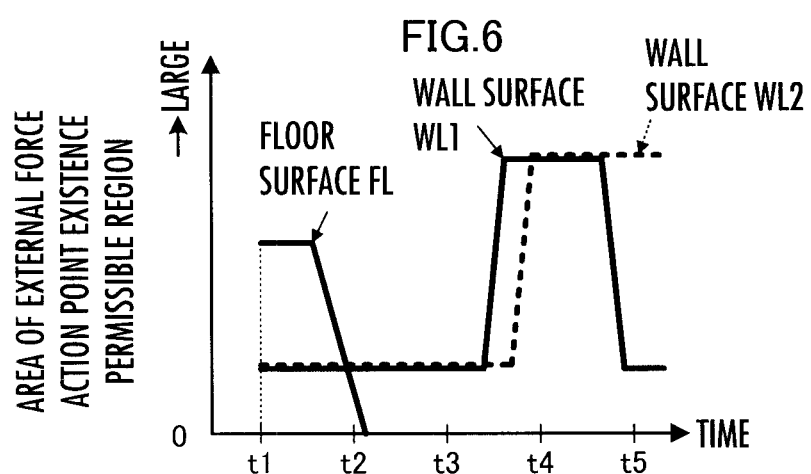
FIG. 6 is a graph illustrating an example of the time-dependent changes in the area of an existence permissible range of an external force action point in the wall climbing gait.

In this case, the area of the existence permissible region of the external force action point in each of the floor surface FL, the wall surface WL1, and the wall surface WL2 is set such that the area continuously changes in the pattern illustrated in, for example, FIG. 6.

Supplementarily, a desired motion generated by the desired motion generator 25 basically need simply to formally (at least kinematically) meet a requirement related to a motion to be implemented by the robot 1. In other words, the dynamic feasibility of the desired motion may not be accurately ensured. Hence, there may be a case where it is actually difficult to apply an external force, which should be applied to the robot 1 in order to implement the desired motion, to the robot 1 or a case where the external force deviates from a suitable range (e.g., a case where the external force is excessively large).

In addition, a desired motion need not necessarily be generated in real-time when the robot 1 is in motion. For example, a desired motion and an existence permissible region of an external force action point created in advance using an appropriate computer may be stored and retained beforehand in the control unit 21 or may be input to the control unit 21 via wireless communication or the like to be sequentially output to the external force target generator 27 and the motion controller 29. In this case, the desired motion generator 25 is no longer required.

The processing by the external force target generator 27 will now be described in detail. The external force target generator 27 receives a desired motion output from the desired motion generator 25 and the existence permissible regions of a provisional external force action point and an external force action point. The external force target generator 27 also receives the environmental information mentioned above.

Figure 7:
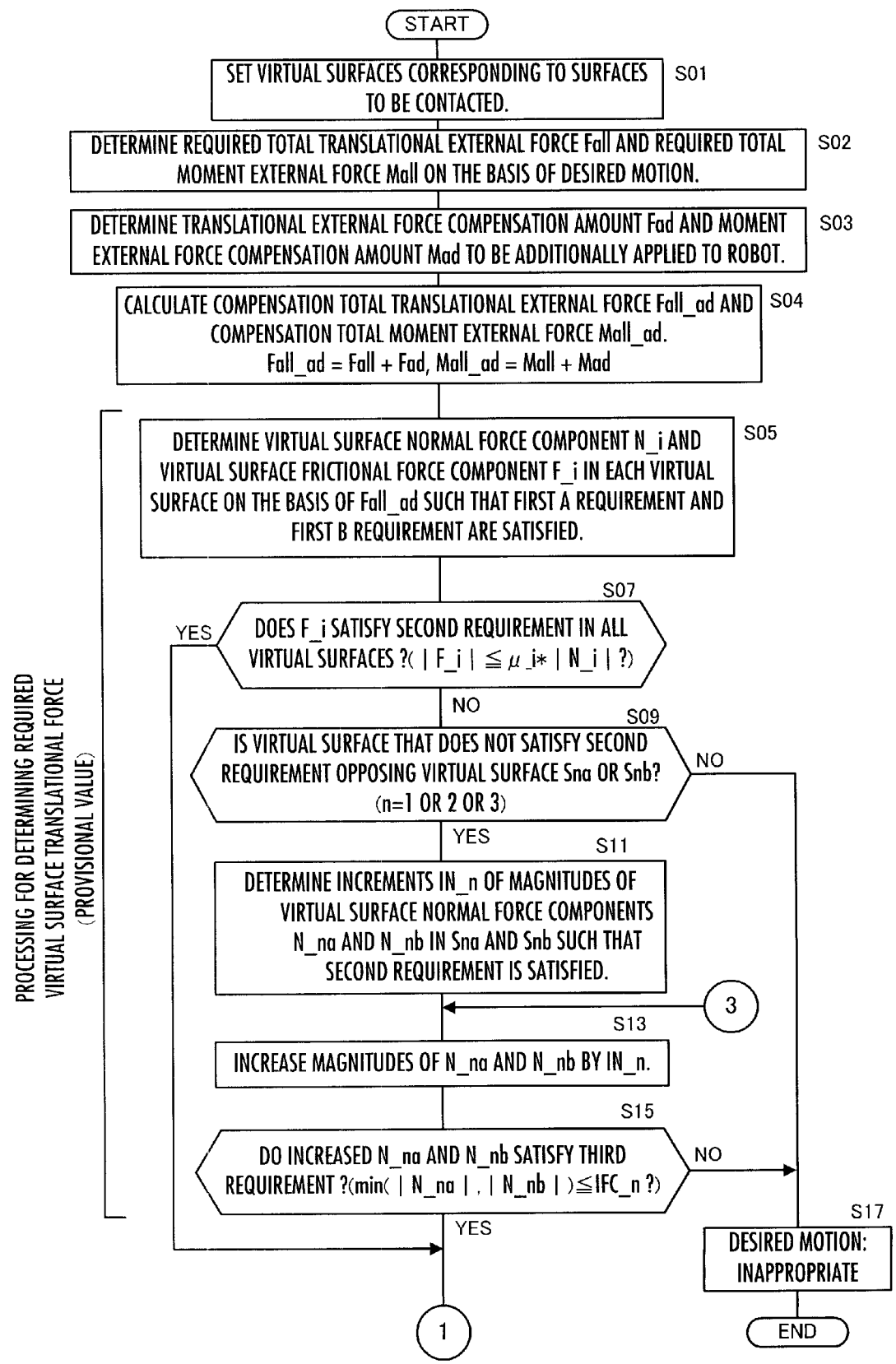
FIG. 7 to FIG. 9 are flowcharts illustrating the processing carried out by an external force target generator shown in FIG. 2 in a first embodiment.
Figure 8:
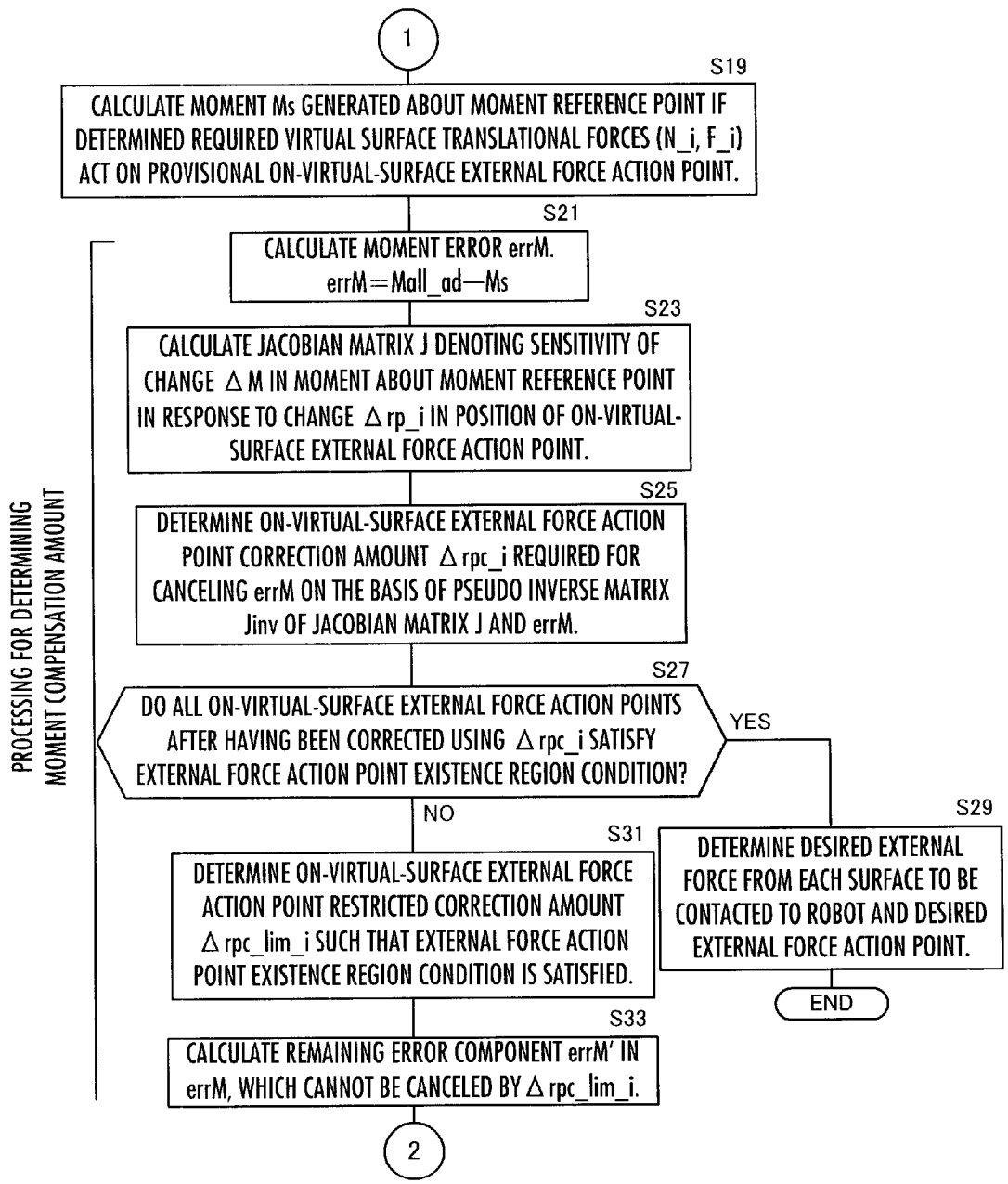
Figure 9:
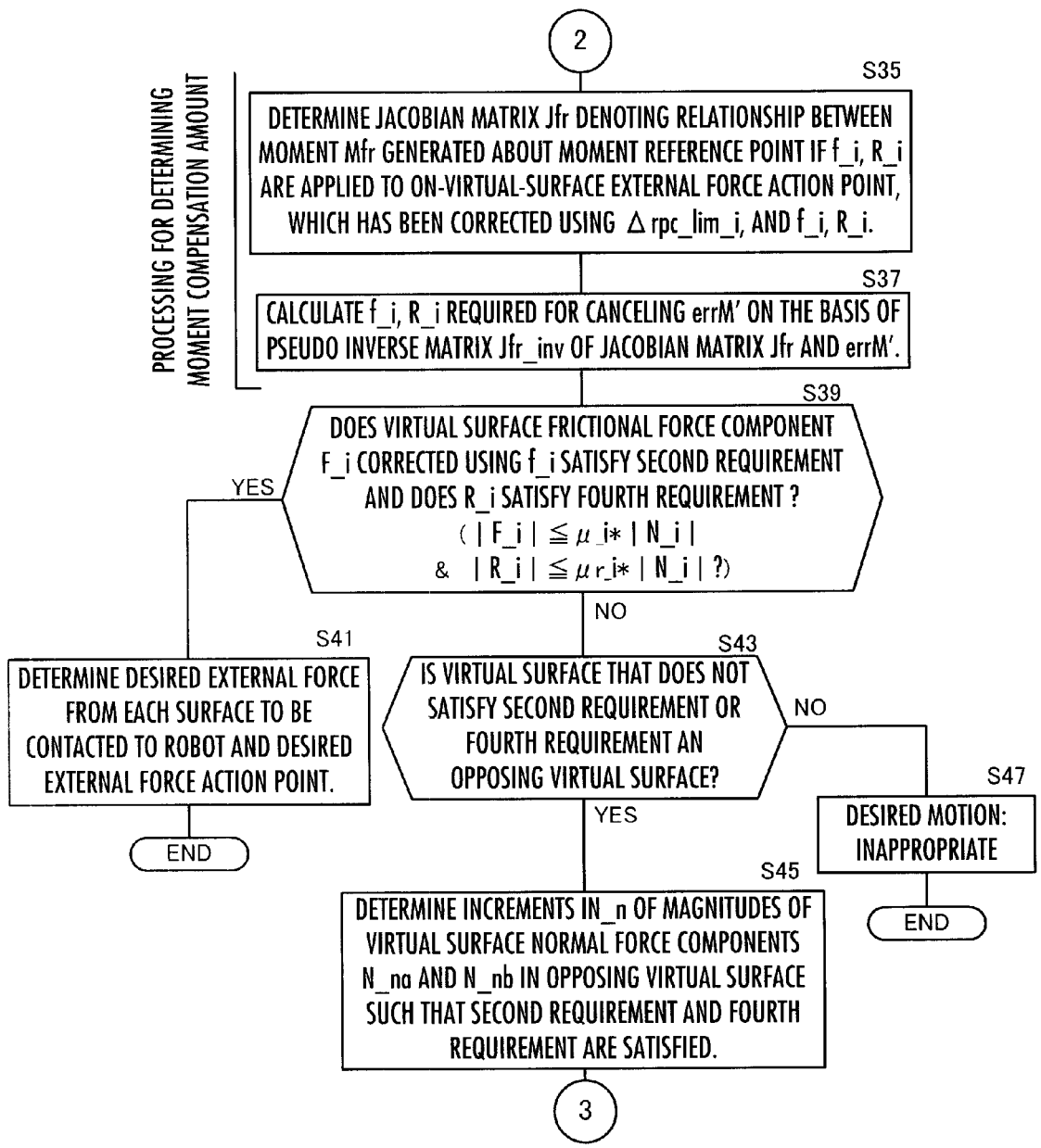

Then, the external force target generator 27 carries out the processing illustrated by the flowcharts of FIG. 7 to FIG. 9 by using the received data so as to determine the desired external force and the desired position of the action point thereof as the targets related to the external force. The processing illustrated by the flowcharts of FIG. 7 to FIG. 9 is for determining the instantaneous values of the desired external force and the desired external force action point while assessing the motional state of the robot 1 at the time of each arithmetic processing cycle of the control unit 21. When the motional state of the robot 1 is appropriate, the desired external force and the desired external force action point are sequentially determined by sequentially executing this processing at predetermined cycles.

In the following description related to the processing by the external force target generator 27, the time corresponding to the instantaneous values of the desired external force and the desired external force action point to be currently determined by the processing illustrated by the flowcharts of FIG. 7 to FIG. 9 is referred to as the current time. Further, the time preceding the current time is referred to as the previous time, and the time following the current time is referred to as the next time.

The external force target generator 27 first implements the processing in S01. In this step S01, the external force target generator 27 sets a working virtual surface used in arithmetic processing for determining the desired external force and the desired external force action point at the current time on the basis of a desired motion and environmental information such that the virtual surface coincides with or approximates to each surface to be contacted in the outside world of the robot 1 (a surface to be contacted with which the distal end of one of the link mechanisms 5 is to be brought into contact at the current time in the desired motion).

Figure 10:
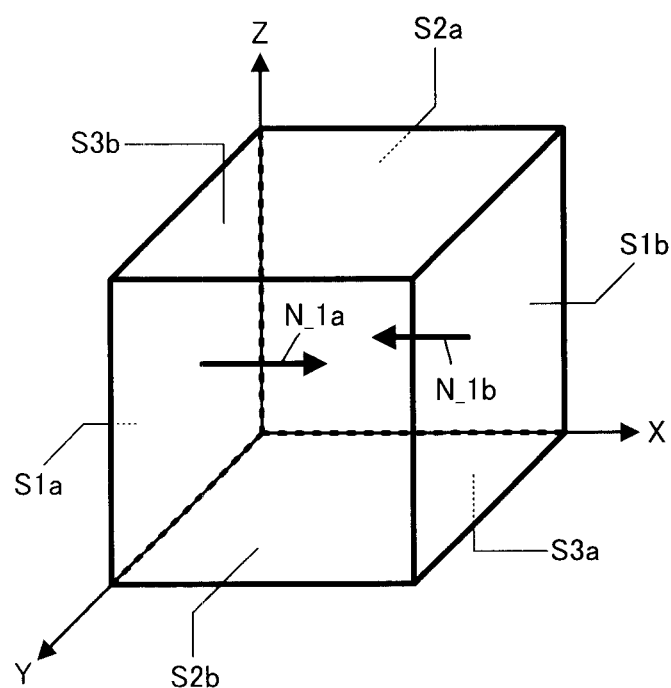
FIG. 10 is a diagram for describing a virtual surface set in S01 of FIG. 7.

Here, according to the present embodiment, in order to impart versatility to the algorithm of the processing carried out by the external force target generator 27 and to make it easy to configure the algorithm, six planes S1a, S2a, S3a, S1b, S2b, and S3b having mutual posture relationships established beforehand are prepared as the surfaces that can be used as the working virtual surfaces, as illustrated in FIG. 10. Further, in the processing carried out by the external force target generator 27, the external force to be applied to the robot 1 from each surface to be contacted in order to achieve a desired motion of the robot 1 is regarded as the external force to be applied to the robot 1 from a virtual surface corresponding to each of surface to be contacted.

In this case, according to the present embodiment, the virtual surfaces S1a, S2a and S3a among the six virtual surfaces are prepared as the planes that are orthogonal to each other, while the virtual surfaces S1$b$, S2$b$ and S3$b$ are prepared as the planes that are parallel to the virtual surfaces S1$a$, S2$a$ and S3$a$, respectively.

Further, two virtual surfaces opposing in parallel to each other are set such that the directions of the normal forces that can be generated by the virtual surfaces are opposite to each other (in the direction from a virtual surface toward a virtual surface opposing thereto). For example, as illustrated in FIG. 10, in the case where a 3-axis orthogonal coordinate system (an XYZ coordinate system) is assumed, the directions of the normal forces N_1$a$ and N_1$b$ that can be generated by the virtual surfaces S1$a$ and S1$b$ that are orthogonal to an X-axis are the positive direction of the X-axis direction (the direction from S1$a$ toward S1$b$) and the negative direction of the X-axis direction (the direction from S1$b$ toward S1$a$). The same applies to the set of the virtual surfaces S2$a$, S2$b$ that are orthogonal to a Y-axis and the set of the virtual surfaces S3$a$ and S3$b$ that are orthogonal to a Z-axis.

Further, in the processing in S01, the external force target generator 27 associates one of the virtual surfaces S1$a$, S2$a$, S3$a$, S1$b$, S2$b$, and S3$b$ to one of the surfaces to be contacted (more accurately, the surface of contact of each surface to be contacted with the distal end of the link mechanism 5 of the robot 1) in the outside world at the current time. Then, the external force target generator 27 virtually sets the same number of virtual surfaces as that of the surfaces to be contacted at the current time for the outside world of the robot 1 (the outside world recognized by the environmental information) such that the virtual surface associated with the surface to be contacted at the current time coincides with or approximates to the surface to be contacted corresponding thereto. Setting a virtual surface in the outside world means to determine the layout position and posture of the virtual surface in the outside world.

In this case, if there are a plurality of surfaces to be contacted in the outside world at the current time, then the layouts of the virtual surfaces in the outside world (the layout of a virtual surface group consisting of the same number of virtual surfaces as that of the surfaces to be contacted) are determined such that a posture difference (a spatial angular difference) between each surface to be contacted (the surface of contact of each surface to be contacted with which the distal end of the link mechanism 5 of the robot 1 is in contact) and the virtual surface corresponding thereto becomes zero or approximates to zero as much as possible for any one of the surfaces to be contacted. The layout of a virtual surface group formed of the same number of virtual surfaces as the number of all surfaces to be contacted at the current time is determined such that, for example, the value obtained by adding, on all the surfaces to be contacted at the current time, the squared values or the absolute values of the spatial components (the angular difference components about three axes) of the aforesaid posture difference for each surface to be contacted is minimized. The above value to be obtained may alternatively be the mean value of the squared values or the absolute values.

According to the present embodiment, therefore, if there is a plurality of surfaces to be contacted in the outside world at the current time, then the plurality of virtual surfaces (the virtual surface group) set in S01 is constructed of the same number of virtual surfaces as the number of the surfaces to be contacted. Further, the mutual posture relationship of the plurality of virtual surfaces is such that any two virtual surfaces are orthogonal to each other or oppose in parallel to each other.

If the surfaces to be contacted at the current time have the same surface to be contacted as the surface to be contacted at the previous time, then the virtual surface associated with the same surface to be contacted at the current time will be maintained to be the same virtual surface as that at the previous time.

When the desired motion of the robot 1 is the wall climbing gait in the processing in S01 described above, the virtual surfaces are set, for example, as described below. At the time of the motional state illustrated in FIG. 3($a$) or 3($b$), three virtual surfaces (e.g., the virtual surfaces S3$a$, S2$a$ and S2$b$) including two virtual surfaces that are parallel to each other among the six virtual surfaces S1$a$, S2$a$, S3$a$, S1$b$, S2$b$, and S3$b$ are associated with the floor surface FL, the wall surface WL1, and the wall surface WL2, respectively, which are the surfaces to be contacted (refer to the parenthesized reference characters in the figure). Then, the layouts of the virtual surfaces S3$a$, S2$a$ and S2$b$ in the outside world of the robot 1 are determined such that the virtual surfaces S3$a$, S2$a$ and S2$b$ match or substantially match the floor surface FL, the wall surface WL1, and the wall surface WL2, respectively.

At the time of the motional states illustrated in FIG. 3($c$), FIG. 4($a$), and FIG. 4($b$), the virtual surfaces S2$a$ and S2$b$ associated with the wall surfaces WL1 and WL2 in the motional states shown in FIGS. 3($a$) and 3($b$) are directly associated with the wall surfaces WL1 and WL2, respectively (refer to the parenthesized reference characters in the figures). Then, the layouts of the virtual surfaces S2$a$ and S2$b$ in the outside world of the robot 1 are determined such that the virtual surfaces S2$a$ and S2$b$ match or substantially match the wall surfaces WL1 and WL2, respectively.

In the following description of the present embodiment, two virtual surfaces opposing in parallel to each other among the virtual surfaces set in S01 may be referred to as opposing virtual surfaces in some cases. This set of the opposing virtual surfaces in the present embodiment is one of the set of the virtual surfaces S1$a$ and S1$b$, the set of the virtual surfaces S2$a$ and S2$b$, and the set of the virtual surfaces S3$a$ and S3$b$. The opposing virtual surfaces of the sets may generically be denoted by the opposing virtual surfaces Sna and Snb (n=1 or 2 or 3) or simply by the opposing virtual surfaces Sna and Snb.

Referring back to the description related to FIG. 7, the external force target generator 27 subsequently carries out the processing in S02. In this step S02, on the basis of the desired motion prepared by the desired motion generator 25, the external force target generator 27 determines a required total translational external force Fall, i.e., a translational force component of a required total external force, which is the total external force to be applied to the robot 1 at the current time and a required total moment external force Mall, i.e., the component of a moment in the required total external force about a predetermined reference point, in order to implement the desired motion.

Here, the predetermined reference point (hereinafter referred to as the moment reference point) is a point fixed relative to an outside world of the robot 1 (e.g., a point set on a surface to be contacted in an outside world or on a virtual surface corresponding thereto). The moment reference point may be maintained to be a fixed point throughout the entire period of a desired motion or may be updated as necessary for every predetermined period of time of the desired motion.

In the processing by the external force target generator 27 in the present embodiment, the translational forces or moments, such as the required total translational external force Fall and the required total moment external force Mall, or the variables (vector amounts), such as spatial positions and postures, are described by means of a global coordinate system fixed in relation to a virtual surface set in S01 (e.g., a 3-axis orthogonal coordinate system (an XYZ coordinate system) set according to the position and posture relationship illustrated in FIG. 10 in relation to the virtual surfaces).

More specifically, the required total translational external force Fall and the required total moment external force Mall are determined as follows. To determine the required total translational external force Fall, the external force target generator 27 calculates a desired center-of-gravity acceleration denoted by a second-order differential value of the desired position of the overall center-of-gravity point of the robot 1 (a desired center-of-gravity acceleration at the current time) by using a geometric model (a rigid link model) of the robot 1 on the basis of the desired motion of the robot 1. Alternatively, the desired position of the overall center-of-gravity point of the robot 1 or the desired center-of-gravity acceleration may be calculated beforehand as the elements of the desired motion by the desired motion generator 25.

Then, the external force target generator 27 calculates, as the required total translational external force Fall, the translational force that balances the resultant force of the translational inertial force (the translational force component of an inertial force generated by a desired motion of the robot 1), which is calculated on the basis of the above desired center-of-gravity acceleration and the overall mass of the robot 1, and the gravitational force acting on the robot 1.

The overall translational inertial force of the robot 1 generated by a desired motion may alternatively be calculated by, for example, adding up the translational inertial force of the center-of-gravity point of each of the links 3 and 7 of the robot 1.

Further, when determining the required total moment external force Mall, the external force target generator 27 calculates, on the basis of a desired motion of the robot 1, the total sum of the inertial force moment (the moment component of an inertial force) at the current time, which is generated about the overall center-of-gravity point of the robot 1 by a desired motion of the robot 1 and the inertial force moment at the current time, which is generated about the moment reference point by the motion (translational motion) of the overall center-of-gravity point of the robot 1 in the desired motion, by using the geometric model (the rigid link model) of the robot 1. Then, the external force target generator 27 calculates the moment balancing the inertial force moment of the total sum as the required total moment external force Mall at the current time.

Alternatively, the time-series of the translational inertial force generated by the desired motion of the robot 1 and the time-series of the inertial force moment about the moment reference point may be calculated by the desired motion generator 25 beforehand. Further, the value of the translational inertial force and the value of the inertial force moment at the current time may be input from the desired motion generator 25 to the external force target generator 27.

After calculating the required total translational external force Fall and the required total moment external force Mall as described above, the external force target generator 27 subsequently carries out the processing in S03. In this step S03, the external force target generator 27 determines a translational external force compensation amount that is a translational force to be additionally applied to the robot 1 in order to resolve a difference between an actual value (an observed value based on an output of the group of sensors 13) of a first motional state amount of a predetermined type that is related to a translational motion of the robot 1 and a desired value of the first motional state amount defined by the desired motion (in order to approximate the difference to zero), and determines a moment external force compensation amount that is a moment (a moment about the moment reference point) to be additionally applied to the robot 1 in order to resolve a difference between an actual value (an observed value based on an output of the group of sensors 13) of a second motional state amount of a predetermined type that is related to a rotational motion of the robot 1 and a desired value of the second motional state amount defined by the desired motion (in order to approximate the difference to zero).

Here, an error occurs between an actual motional state of the robot 1 and a motional state defined by the desired motion that is attributable to an error or the like between an operating environment of the robot 1 assumed in the desired motion and an actual operating environment of the robot 1. The translational external force compensation amount and the moment external force compensation amount mean external forces to be additionally applied to the robot 1 for resolving or reducing such an error in motional states in order to stabilize the operational state of the robot 1.

In this case, the first motional state amount related to the translational external force compensation amount is a motional state amount that can be manipulated by adjusting the translational force among the external force to be applied to the robot 1. In addition, the second motional state amount related to the moment external force compensation amount is a motional state amount that can be manipulated by adjusting the moment among the external force to be applied to the robot 1. These motional state amounts may be motional state amounts of types that are conceivably favorable for stabilizing an operational state of the robot 1 to be implemented by the desired motion.

Specifically, in the present embodiment, for example, a position of an overall center-of-gravity point of the robot 1 is used as the first motional state amount. In addition, for example, an angular momentum about the overall center-of-gravity point of the robot 1 is used as the second motional state amount.

Further, the translational external force compensation amount for approximating an actual value of the first motional state amount to a desired value thereof is determined as follows.

That is, based on an input desired motion, the external force target generator 27 calculates a desired position of the overall center-of-gravity point (hereinafter referred to as the desired overall center-of-gravity point position) of the robot 1 at the current time using a geometric model (a rigid link model) of the robot 1. In addition, based on outputs of the joint displacement sensors 19 of the group of sensors 13, the external force target generator 27 calculates an observed value of an actual position of the overall center-of-gravity point (hereinafter referred to as the actual overall center-of-gravity point position) of the robot 1 at the current time.

Further, the external force target generator 27 calculates a difference $\Delta Pg$ between the desired overall center-of-gravity point position and the actual overall center-of-gravity point position, and calculates a translational external force compensation amount Fad using a feedback control law so as to approximate the difference $\Delta Pg$ to zero.

In this case, in the present embodiment, the external force target generator 27 calculates Fad according to expression 21 given below using, for example, a PD law (proportional-derivative law).

$$Fad = Kf1 * \Delta Pg + Kf2 * \Delta Pg' \qquad \text{Expression 21}$$

$\Delta Pg'$ in this expression 21 denotes a first-order differential value of $\Delta Pg$, and Kf1 and Kf2 respectively denote gain values set in advance. In the present description, the symbol "*" is used as the multiplication symbol. In this case, the symbol "*" used in the multiplication of vectors will mean an exterior product (vector product).

In addition, the moment external force compensation amount for approximating an actual value of the second motional state amount to a desired value thereof is determined as follows.

That is, based on an input desired motion, the external force target generator 27 calculates a desired value of the angular momentum (hereinafter referred to as the desired angular momentum) at the current time generated about the overall center-of-gravity point of the robot 1 by a desired motion of the robot 1 using a geometric model (a rigid link model) of the robot 1. In addition, based on outputs of the joint displacement sensors 19 of the group of sensors 13 and an output of the posture sensor 15, the external force target generator 27 calculates an observed value of the angular momentum (hereinafter referred to as the actual angular momentum) at the current time generated about the actual overall center-of-gravity point of the robot 1 by an actual motion of the robot 1 using a geometric model (a rigid link model) of the robot 1.

Further, the external force target generator 27 calculates a difference ΔLg between the desired angular momentum and the actual angular momentum, and calculates a moment external force compensation amount Mad using a feedback control law so as to approximate the difference ΔLg to zero.

In this case, in the present embodiment, the external force target generator 27 calculates Mad according to expression 22 given below using, for example, a PD law (proportional-derivative law).

$$Mad = Km1 * \Delta Lg + Km2 * \Delta Lg' + Pg * Fad \quad \text{Expression 22}$$

ΔLg' in this expression 22 denotes a first-order differential value of ΔLg, and Km1 and Km2 respectively denote gain values set in advance. In addition, Pg denotes a position vector (a position vector relative to the moment reference point) of the overall center-of-gravity point of the robot 1 at the current time. Further, Pg* Fad denotes a vector product of the position vector Pg and the translational external force compensation amount Fad calculated according to the expression 21.

In the present embodiment, a moment (Pg*Fad) is generated by a translational movement of the overall center-of-gravity point of the robot 1 which occurs when additionally applying the translational external force compensation amount Fad to the robot 1. For this reason, in expression 22, the moment (Pg*Fad) is added as a bias component of the moment external force compensation amount Mad.

Supplementarily, according to the present embodiment, while different types of motional state amounts have been used as the first motional state amount related to the translational external force compensation amount Fad and the second motional state amount related to the moment external force compensation amount Mad, motional state amounts of the same type (for example, a posture of the body 3) may be used.

After carrying out the processing in S03 as described above, the external force target generator 27 next carries out the processing in S04. In S04, the external force target generator 27 calculates a compensation total translational external force Fall_ad (=Fall+Fad) obtained by adding the translational external force compensation amount Fad calculated in S03 to the required total translational external force Fall calculated in S02, and calculates a compensation total moment external force Mall_ad (=Mall+Mad) obtained by adding the moment external force compensation amount Mad calculated in S03 to the required total moment external force Mall calculated in S02.

The compensation total translational external force Fall_ad means a total translational force to be applied to the robot 1 in order to approximate the difference ΔPg (the difference between a desired value and an actual value of the first motional state amount) to zero while having an actual translational motion of the entire robot 1 follow the translational motion in the desired motion. In addition, the compensation total moment external force Mall_ad means a total moment to be applied to the robot 1 in order to approximate the difference ΔLg (the difference between a desired value and an actual value of the second motional state amount) to zero while having an actual rotational motion of the entire robot 1 follow the rotational motion in the desired motion.

After calculating the compensation total translational external force Fall_ad and the compensation total moment external force Mall_ad as described above, the external force target generator 27 next carries out the processing in S05 to S15. The processing in these steps S05 to S15 is carried out to determine a required virtual surface translational force, which is the translational force to be applied to the robot 1 from each of the virtual surfaces set in S01 in order to achieve the compensation total translational external force Fall_ad (in order to have a total translational external force that actually acts on the robot 1 to coincide with the compensation total translational external force Fall_ad).

The required virtual surface translational force in each of the virtual surfaces is formed of a virtual surface normal force component, which is a component perpendicular to the virtual surface, and a virtual surface frictional force component, which is a component parallel to the virtual surface. The value of the required virtual surface translational force determined by the processing in S05 to S15 is a provisional value and may be therefore corrected by the processing in S19 and thereafter, which will be discussed later. The processing in S05 to S15 includes the processing for assessing a motional state of the robot 1 on the basis of the required virtual surface translational force to be determined.

The following will describe the processing in S05 to S15 in detail. The external force target generator 27 carries out the processing in S05 first. In this step S05, the external force target generator 27 determines, on the basis of the compensation total translational external force Fall_ad determined in S04, a virtual surface normal force component N_i, which is a component perpendicular to the virtual surface (a normal force component), and a virtual surface frictional force component F_i, which is a component parallel to the virtual surface (a frictional force component) in the required virtual surface translational force in the virtual surface.

In the description of the present embodiment, the suffix "i" in the reference character N_i or F_i means the identification character of any one virtual surface of the virtual surfaces set in S01 at the current time. Further, a reference character with the suffix "i" denotes a reference character related to a virtual surface with the identification character i. In this case, in the description of the present embodiment, the identification characters of the virtual surfaces S1a, S2a, S3a, S1b, S2b, and S3b are the suffixes of "S" of each of the reference characters denoting the virtual surfaces, namely, 1a, 2a, 3a, 1b, 2b, and 3b. A reference character related to a particular virtual surface is accompanied by the same suffix as the suffix of the particular virtual surface. For example, the reference character of a virtual surface normal force component in the virtual surface S2a is expressed by "N_2a".

In S05, the external force target generator 27 determines the virtual surface normal force component N_i and the virtual surface frictional force component F_i, which constitute the required virtual surface translational force in each virtual surface such that a first requirement that the resultant force of the required virtual surface translational forces in all virtual surfaces set in S01 at the current time coincide with the compensation total translational external force Fall_ad determined in S04 is satisfied.

More specifically, in the processing in S05 of the present embodiment, to satisfy the aforesaid first requirement, the external force target generator 27 determines the virtual surface normal force component N_i and the virtual surface frictional force component F_i in each virtual surface such that a first A requirement that the resultant force of the virtual surface normal force components N_i in all the virtual surfaces set at the current time coincide with the component of the compensation total translational external force Fall_ad obtained by removing the components that are parallel to all the virtual surfaces therefrom and a first B requirement that the resultant force of the virtual surface frictional force components F_i in all the virtual surfaces coincide with the component of the compensation total translational external force Fall_ad that is parallel to all the virtual surfaces are satisfied.

In the processing in S05, if the virtual surfaces set at the current time include two opposing virtual surfaces Sna and Snb (n =1 or 2 or 3) that oppose each other in parallel and the compensation total translational external force Fall_ad has a component Fall_ad_n that is perpendicular to the opposing virtual surfaces Sna and Snb, then the external force target generator 27 makes the virtual surface normal force component N-na or N-nb in the opposing virtual surface Sna or Snb, whichever is capable of generating a normal force in the same direction as that of Fall_ad_n, coincide with Fall_ad_n, and also sets the virtual surface normal force component N-na or N-nb in the other opposing virtual surface to zero.

Further, in the processing in S05, if a plurality of virtual surfaces is set at the current time and the compensation total translational external force Fall_ad has a component that is parallel to all the virtual surfaces, then the external force target generator 27 determines the virtual surface normal force component N_i in each virtual surface such that the first A requirement is satisfied and then determines the virtual surface frictional force component F_i of each virtual surface such that the magnitude of the virtual surface frictional force component F_i in each virtual surface becomes a magnitude based on the upper limit value of a frictional force that can be generated in the virtual surface (more specifically, such that the magnitude of the virtual surface frictional force component F_i increases as the upper limit value of the frictional force that can be generated in the virtual surface increases) while satisfying the first B requirement.

To be more specific, the external force target generator 27 sets the frictional coefficient $\mu\_i$ of each virtual surface, which has been set at the current time, on the basis of the environmental information (more specifically, the environmental information related to the frictional coefficient of a surface to be contacted corresponding to the virtual surface). In this case, the frictional coefficient $\mu\_i$ of each virtual surface may be set to the same value or substantially the same value as that of the actual frictional coefficient of the surface to be contacted corresponding to the virtual surface or may be set to be slightly smaller than the actual frictional coefficient to ensure an allowance.

The frictional coefficient $\mu\_i$ of each virtual surface does not have to be set at each time of each control processing cycle. For example, the frictional coefficients of the virtual surfaces associated with the surfaces to be contacted may be determined on the basis of the environmental information and stored in advance before the processing by the external force target generator 27 is begun, then the frictional coefficients to be associated with the virtual surfaces set in S01 may be selected from among the stored frictional coefficients.

Further, the external force target generator 27 sets, in each virtual surface, the value obtained by multiplying the frictional coefficient $\mu\_i$ associated with the virtual surface by a magnitude |N_i| of the virtual surface normal force component N_i (=$\mu\_i$*|N_i|) as the upper limit value of the frictional forces that can be generated in the virtual surface (hereinafter referred to simply as the frictional force upper limit value).

Subsequently, the external force target generator 27 determines the virtual surface frictional force component F_i in each virtual surface such that the magnitude of the virtual surface frictional force component F_i increases as the frictional force upper limit value set as described above increases.

For instance, the virtual surface frictional force component F_i of each virtual surface is determined such that the mutual ratio of the magnitudes of the virtual surface frictional force components F_i of the virtual surfaces coincides with the mutual ratio of the frictional force upper limit values of the virtual surfaces while satisfying the first B requirement. In this case, for example, a component of Fall_ad that is parallel to all the virtual surfaces may be set to coincide with the virtual surface frictional force component of a virtual surface that has a largest frictional force upper limit value, and the virtual surface frictional force components of the remaining virtual surfaces may be set to zero.

When the desired motion of the robot 1 is the wall climbing gait, the virtual surface normal force component N_i and the virtual surface frictional force component F_i in each virtual surface will be determined, for example, as described below by the aforesaid processing in 505.

Figure 11B:
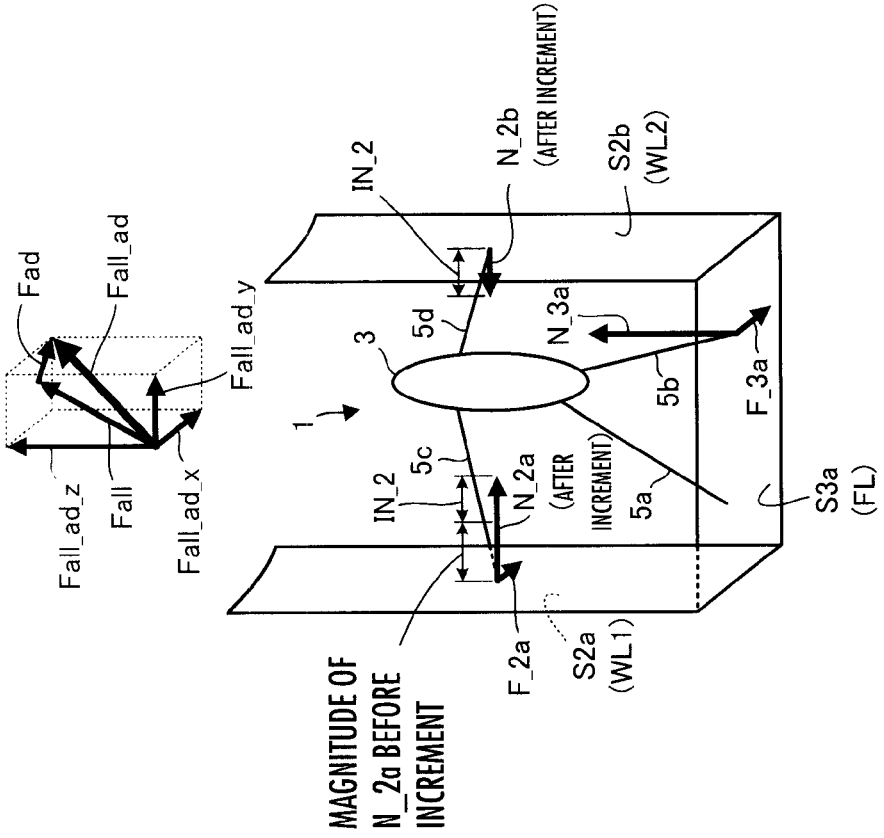
FIG. 11(b) is a diagram illustrating an example of a required virtual surface translational force (a virtual surface normal force component and a virtual surface frictional force component) determined by the processing up to S13 of FIG. 7.
Figure 11A:
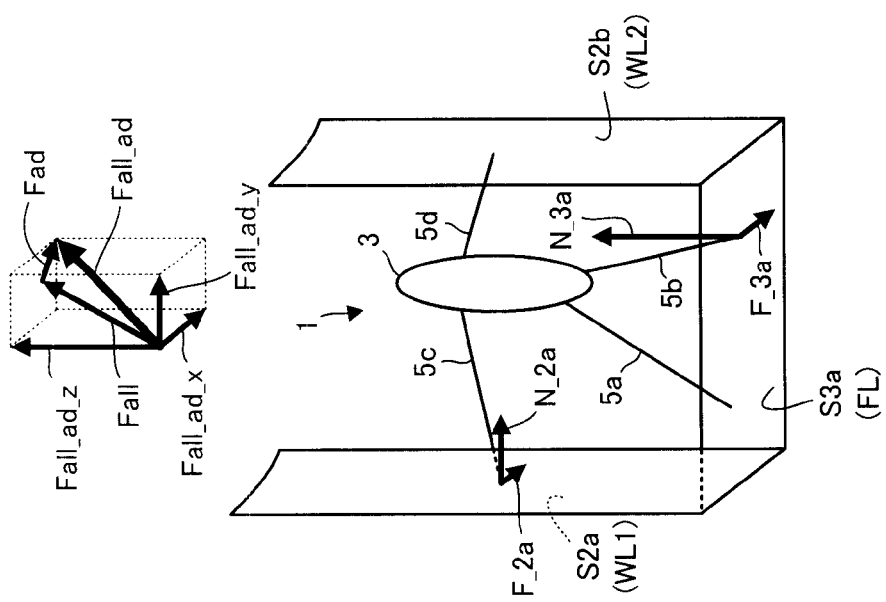
FIG. 11(a) is a diagram illustrating an example of a required virtual surface translational force (a virtual surface normal force component and a virtual surface frictional force component) determined by the processing in S05 of FIG. 7.

For example, a situation is assumed in which, at time t2 in the motional state illustrated in FIG. 3(b), the compensation total translational external force Fall_ad (=Fall+Fad) has a component Fall_ad_z that is perpendicular to the virtual surface S3a corresponding to the floor surface FL, a component Fall_ad_y that is perpendicular to the virtual surfaces (opposing virtual surfaces) S2a and S2b corresponding to the wall surfaces WL1 and WL2, respectively, and a component Fall_ad_x that is parallel to all these virtual surfaces S3a, S2a, and S2b, as illustrated in FIG. 11(a).

In this situation, by the processing in 505, the virtual surface normal force component N_3a of the virtual surface S3a and the virtual surface normal force component N_2a of the virtual surface S2a are determined to be the values that coincide with Fall_ad_z and Fall_ad_y, respectively, while the virtual surface normal force component N_2b of the virtual surface S2b is determined to be zero. Thus, the virtual surface normal force components N_3a, N_2a, and N_2b that satisfy the first A requirement are determined. Here, the relationship denoted by $\mu\_3a$*|N_3a|>$\mu\_2a$*|N_2a| applies.

Further, the virtual surface frictional force component F_3a of the virtual surface S3a and the virtual surface frictional force component F_2a of the virtual surface S2a are determined such that the resultant force of the virtual surface frictional force component F_3a of the virtual surface S3a and the virtual surface frictional force component F_2a of the virtual surface S2a (=F_3a+F_2a) coincides with Fall_ad_x and a relationship defined by |F_3a|>|F_2a| applies (such that, for example, |F_2a|/|F_3a|=$\mu\_2a$*|N_2a|/($\mu\_3a$*|N_3a|)), and the virtual surface frictional force component F_2b of the virtual surface S2b is determined to be zero. Thus, the virtual surface frictional force components F_3a, F_2a, and F_2b that satisfy the first B requirement are determined.

At time after the motional state illustrated in FIG. 3(c) in the wall climbing gait, if the compensation total translational external force Fall_ad is the same as that shown in, for example, FIG. 11(a), then by the processing in S05, the virtual surface normal force component N_2a and the virtual surface frictional force component F_2a are determined such that the virtual surface normal force component N_2a of the virtual surface S2a coincides with Fall_ad_y of Fall_ad and the virtual surface frictional force component F_2a coincides with the resultant force of Fall_ad_z and Fall_ad_x of Fall_ad, and both the virtual surface normal force component N_2b and the virtual surface frictional force component F_2b of the virtual surface S2b are determined to be zero.

The description will now return to the flowchart of FIG. 7. The external force target generator 27 carries out the processing in S07 after carrying out the processing in S05 as described above. In this step S07, the external force target generator 27 determines whether each of all the virtual surfaces set in S01 at the current time satisfies the second requirement that the magnitude of the virtual surface frictional force component F_i be not more than the aforesaid frictional force upper limit value, which is the predetermined upper limit value set on the basis of the magnitude of the virtual surface normal force component N_i of the virtual surface frictional force component F_i. In other words, by using the frictional force upper limit value determined as described above ($=\mu\_i^*|N\_i|$), the external force target generator 27 determines whether $|F\_i| \leq \mu\_i^*|N\_i|$ applies to each of the all virtual surfaces set in S01.

If the determination result in S07 is affirmative, then the external force target generator 27 terminates the processing for determining the required virtual surface translational force (provisional value) in each virtual surface and carries out the processing of S19 and thereafter shown in FIG. 8. In this case, the set of the virtual surface normal force component N_i and the virtual surface frictional force component F_i in each virtual surface determined in S05 will be directly determined as the required virtual surface translational force (provisional value).

Meanwhile, if the determination result in S07 is negative, then the external force target generator 27 carries out the processing in S09. In this step S09, the external force target generator 27 determines whether the virtual surface on which the determination result in S07 is negative is the opposing virtual surface Sna or Snb (n=1 or 2 or 3).

In the situation where the determination result in S09 is negative, the magnitude of the virtual surface normal force component in the virtual surface on which the determination result in S07 is negative cannot be increased while satisfying the first A requirement. This means that the magnitude of the virtual surface frictional force component in the virtual surface cannot be increased within the range of the frictional force upper limit value or less. Hence, in this case, the external force target generator 27 determines in S17 that the motional state of the robot 1 is inappropriate (i.e., the desired motion needs to be corrected or the like) and interrupts the processing for determining the desired external force and the desired external force action point of the flowcharts in FIG. 7 to FIG. 9.

In the present embodiment, therefore, the required virtual surface translational force (the set of the virtual surface normal force component N_i and the virtual surface frictional force component F_i) is determined such that the first A requirement and the first B requirement are satisfied in S05, and then the motional state of the robot 1 is assessed by the determination processing in S07 and S09. If the determination results in S07 and S09 are both negative, then the motional state of the robot 1 is assessed as inappropriate.

If the motional state of the robot 1 is assessed as inappropriate in S17, then the external force target generator 27 outputs error information to the desired motion generator 25. Then, on the basis of the error information, the desired motion generator 25 creates a desired motion once again or creates a desired motion that suspends the motion of the robot 1.

Meanwhile, in the situation where the determination result in S09 is affirmative, the magnitudes of the virtual surface normal force components N_na and N_nb of the opposing virtual surfaces Sna and Snb (n=1 or 2 or 3) that are parallel to each other can be increased while satisfying the first A requirement (i.e., while maintaining N_na+N_nb at a constant level). In other words, N_na and N_nb are normal forces in opposite directions from each other, so that the total sum of N_na and N_nb does not change even if the magnitudes thereof are increased by the same amount.

Therefore, if the determination result in S09 is affirmative, then the external force target generator 27 carries out the processing in S11. In this step S11, the external force target generator 27 determines increments IN_n of the magnitudes of the virtual surface normal force components N_na and N_nb of the opposing virtual surfaces Sna and Snb, respectively, such that the second requirement is satisfied.

More specifically, the external force target generator 27 calculates, as the increment IN_n, the value obtained by dividing the result, which is obtained by subtracting the frictional force upper limit value ($=\mu\_i^*|N\_i|$) used in the determination processing in S07 from the magnitude of the virtual surface frictional force component F_i (=F_na or F_nb) in the opposing virtual surface Sna or Snb in which the determination result in S07 is negative, by the frictional coefficient $\mu\_i$.

More specifically, the external force target generator 27 calculates the increment IN_n according to expression 01 given below.

$$IN\_n = (|F\_i| - \mu\_i^*|N\_i|)/\mu\_i \qquad \text{Expression 01}$$

Subsequently, the external force target generator 27 carries out the processing in S13. In this step S13, the external force target generator 27 increments each of the virtual surface normal force components N_na and N_nb of the opposing virtual surfaces Sna and Snb, respectively, by the increment IN_n determined as described above from the magnitude of the value determined by the processing in S05, then re-determines the incremented values as the virtual surface normal force components N_na and N_nb of the opposing virtual surfaces Sna and Snb, respectively.

By the processing up to S13, a required virtual surface translational force that satisfies the first A requirement, the first B requirement, and the second requirement is determined.

Subsequently, the external force target generator 27 carries out the processing in S15. In this step S15, the external force target generator 27 determines whether a third requirement that the magnitude of one of the virtual surface normal force components N_na and N_nb after their magnitudes have been incremented in S13, whichever is smaller (=min (|N_na|, |N_nb|)), be a preset value IFC_n or less is satisfied.

Here, the min (|N_na|, |N_nb|) corresponds to an internal force which does not contribute to an overall translational motion of the robot 1. If the magnitude of the internal force increases, the share, which is required to generate the internal forces, in the motive power (driving torque) that can be generated by the joint actuator 11 of the robot 1 increases, frequently leading to deficiency of the motive power of the joint actuator 11 that can be used for changing the motion of the robot (the motive power that can be used to change the translational motion of the entire robot 1). According to the present embodiment, therefore, the determination processing in S15 is carried out to restrict the internal force to a predetermined value IFC_n or less.

The predetermined value IFC_n (hereinafter referred to as the internal force upper limit value IFC_n) is set according to, for example, the direction of an internal force generated by the opposing virtual surfaces Sna and Snb (the direction of the normal line of the opposing virtual surfaces Sna and Snb). However, the internal force upper limit value IFC_n may be set at a fixed value regardless of the direction of the internal force.

If the determination result in S15 is affirmative, then the external force target generator 27 terminates the processing for determining the required virtual surface translational force (provisional value) in each virtual surface and carries out the processing in S19 and thereafter illustrated in FIG. 8, as with the case where the determination result in S07 is affirmative.

In this case, for the virtual surfaces except the opposing virtual surfaces Sna and Snb including the virtual surface in which the determination result in S07 is negative, the set of the virtual surface normal force component N_i and the virtual surface frictional force component F_i determined in S05 is directly determined as the required virtual surface translational force (provisional value).

Further, in each of the opposing virtual surfaces Sna and Snb, the set of the virtual surface normal force component N_i (N_na, N_nb) incremented in S13 and the virtual surface frictional force component F_i (F_na, F_nb) determined in S05 is determined as the required virtual surface translational force (provisional value).

Further, in the situation where the determination result in S15 is negative, it is impossible or difficult to apply, to the robot 1, an external force required to implement the compensation total translational external force Fall_ad while satisfying the third requirement related to the internal force. Hence, if the determination result in S15 is negative, then the external force target generator 27 determines in S17 that a motional state of the robot 1 is inappropriate (i.e., the desired motion needs to be corrected or the like) and interrupts the processing illustrated by the flowcharts in FIG. 7 to FIG. 9, as with the case where the determination result in S09 is negative.

Supplementarily, according to the present embodiment, if the virtual surfaces set in S01 include opposing virtual surfaces Sna and Snb (n=1 or 2 or 3) that are parallel to each other, one of the virtual surface normal force components N_na and N_nb of the opposing virtual surfaces Sna and Snb determined by the processing in S05 is zero, so that the set of N_na and N_nb always satisfies the third requirement. Therefore, if the determination result in S07 is affirmative, then the determination processing in S15 does not have to be carried out.

By the processing in S05 to S15 described above, the set of the virtual surface normal force component N_i and the virtual surface frictional force component F_i constituting the required virtual surface translational force (provisional value) of each virtual surface is determined such that the first A requirement, the first B requirement, the second requirement, and the third requirement are satisfied, except for the case where the determination result in S09 or S15 is negative (a motional state of the robot 1 is inappropriate). Thus, a required virtual surface translational force (provisional value) is determined which is capable of achieving the compensation total translational external force Fall_ad obtained by adding the translational external force compensation amount Fad to the required total translational external force Fall that allows the translational motion (the translational motion of an overall center-of-gravity point) of the entire robot 1 in a desired motion of the robot 1 to be achieved while satisfying the first A requirement, the first B requirement, the second requirement, and the third requirement.

Accordingly, in the present embodiment, the required virtual surface translational force that satisfies the first A requirement, the first B requirement, and the second requirement is determined by the processing in steps up to S13, and then the motional state of the robot 1 is reassessed by the determination processing in S15. If the determination result in S15 is negative, then it is assessed that the motional state of the robot 1 is inappropriate.

If all the determination results in S07, S09, and S15 are affirmative, then a required virtual surface translational force that will satisfy the first A requirement, the first B requirement, the second requirement, and the third requirement can be determined. This means that the motional state of the robot 1 is an appropriate motional state that allows an external force to be applied to the robot 1 such that at least the compensation total translational external force can be smoothly achieved.

When the desired motion of the robot 1 is the wall climbing gait, the virtual surface normal force component N_i and the virtual surface frictional force component F_i will be determined, for example, as described below by the aforesaid processing in S05 to S15.

For example, a case will be assumed where the virtual surface normal force component N_i and the virtual surface frictional force component F_i (i=3a, 2a, or 2b) in each of the virtual surfaces are determined by the processing in S05 at time t2 in the motional state illustrated in FIG. 3(b) in the wall climbing gait (refer to FIG. 11(a) mentioned above). In this case, if the virtual surface frictional force component F_3a in the virtual surface S3a and the virtual surface frictional force component F_2a in the virtual surface S2a satisfy the second requirement (if the determination result in S07 is affirmative), then the required virtual surface translational forces (N_i and F_i) in the virtual surfaces that are finally determined by the processing in steps up to S15 coincide with those determined in S05.

Meanwhile, if, for example, the virtual surface frictional force component F_2a in the virtual surface S2a does not satisfy the second requirement, then the magnitudes of the virtual surface normal force components N_2a and N_2b of the opposing virtual surfaces S2a and S2b, respectively, which includes the aforesaid virtual surface S2a, will be determined to have values obtained by incrementing the values determined in S05 by the increment IN_2 determined in S11, as illustrated in FIG. 11(b). Further, the magnitudes of the virtual surface normal force component N_3a and the virtual surface frictional force component F_3a of the virtual surface S3a and the virtual surface frictional force components F2a and F2b of the virtual surfaces S2a and S2b, respectively, are determined to be the same values as the values determined in 505.

Supplementarily, according to the present embodiment, if the virtual surfaces set in S01 include the two opposing virtual surfaces Sna and Snb (n=1 or 2 or 3) that are parallel to each other, then both the virtual surface normal force component and the virtual surface frictional force component of either the opposing virtual surface Sna or Snb is always determined to be zero by the processing in 505. However, in the processing in 505, if the compensation total translational external force Fall_ad has a component perpendicular to the opposing virtual surfaces Sna and Snb, then the virtual surface normal force components of both opposing virtual surfaces Sna and Snb may be determined to be a non-zero value within a range in which the first A requirement and the third requirement are satisfied. In this case, if the compensation total translational external force Fall_ad has a component parallel to all virtual surfaces, then the virtual surface frictional force components of both the opposing virtual surfaces Sna and Snb may be set to non-zero values within a range in which the first B requirement is satisfied.

In the processing in 505, if the virtual surface frictional force components of both opposing virtual surfaces Sna and Snb are set to non-zero values as described above, then the determination result in S07 may turn negative in both opposing virtual surfaces Sna and Snb. In this case, the increments IN_n of the virtual surface normal force components of the opposing virtual surfaces Sna and Snb may be determined, for example, as follows. For each of the opposing virtual surfaces Sna and Snb, the increment IN_n is provisionally calculated by the processing in S11, and one of the provisional increments IN_n, whichever is larger, is determined as the increment IN_n of the virtual surface normal force components of the opposing virtual surfaces Sna and Snb.

In the processing of steps up to S15 described above, if the determination result in S07 or S15 is affirmative (if an appropriate required virtual surface translational force (provisional value) in each virtual surface has been determined), then the external force target generator 27 subsequently carries out the processing in S19 shown in the flowchart of FIG. 8. In this step S19, the external force target generator 27 calculates a required virtual surface translational force dependent moment Ms, which is the moment generated about the moment reference point by the required virtual surface translational force in the case where the required virtual surface translational force (provisional value) determined by the steps up to S15 is applied to the provisional on-virtual-surface external force action point in each virtual surface (in the case where the external force action point in each virtual surface is set to coincide with the provisional on-virtual-surface external force action point).

Here, the provisional on-virtual-surface external force action point is an external force action point on a virtual surface which corresponds to a surface to be contacted, the external force action point being obtained by projecting, according to a predetermined rule, the provisional external force action point on each surface to be contacted at the current time, which has been generated by the desired motion generator 25, onto the surface to be contacted.

Figure 12:
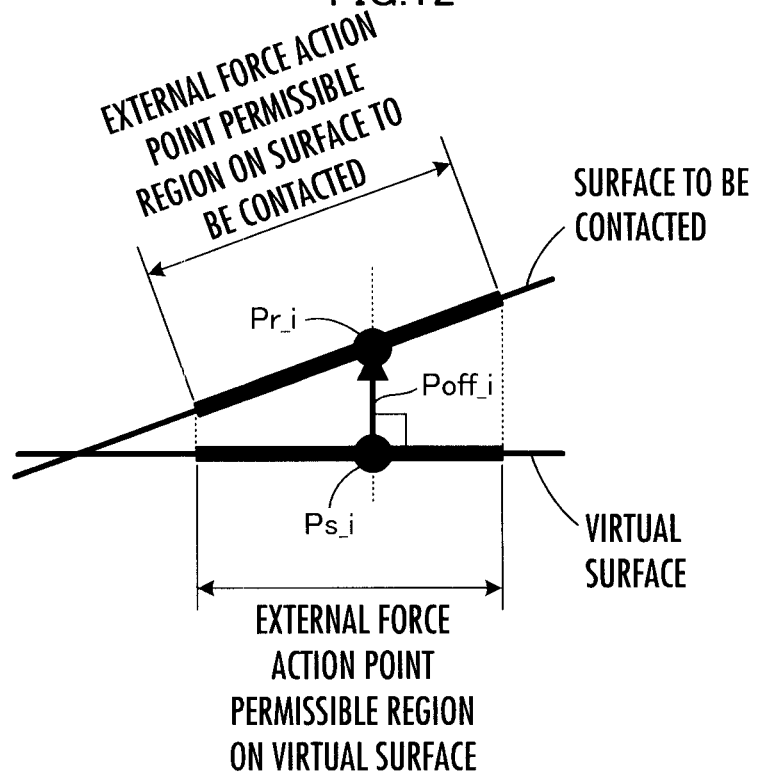
FIG. 12 is a diagram for describing the processing in S19 of FIG. 8.

In this case, according to the present embodiment, the rule for the projection mentioned above is set as described below. As illustrated in FIG. 12, if the external force action point on a certain surface to be contacted is denoted by point Pr_i and an external force action point on a virtual surface corresponding to the surface to be contacted is denoted by point Ps_i, then the external force action point Ps_i on the virtual surface coincides with, for example, a point at which a straight line which passes the external force action point Pr_i on the surface to be contacted and which is perpendicular to the virtual surface (i.e., a perpendicular from the external force action point Pr_i to the virtual surface) intersects with the virtual surface.

The provisional on-virtual-surface external force action point is an external force action point on a virtual surface which corresponds to a surface to be contacted, the external force action point being obtained by projecting, according to the aforesaid rule, the provisional external force action point on each surface to be contacted at the current time onto the virtual surface corresponding to the surface to be contacted.

In the processing in S19, the external force target generator 27 uses a position vector relative to the moment reference point of a provisional on-virtual-surface external force action point determined as described above to calculate, according to expression 03 given below, the required virtual surface translational force dependent moment Ms generated about the moment reference point when the required virtual surface translational forces (N_i, F_i) act on the provisional on-virtual-surface external force action point of each virtual surface.

$$Ms = \Sigma(Irp\_i * N\_i) + \Sigma((Irp\_i + Poff\_i) * F\_i) \quad \text{Expression 03}$$

Irp_i in this expression 03 denotes the position vector relative to the moment reference point of the provisional on-virtual-surface external force action point of each virtual surface (each virtual surface set in S01 at the current time), and Poff_i denotes the position vector of the provisional external force action point on a surface to be contacted relative to the provisional on-virtual-surface external force action point (or a component vector in the position vector, the component vector being in a direction perpendicular to a virtual surface).

Further, (Irp_i*N_i) denotes the vector product of the position vector Irp_i of the provisional on-virtual-surface external force action point and the virtual surface normal force component N_i in each virtual surface, that is, the moment generated about the moment reference point, when N_i acts on the provisional virtual surface external force action point.

Further, Σ(Irp_i*N_i) means the total sum of the moments (Irp_i*N_i) of all virtual surfaces (all virtual surfaces set in S01 at the current time), i.e., the total moment generated about the moment reference point caused by the virtual surface normal force components N_i in the virtual surfaces.

Further, ((Irp_i+Poff_i)*F_i) denotes a vector product (Irp_i*F_i) of the position vector Irp_i of a provisional on-virtual-surface external force action point and the virtual surface frictional force component F_i in each virtual surface, i.e., a vector product (Poff_i*F_i) of the moment generated about the moment reference point and the position vector Poff_i of a provisional external force action point and F_i on a surface to be contacted relative to a provisional on-virtual-surface external force action point when F_i acts on the provisional on-virtual-surface external force action point, i.e., the moment of the total sum of the moments generated by F_i about a provisional external force action point on a surface to be contacted.

Further, Σ((Irp_i+Poff_i)*F_i) means the total sum of the moments ((Irp_i+Poff_i)*F_i) of the individual virtual surfaces (all virtual surfaces set in S01 at current time), that is, the total moment generated about the moment reference point due to the virtual surface frictional force component F_i in each virtual surface.

Here, to supplement the description of the moment (Poff_i*F_i), a surface to be contacted and a virtual surface corresponding thereto do not usually become flush, so that there will be a positional discrepancy between an external force action point Pr_i on a surface to be contacted and an external force action point Ps_i on a virtual surface corresponding thereto in many cases, as illustrated in FIG. 12. In such a situation, a difference due to the positional discrepancy occurs between a moment generated about a moment reference point when the required virtual surface translational force in each virtual surface acts on a provisional on-virtual-surface external force action point and a moment generated about a moment reference point when the same translational force as the aforesaid required virtual surface translational force acts on the provisional external force action point on a surface to be contacted corresponding to the virtual surface. In this case, the direction of the normal line of the surface to be contacted and the direction of the normal line of the virtual surface corresponding thereto will be approximately the same. Hence, the aforesaid difference for each virtual surface primarily depends on the virtual surface frictional force component F_i and substantially agrees with the moment (Poff_i*F_i).

In the present embodiment, therefore, the required virtual surface translational force dependent moment Ms is calculated according to expression 03, to which the moment (Poff_i*F_i) has been added, in order to compensate for the influence of the positional discrepancy thereby to enhance the reliability of Ms.

If the positional discrepancy between the provisional external force action point on the surface to be contacted and the provisional on-virtual-surface external force action point corresponding thereto is sufficiently small, then the required virtual surface translational force dependent moment Ms may be calculated according to an expression obtained by omitting the term of the moment (Poff_i*F_i) from expression 03.

The processing in S19 described above will be illustratively explained in relation to the case where the desired motion of the robot 1 is the wall climbing gait. In a situation where a required virtual surface translational force has been determined, as illustrated in, for example, FIG. 11(b), the moment Ms generated about a moment reference point (e.g., a point on the intersection line of the virtual surfaces S2a and S3a) is calculated according to expression 03 given above by the virtual surface normal force components N_2a, N_2b, and N_3a and the virtual surface frictional force components F_2a and F_3a shown in the figure. In this case, in the example illustrated in FIG. 11(b), the virtual surfaces S2a, S2b and S3a match (or substantially match) the surfaces to be contacted WL1, WL2 and FL, so that Poff_i (Poff_2a, Poff_2b, Poff_3a) for each of the virtual surfaces S2a, S2b, and S3a in expression 03 may be all zero.

Subsequently, the external force target generator 27 carries out the processing of S21 to S37, which is the processing for determining a moment compensation amount. Here, an overview of the processing will be given.

If it is assumed that the required virtual surface translational force dependent moment Ms calculated in S19 as described above coincides or substantially coincides with the compensation total moment external force Mall_ad calculated in S04, then the required virtual surface translational force (provisional value) determined by the processing up to S15 and the provisional on-virtual-surface external force action point corresponding to the provisional external force action point generated by the desired motion generator 25 provide an external force that not only allows the compensation total translational external force Fall_ad related to the translational motion (the translational motion of an overall center-of-gravity point) of the entire robot 1 to be properly achieved but also allows the compensation total moment external force Mall_ad related to a rotational motion (a motion that changes the angular momentum about a moment reference point) of the entire robot 1 to be properly achieved.

However, the processing up to S15 does not consider the dynamics related to the rotational motion of the entire robot 1. In general, therefore, the difference between the compensation total moment external force Mall_ad and the required virtual surface translational force dependent moment Ms (hereinafter referred to as the moment error errM) will not be zero or a value close thereto.

The moment compensation amount determined by the processing of S21 to S37 is the manipulated variable (the manipulated variable of a target related to an external force) for canceling the moment error errM (or approximating the errM to zero).

In the present embodiment, the moment compensation amount determined by the processing of S21 to S37 comes in three types of compensation amounts (a first to a third compensation amounts). The first compensation amount is a moment compensation amount composed of a correction amount of the position of an on-virtual-surface external force action point in one or more virtual surfaces (the correction amount from a provisional on-virtual-surface external force action point, which will be hereinafter referred to as the on-virtual-surface external force action point correction amount in some cases). In this case, the first compensation amount is used to determine the external force action point on a surface to be contacted corresponding to the on-virtual-surface external force action point, which has been corrected by the first compensation amount, such that the external force action point falls within the aforesaid existence permissible region.

Further, the second compensation amount is a moment compensation amount composed of the correction amount of a virtual surface frictional force component of a required virtual surface translational force (provisional value) in two or more virtual surfaces (hereinafter referred to as the virtual surface frictional force component correction amount in some cases). In this case, the second compensation amount is a compensation amount determined such that the total sum (resultant force) of the virtual surface frictional force component correction amounts constituting the second compensation amount is zero.

Further, the third compensation amount is a moment compensation amount composed of a twisting force to be additionally applied to the robot 1 as a moment external force about an axis, which is perpendicular to one or more virtual surfaces, from the virtual surface (hereinafter referred to as the virtual surface twisting force in some cases).

The second compensation amount is composed of the virtual surface frictional force component correction amounts in two or more virtual surfaces, because the resultant force of the required virtual surface translational forces corrected by the second compensation amount is required to satisfy the first requirement.

Here, the first compensation amount out of the first to the third compensation amounts has a function for canceling or reducing the moment error without the need for correcting the required virtual surface translational force (provisional value) determined by the processing up to S15. Hence, if the moment error can be cancelled by the first compensation amount, then the required virtual surface translational force (provisional value) determined by the processing up to S15 can be directly used as the required virtual surface translational force at current time to implement a desired motion.

Meanwhile, the second compensation amount or the third compensation amount serves to additionally impart a virtual surface frictional force component correction amount or a virtual surface twisting force to an external force to be applied from a virtual surface to the robot 1, so that the second compensation amount or the third compensation amount is subjected to the restrictions on the limit of frictional forces that can be generated on the virtual surface. Further, in order to satisfy the restrictions, the virtual surface normal force components N_na and N_nb (and consequently the internal forces) in the opposing virtual surfaces Sna and Snb (n=1 or 2 or 3) need to be corrected in some cases. Further, correcting these virtual surface normal force components N_na and N_nb generally leads to a change in the moment Ms generated about the moment reference point.

In the present embodiment, therefore, the external force target generator 27 preferentially determines the first compensation amount out of the first to the third compensation amounts as the moment compensation amount for canceling the moment error errM. The external force target generator 27 restricts the first compensation amount if the moment error cannot be canceled by the first compensation amount (more specifically, when the first compensation amount is determined to cancel the entire moment error errM, if the external force action point on the surface to be contacted corresponding to the on-virtual-surface external force action point that has been corrected using the first compensation amount deviates from the existence permissible region). Further, a set of the second compensation amount and the third compensation amount is determined such that the portion of the moment error errM that cannot be canceled by the restricted first compensation amount will be canceled by the second compensation amount and the third compensation amount.

This completes the description of the overview of the processing from S21 to S37 (the processing for determining the moment compensation amount).

The following will explain in more detail the processing for determining the moment compensation amount. The external force target generator 27 carries out the processing in S21 first. In this step S21, the external force target generator 27 calculates a moment error errM (=Mall_ad−Ms), which is the difference between the compensation total moment external force Mall_ad calculated in S04 and the required virtual surface translational force dependent moment Ms calculated in S19.

Subsequently, the external force target generator 27 carries out the processing in S23. In this step S23, the external force target generator 27 calculates a Jacobian matrix J indicating the sensitivity in a change of the required virtual surface translational force dependent moment Ms in response to a change in the position of an on-virtual-surface external force action point (a change from a provisional on-virtual-surface external force action point).

Here, a change amount (vector) of the position of an external force action point on each virtual surface is denoted by $\Delta rp\_i$. When the external force action point on each virtual surface is changed by $\Delta rp\_i$ from a provisional on-virtual-surface external force action point, the change amount (vector) of the position of an external force action point on a surface to be contacted (a point at which a straight line which passes the external force action point on a virtual surface and which is perpendicular to the virtual surface intersects with the surface to be contacted) is denoted by $\Delta Poff\_i$. The change amount (vector) of the required virtual surface translational force dependent moment Ms observed when the external force action point on each virtual surface is changed by $\Delta rp\_i$ from the provisional on-virtual-surface external force action point is denoted by $\Delta Ms$. At this time, a relational expression of expression 05 given below is obtained on the basis of the above expression 03.

$$\Delta Ms = \Sigma(\Delta rp\_i * (N\_i + F\_i) + \Delta Poff\_i * F\_i) \quad \text{Expression 05}$$

In this case, $\Delta Poff\_i$ will be the function value of $\Delta rp\_i$ (more specifically, a value uniquely defined by the posture difference (spatial angular difference) between a virtual surface and a surface to be contacted corresponding thereto and $\Delta rp\_i$). Hence, expression 05 can be rewritten to the following expression 07.

$$\Delta Ms = J * (\Delta rp\_i) \quad \text{Expression 07}$$

In this expression 07, $(\Delta rp\_i)$ is a longitudinal vector having, as a component thereof, $\Delta rp\_i$ related to all virtual surfaces (all virtual surfaces set in S01 at current time). Further, J in expression 07 denotes a Jacobian matrix indicating sensitivity of a change in the required virtual surface translational force dependent moment Ms in response to a change in the position of an on-virtual-surface external force action point (a change from the position of a provisional on-virtual-surface external force action point).

Thus, in the processing in S23, the external force target generator 27 calculates the Jacobian matrix J on the basis of the required virtual surface translational forces N_i and F_i of each virtual surface and expression 05. In this case, the relationship between $\Delta Poff\_i$ and $\Delta rp\_i$ is determined on the basis of the posture difference between each virtual surface and the surface to be contacted corresponding thereto.

Subsequently, the external force target generator 27 carries out the processing in S25. This processing in S25 calculates $(\Delta rp\_i)$ that satisfies the relationship in expression 07 as a counterpart of the set of the on-virtual-surface external force action point correction amount in each virtual surface to cancel errM in the case where $\Delta Ms$ in expression 07 coincides with the moment error errM calculated in S21.

Here, the Jacobian matrix J in expression 07 is usually not a regular matrix. Thus, the external force target generator 27 calculates a pseudo inverse matrix Jinv of the Jacobian matrix determined in S23, and multiplies the pseudo inverse matrix Jinv by the moment error errM so as to calculate the on-virtual-surface external force action point correction amount $\Delta rpc\_i$ of each virtual surface. In this case, the pseudo inverse matrix Jinv is determined such that, for example, the mean value of the squared values or the absolute values of $\Delta rpc\_i$ corresponding to each virtual surface is minimized.

Alternatively, for example, $\Delta rpc\_i$ corresponding to each virtual surface may be weighted beforehand according to the area of the existence permissible region of the external force action point in a surface to be contacted corresponding to each virtual surface, and the pseudo inverse matrix Jinv may be determined such that the weighted mean value of the squared values or the absolute values of $\Delta rpc\_i$ corresponding to each virtual surface is minimized.

Subsequently, the external force target generator 27 carries out the processing in S27. In this step S27, the external force target generator 27 determines whether the position of the on-virtual-surface external force action point (Irp_i+$\Delta rpc\_i$) after having been corrected by $\Delta rpc\_i$, which has been determined in S25, from the position of a provisional on-virtual-surface external force action point Irp_i in every virtual surface satisfies an external force action point existence region condition.

Here, the external force action point existence region condition is a condition that the position of the on-virtual-surface external force action point of each virtual surface after the correction based on $\Delta rpc\_i$ exists in the existence permissible region on the virtual surface corresponding to the existence permissible region of the external force action point of each surface to be contacted at the current time generated by the desired motion generator 25 (the region obtained by projecting the existence permissible region of the external force action point on the surface to be contacted onto a virtual surface). In this case, the existence permissible region of an external force action point on a surface to be contacted is projected onto a virtual surface in the same manner as that in the case where the external force action point on the surface to be contacted is projected onto a virtual surface, as illustrated in FIG. 12.

The external force action point existence region condition is equivalent to a condition that the point obtained inversely projecting the on-virtual-surface external force action point on each virtual surface, which has been corrected by $\Delta$rpc_i, onto the surface to be contacted corresponding to the virtual surface exists in the existence permissible region of the external force action point on the surface to be contacted.

If the determination result in S27 is affirmative, then the moment error errM can be canceled simply by correcting the position of the external force action point of each virtual surface from the provisional on-virtual-surface external force action point (subsequently correcting the position of the external force action point of each surface to be contacted from the provisional external force action point) without the need for correcting the required virtual surface translational force of each virtual surface determined by the processing up to S15.

Hence, in this case, the external force target generator 27 carries out the processing in S29 and terminates the processing of the flowcharts in FIG. 7 to FIG. 9 at current time. In the processing of S29, the external force target generator 27 determines a desired external force to be applied to the robot 1 from each surface to be contacted and a desired external force action point at current time.

More specifically, the external force target generator 27 converts the required virtual surface translational force (N_i, F_i) in each virtual surface determined by the processing up to S15 into the translational force to be applied to the robot 1 from a surface to be contacted corresponding to the virtual surface on the basis of the posture difference between the virtual surface and the surface to be contacted corresponding thereto, and determines the converted translational force as the desired value of the translational external force, which constitutes the desired external force.

In this case, the aforesaid conversion for each virtual surface is implemented, for example, as described below. The external force target generator 27 calculates a rotational transform matrix RO for converting the posture (the direction of a normal vector) of each virtual surface into the posture (the direction of a normal vector) of the surface to be contacted corresponding to the virtual surface on the basis of the posture difference between the virtual surface and the surface to be contacted. Then, the external force target generator 27 multiplies the rotational transform matrix RO by the required virtual surface translational force (vector) thereby to convert the required virtual surface translational force into the desired value of a translational external force applied from the surface to be contacted to the robot 1.

According to the present embodiment, therefore, the desired value (the desired translational force) of a translational external force that should be applied from each surface to be contacted to the robot 1 is determined as a translational external force constituted of the virtual surface normal force component N_i and the virtual surface frictional force component F_i in a virtual surface corresponding to the surface to be contacted, and a normal force component (a component perpendicular to a surface to be contacted) and a frictional force component (a component parallel to a surface to be contacted), which share the same magnitude.

Further, the external force target generator 27 determines the $\Delta$rpc_i, which has been determined in S25, as the moment compensation amount. Then, the external force target generator 27 determines the point that is obtained by inversely projecting the on-virtual-surface external force action point on each virtual surface, which has been corrected by $\Delta$rpc_i, onto the surface to be contacted corresponding to the virtual surface (in the present embodiment, a point at which a straight line which passes a corrected on-virtual-surface external force action point and which is perpendicular to the virtual surface intersects with the surface to be contacted corresponding to the virtual surface) as the desired external force action point on the surface to be contacted.

In the processing of S29, the desired value of the twisting force (the desired twisting force) of each surface to be contacted, which is one of the constituent elements of a desired external force, is set to zero on any surface to be contacted.

Meanwhile, if the determination result in S27 described above is negative, then the on-virtual-surface external force action point correction amount $\Delta$rpc_i in each virtual surface for canceling the moment error errM must be restricted so as to satisfy the aforesaid external force action point existence region condition.

Subsequently, therefore, the external force target generator 27 carries out the processing in S31. In this step S31, the external force target generator 27 determines, as the first compensation amount, the on-virtual-surface external force action point restricted correction amount $\Delta$rpc_lim_i obtained by restricting the on-virtual-surface external force action point correction amount $\Delta$rpc_i in each virtual surface such that the external force action point existence region condition is satisfied.

In this case, for a virtual surface that satisfies the external force action point existence region condition, the correction amount $\Delta$rpc_i determined in S25 is directly determined as the on-virtual-surface external force action point restricted correction amount $\Delta$rpc_lim_i.

Meanwhile, for a virtual surface that does not satisfy the external force action point existence region condition, the external force target generator 27 determines the on-virtual-surface external force action point restricted correction amount $\Delta$rpc_lim_i as described below.

Figure 13:
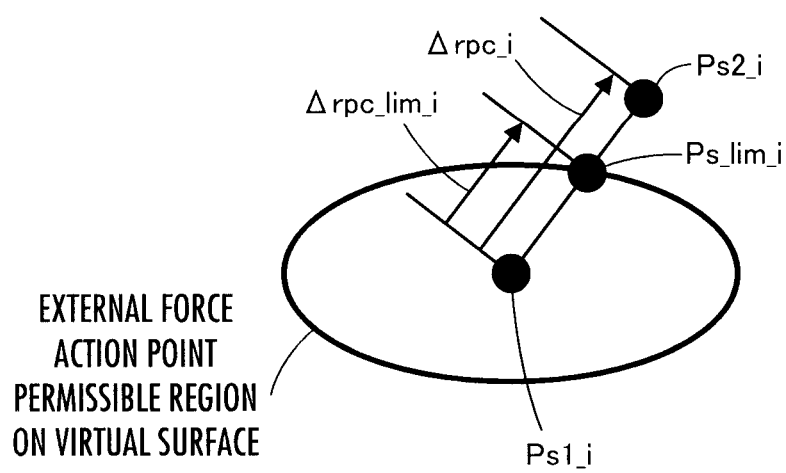
FIG. 13 is a diagram for describing the processing in S25 of FIG. 8.

Referring to FIG. 13, the on-virtual-surface external force action point before a correction (the point obtained by projecting a provisional external force action point on a surface to be contacted onto a virtual surface) is denoted by Ps1_i, and the point obtained by correcting the on-virtual-surface external force action point Ps1_i before the correction by using the on-virtual-surface external force action point correction amount $\Delta$rpc_i determined in S25 is denoted by Ps2_i. In this case, for a virtual surface that does not satisfy the external force action point existence region condition, the on-virtual-surface external force action point Ps2_i after a correction will deviate from the external force action point permissible region on a virtual surface, as illustrated.

In FIG. 13, for the convenience of illustration, the external force action point permissible region on a virtual surface is illustrated as a simple elliptical region. Alternatively, however, the region may of course have another shape.

At this time, the external force target generator 27 determines the on-virtual-surface external force action point restricted correction amount $\Delta$rpc_lim_i such that the point obtained by correcting the point Ps1_i by the on-virtual-surface external force action point restricted correction amount $\Delta$rpc_lim_i coincides with the point Ps_lim_i that exists on the boundary of the external force action point permissible region on a virtual surface on a line segment connecting, for example, the point Ps1_i before a correction and the point Ps2_i, which has been corrected by $\Delta$rpc_i.

Instead of determining $\Delta$rpc_lim_i as described above, for example, the on-virtual-surface external force action point restricted correction amount $\Delta$rpc_lim_i may be determined such that the point obtained by correcting the point Ps1_i by the on-virtual-surface external force action point restricted correction amount $\Delta$rpc_lim_i coincides with a point closest to the point Ps2_i, which has been corrected by using Δrpc_i (the point with a smallest distance from the point Ps2_i), out of the points on the boundary of the on-virtual-surface external force action point permissible region.

In the following description, the external force action point on each virtual surface that has been corrected using the on-virtual-surface external force action point restricted correction amount Δrpc_lim_i determined in S31 as described above is referred to as the on-virtual-surface restricted corrected external force action point.

After carrying out the processing in S31 as described above, the external force target generator 27 carries out the processing in S33. In this step S33, the external force target generator 27 calculates a remaining error component errM' in the moment error errM as an error component that cannot be canceled by the on-virtual-surface external force action point restricted correction amount Δrpc_lim_i in each virtual surface determined in S29.

More specifically, the external force target generator 27 calculates the on-virtual-surface external force action point correction error Δrpc_err_i, which is the difference between the on-virtual-surface external force action point correction amount Δrpc_i before restriction and the on-virtual-surface external force action point restricted correction amount Δrpc_lim_i (=Δrpc_i−Δrpc_lim_i). Then, the external force target generator 27 calculates the remaining error component errM' according to the following expression 09 obtained by replacing Δrp_i in expression 05 above by Δrpc_err_i.

$$errM'=\Sigma(\Delta rpc\_err\_i*(N\_i+F\_i)+\Delta Poff\_i*F\_i) \quad \text{Expression 09}$$

In this case, ΔPoff_i in expression 09 is a value determined on the basis of Δrpc_err_i and determined as the value of ΔPoff_i when Δrp_i=Δrpc_err_i applies according to a relationship between ΔPoff_i and Δrp_i in the above expression 05.

Alternatively, for example, a moment change amount ΔMs calculated according to an expression obtained by replacing Δrp_i in the above expression 05 by Δrpc lim i, that is, the change amount of a moment about a moment reference point that occurs when the position of the external force action point on each virtual surface is corrected by Δrpc lim i from a provisional on-virtual-surface external force action point may be calculated, and the change amount of the moment may be subtracted from the moment error errM thereby to calculate the remaining error component errM'. In this case, ΔPoff_i may be determined as the value of ΔPoff i when Δrp_i+Δrpc lim i applies according to a relationship between ΔPoff i and Δrp_i in the above expression 05.

After calculating the remaining error component errM' in errM as described above, the external force target generator 27 sequentially carries out the processing in S35 and S37 illustrated in FIG. 9, thereby determining the virtual surface frictional force component correction amount f_i as the second compensation amount and a virtual surface twisting force R_i as the third compensation amount.

In S35, the Jacobian matrix Jfr is calculated. The Jacobian matrix Jfr represents the relationship among a moment Mfr, f_i and R_i by the following expression 11. The moment Mfr is generated about the moment reference point by the virtual surface frictional force component correction amount f_i and the virtual surface twisting force R_i when f_i and R_i of arbitrary values are applied to each virtual surface (each virtual surface set in S01), that is, when f_i and R_i are additionally applied to the on-virtual-surface restricted corrected external force action point that has been corrected using Δrpc_lim_i.

$$Mfr=Jfr*(f\_i\ R\_i)^T \quad \text{Expression 11}$$

In this expression 11, $(f\_i\ R\_i)^T$ denotes a vertical vector having f_i and R_i as the components thereof. Here, the virtual surface frictional force component correction amount f_i is a moment compensation amount that should be determined such that the total sum (resultant force) thereof becomes zero.

Hence, in the virtual surface frictional force component correction amount f_i, the virtual surface frictional force component correction amount corresponding to any one virtual surface is uniquely determined as a translational force obtained by reversing the sign of the total sum of the remaining virtual surface frictional force component correction amounts. For this reason, f_i as a component of the vertical vector $(f\_i\ R\_i)^T$ in expression 11 is obtained by removing f_i corresponding to any one virtual surface (hereinafter denoted by f_i0). Further, taking f_i0 as a translational force obtained by reversing the sign of the total sum of the remaining f_i's, the Jacobian matrix Jfr is determined such that a moment component about a moment reference point attributable to the translational force will be included in Mfr calculated by the computation of the right side of expression 11.

Subsequently, in S37, the external force target generator 27 calculates the set $(f\_i\ R\_i)^T$ of f_i and R_i that satisfies the relationship of expression 11 when Mfr of expression 11 coincides with the remaining error component errM'.

Here, the Jacobian matrix Jfr in expression 11 is usually not a regular matrix, so that the external force target generator 27 calculates a pseudo inverse matrix Jfr_inv of the Jacobian matrix Jfr determined in S37 and multiplies the pseudo inverse matrix Jfr_inv by the remaining error component errM' so as to calculate the set of f_i and R_i. In this case, the pseudo inverse matrix Jfr_inv is determined such that, for example, the mean value of the squared values or absolute values of the f_i's and R_i's constituting the vertical vector $(f\_i\_R\_i)^T$ of expression 11 is minimized. Incidentally, the aforesaid f_i0 is determined as the value having a sign reversed from the sign of the total sum of f_i's calculated as described above.

Supplementarily, the pseudo inverse matrix Jfr_inv may be determined such that, for example, the weighted mean value of the squared values or absolute values of f_i's and R_i's, respectively, constituting the vertical vector $(f\_i\ R\_i)^T$ of expression 11 is minimized. For example, the weight for each f_i is set such that, for a virtual surface having a higher frictional force upper limit value, the magnitude of f_i in the virtual surface relatively increases, and the Jfr_inv may be determined such that the weighted mean value using the weight is minimized.

As another alternative, for example, in the case where the virtual surface set in S01 includes the opposing virtual surfaces Sna and Snb, the virtual surface frictional force component correction amount f_na or f_nb in the opposing virtual surface Sna or Snb, whichever has a smaller magnitude of the virtual surface normal force component N_i, may be set to zero.

In the case where the desired motion is the wall climbing gait, the processing in the aforesaid S35 and S37 is carried out, for example, as described below.

For instance, in the motional state illustrated in FIG. 11(*b*), a case where the remaining error component errM' of the moment error errM is assumed. Further, the position vectors (the position vectors relative to moment reference points) of the external force action points after having been subjected to on-virtual-surface restricted corrections in the virtual surfaces S3*a*, S2*a*, and S2*b* corresponding to the floor surface FL and the wall surfaces WL1 and WL2, respectively, are denoted by rp_3*a*, rp_2*a* and rp_2*b*, respectively. At this time, the relationship between the on-virtual-surface frictional force component correction amounts f_3a, f_2a, f_2b in the virtual surfaces S3a, S2a, S2b and the virtual surface twisting forces R_3a, R_2a, R_2b and the moment Mfr generated about the moment reference point by these f_3a, f_2a, f_2b, R_3a, R_2a, and R_2b is indicated by the following expression 11a.

$$Mfr = rp\_3a * f\_3a + rp\_2a * f\_2a + rp\_2b * f\_2b + R\_3a + R\_2a + R\_2b \qquad \text{Expression 11a}$$

In expression 11a, (rp_3a*f_3a), (rp_2a*f_2a), and (rp_2b*f_2b), respectively, denote vector products.

In this case, regarding the virtual surface frictional force component correction amount, f_3a+f_2a+f_2b=0 applies, leading to f_2b=−(f_3a+f_2a). Accordingly, expression 11a can be rewritten to the following expression 11b, which does not include, for example, f_2b.

$$Mfr = (rp\_3a - rp\_2b) * f\_3a + (rp\_2a - rp\_2b) * f\_2a + R\_3a + R\_2a + R\_2b \qquad \text{Expression 11b}$$

Therefore, in S35, the Jacobian matrix Jfr in the aforesaid expression 11 is determined by denoting the right side of the expression 11b by a coordinate component.

Then, in S37, the pseudo inverse matrix Jfr_inv of the Jacobian matrix Jfr is calculated as described above, and the determined Jfr_inv is multiplied by the remaining error component errM' to calculate f_3a, f_2a, R_3a, R_2a, and R_2b. Further, f_3b is calculated from f_3a and f_2a according to the relationship f_2b=−(f_3a+f_2a).

Supplementarily, for example, at the time after the motional state illustrated in FIG. 3(c) in the wall climbing gait, that is, in the situation where there are only two virtual surfaces, namely, the opposing virtual surfaces S2a and S2b, the Jacobian matrix Jfr can be determined in the same manner as that described above on the basis of the expression obtained by removing (rp_3a*f_3a) and R_3a from the right side of expression 11a and the relationship denoted by f_2a+f_2b=0.

If the processing up to S37 described above causes the determination result in S27 to be negative, then a set of a required virtual surface translational force (a required virtual surface translational force that has been corrected on the basis of f_i), an on-virtual-surface external force action point (an on-virtual-surface external force action point that has been corrected on the basis of Δrpc_lim_i), and an on-virtual-surface twisting force R_i, which set satisfies the first A requirement and the first B requirement and also realizes the compensation total moment external force Mall_ad will be substantially determined. In this case, however, the required virtual surface translational force is corrected on the basis of f_i, so that the virtual surface frictional force component of the corrected required virtual surface translational force does not necessarily satisfy the second requirement. Further, the on-virtual-surface twisting force R_i requires the frictional force between the virtual surface to which the twisting force R_i is to be applied and the robot 1, i.e., the frictional force between the surface to be contacted corresponding to the virtual surface and the robot 1.

Therefore, after the virtual surface frictional force component correction amount f_i and the virtual surface twisting force R_i are determined as described above, the external force target generator 27 subsequently carries out the determination processing in S39. In this step S39, the external force target generator 27 determines whether, in each virtual surface, the virtual surface frictional force component F_i that has been corrected on the basis of f_i (the frictional force component of the total sum of F_i and f_i determined by the processing up to S15) satisfies the second requirement and also satisfies a fourth requirement that the magnitude of R_i be a predetermined upper limit value or less set according to the magnitude of the virtual surface normal force component N_i.

Here, the predetermined upper limit value in the fourth requirement is a value set for each virtual surface as an upper limit value of the magnitude of a twisting force that can be generated by a frictional force of a virtual surface to which R_i is applied. According to the present embodiment, the upper limit value (hereinafter referred to as the twisting force upper limit value) is set to a value obtained by multiplying a coefficient μr_i set for each virtual surface on the basis of the environmental information related to the properties of the surface to be contacted corresponding to each virtual surface (hereinafter referred to as the twisting force coefficient) by the magnitude |N_i| of the virtual surface normal force component N_i (=μr_i*|N_i|).

In the present embodiment, before the processing by the external force target generator 27 begins, the twisting force coefficients of the virtual surfaces associated with individual surfaces to be contacted are determined beforehand on the basis of the environmental information and retained in a memory. Further, in S39, the twisting force coefficient in a virtual surface to which R_i is to be applied is selected from among the twisting force coefficients retained in the memory.

Supplementarily, the twisting force coefficient μr_i in each virtual surface may be set such that the twisting force coefficient μr_i is determined at each time during the motion of the robot 1, considering not only the environmental information on the properties of a surface to be contacted corresponding to the virtual surface but also the magnitude of the virtual surface frictional force component F_i in the virtual surface and the size of the surface of contact between the robot 1 and the surface to be contacted.

If the determination result in S39 is affirmative, the external force target generator 27 carries out the processing in S41 and terminates the processing illustrated in the flowcharts of FIG. 7 to FIG. 9 at the current time. In the processing in this step S41, the external force target generator 27 determines the desired external force and the desired external force action point of the robot 1 from each surface to be contacted at the current time.

More specifically, the external force target generator 27 determines the required virtual surface translational force in each virtual surface at the current time on the basis of the required virtual surface translational forces (N_i, F_i) in each virtual surface determined by the processing up to S15 and the virtual surface frictional force component correction amount f_i determined by the processing in S37. In this case, the virtual surface normal force component N_i determined by the processing up to S15 is directly determined as the virtual surface normal force component in the virtual surface and the frictional force component obtained by adding the virtual surface frictional force component correction amount f_i to the virtual surface frictional force component F_i determined by the processing up to S15 is determined as the virtual surface frictional force component in the virtual surface.

Regarding the virtual surface in which f_i=0 applies, the required virtual surface translational force (N_i, F_i) determined by the processing up to S15 will be eventually determined directly as the required virtual surface translational force in the virtual surface.

Further, the external force target generator 27 determines the virtual surface twisting force R_i determined by the processing in S37 as the twisting force in the virtual surface corresponding to the R_i.

Subsequently, the external force target generator 27 converts the required virtual surface translational force in each virtual surface determined as described above into a translational force to be applied to the robot 1 from the surface to be contacted on the basis of the posture difference between the virtual surface and the surface to be contacted corresponding thereto, and then determines the translational force as the desired value of the translational external force (the desired translational force), which is a constituent element of the desired external force. Similarly, the external force target generator 27 converts the virtual surface twisting force in each virtual surface into a twisting force to be applied to the robot 1 from the surface to be contacted corresponding to the virtual surface and determines the converted twisting force as the desired value of a twisting force (the desired twisting force), which is a constituent element of the desired external force.

Incidentally, the aforesaid conversion is the same conversion as that described in relation to the processing in S29 of FIG. 8, and carried out using the rotational transform matrix RO determined on the basis of the posture difference.

Further, as with the case of the processing in S29, the external force target generator 27 determines the point obtained by inversely projecting the external force action point on each virtual surface, which has been corrected on the basis of the on-virtual-surface external force action point restricted correction amount Δrpc_lim_i determined in S31, onto a surface to be contacted corresponding to the virtual surface as the desired external force action point on the surface to be contacted.

Meanwhile, in the case where the determination result in S39 is negative, that is, if there is a virtual surface that does not satisfy the second requirement or the fourth requirement, then the frictional force in the virtual surface would be inadequate for accomplishing the compensation total moment external force Mall_ad. In this case, the external force target generator 27 subsequently carries out the processing in S43. In this step S43, the external force target generator 27 determines whether the virtual surface that does not satisfy the second requirement or the fourth requirement in the determination processing in S39 is the opposing virtual surface Sna or Snb (n=1 or 2 or 3).

In the situation where the determination result in S43 is negative, the magnitude of the virtual surface normal force component in the virtual surface that does not satisfy the second requirement or the fourth requirement cannot be increased while satisfying the first A requirement, which means that the magnitude of the virtual surface frictional force component in the virtual surface cannot be increased at the frictional force upper limit value or less. In this case, therefore, the external force target generator 27 decides in S47 that the motional state of the robot 1 is inappropriate (or the desired motion needs to be corrected or the like) and interrupts the processing illustrated in the flowcharts of FIG. 7 to FIG. 9. In this case, the external force target generator 27 outputs error information to the desired motion generator 25. Then, on the basis of the error information, the desired motion generator 25 creates a desired motion once again or creates a desired motion that suspends the motion of the robot 1.

Thus, in the present embodiment, if the processing up to S37 causes the determination result in S27 to be negative, then the set of the required virtual surface translational force (the required virtual surface translational force that has been corrected on the basis of f_i), the on-virtual-surface external force action point (the on-virtual-surface external force action point that has been corrected on the basis of Δrpc_lim_i), and the on-virtual-surface twisting force R_i, which set satisfies the first A requirement and the first B requirement and which permits the rotational motion of the entire robot 1 in the desired motion of the robot 1, is determined and then the motional state of the robot 1 is assessed by the determination processing in S39 and S43. If the determination results in these steps S39 and S43 are both negative, then the motional state of the robot 1 is assessed as inappropriate.

Meanwhile, in the situation where the determination result in S43 is affirmative, the magnitude of the virtual surface normal force components N_na and N_nb of the opposing virtual surfaces Sna and Snb (n=1 or 2 or 3) which include a virtual surface that does not satisfy the second requirement or the fourth requirement and which are parallel to each other can be increased while satisfying the first A requirement (while maintaining N_na+N_nb constant).

If the determination result in S43 is affirmative, then the external force target generator 27 subsequently carries out the processing in S45. In this step S45, the external force target generator 27 determines the increment IN_n of the magnitude of each of the virtual surface normal force components N_na and N_nb of the opposing virtual surfaces Sna and Snb such that the second requirement and the fourth requirement are satisfied.

More specifically, the external force target generator 27 calculates, as the candidate value of the increment IN_n, the value obtained by dividing the result, which is obtained by subtracting the frictional force upper limit value used in the determination processing in S39 (=μ_i*|N_i|) from the magnitude of the virtual surface frictional force component F_i that has been corrected on the basis of the virtual surface frictional force component correction amount f_i, by the frictional coefficient μ_i (=(|F_i|−μ_i*|N_i|)/μ_i) in each of the opposing virtual surfaces Sna and Snb including a virtual surface that does not satisfy the second requirement (hereinafter, the candidate value of IN_n calculated as described above will be referred to as the frictional force component compensation candidate value). In this case, the frictional force component compensation candidate value IN_n is calculated for each of the opposing virtual surfaces Sna and Snb including a virtual surface that does not satisfy the second requirement.

For example, in the case where the desired motion of the robot 1 is the wall climbing gait, if the determination result in S39 indicates that one or both of the opposing virtual surfaces S2a and S2b corresponding to the wall surfaces WL1 and WL2 do not satisfy the second requirement, then the frictional force component compensation candidate values of IN_2, namely, ((|F_2a|−μ_2a*|N_2a|)/μ_2a, (|F_2b|−μ_i2b*|N_2b|)μ_2b), are calculated in these opposing virtual surfaces S2a and S2b.

Further, the external force target generator 27 calculates, as the candidate value of the increment IN_n, the value obtained by dividing the result, which is obtained by subtracting the twisting force upper limit value used in the determination processing in S39 (=μr_i*|N_i|) from the magnitude of the virtual surface twisting force R_i, by the twisting force coefficient μr_i (=(|R_i|−μr_i*|N_i|)/μr_i) in each of the opposing virtual surfaces Sna and Snb including a virtual surface that does not satisfy the fourth requirement (hereinafter, the candidate value of IN_n calculated as described above will be referred to as the twisting force compensation candidate value). In this case, as with the frictional force component compensation candidate values, the twisting force compensation candidate value IN_n is calculated for each of the opposing virtual surfaces Sna and Snb including a virtual surface that does not satisfy the fourth requirement.

Subsequently, for the opposing virtual surfaces Sna and Snb, for which only the frictional force component compensation candidate values out of the frictional force component compensation candidate values and the twisting force compensation candidate values have been calculated, the external force target generator 27 determines the frictional force component compensation candidate value of the opposing virtual surface Sna or Snb, whichever frictional force component compensation candidate value is larger, as the increment IN_n of the magnitude of the virtual surface normal force components N_na and N_nb in the opposing virtual surfaces Sna and Snb.

Further, for the opposing virtual surfaces Sna and Snb, for which only the twisting force compensation candidate values out of the frictional force component compensation candidate values and the twisting force compensation candidate values have been calculated, the external force target generator 27 determines the twisting force compensation candidate value of the opposing virtual surface Sna or Snb, whichever twisting force compensation candidate value is larger, as the increment IN_n of the magnitude of the virtual surface normal force components N_na and N_nb in the opposing virtual surfaces Sna and Snb.

Further, for the opposing virtual surfaces Sna and Snb for which both the frictional force component compensation candidate values and the twisting force compensation candidate values have been calculated, the external force target generator 27 determines a largest candidate value of the frictional force component compensation candidate values and the twisting force compensation candidate values of the opposing virtual surfaces Sna and Snb, respectively, as the increment IN_n of the virtual surface normal force components in the opposing virtual surfaces.

Here, when the virtual surface normal force components N_na and N_nb in the opposing virtual surfaces Sna and Snb are increased by the increment IN_n determined as described above in S45, the internal force in a direction that is orthogonal to the opposing virtual surfaces Sna and Snb increases. In addition, as N_na and N_nb increase, the moment generated about the moment reference point usually undesirably changes. According to the present embodiment, therefore, the external force target generator 27 carries out the processing from S13 in FIG. 7 again after carrying out the processing in S45.

This completes the detailed description of the processing carried out by the external force target generator 27 in the present embodiment.

In the processing by the external force target generator 27 described above, first, the processing from S05 to S15 provisionally determines the required virtual surface translational forces (N_i, F_i) necessary for accomplishing the compensation total translational external force Fall_ad related to a translational motion of the entire robot 1. In this case, the required virtual surface translational forces (N_i, F_i) are provisionally determined under the guideline that the first requirement (the first A requirement and the first B requirement), the second requirement, and the third requirement are satisfied, without considering the moment generated about the moment reference point. In this case, the mutual posture relationship between the virtual surfaces is established beforehand, so that the provisional values of the required virtual surface translational forces (N_i, F_i) that enable the compensation total translational external force Fall_ad to be accomplished can be efficiently determined by a simple algorithm.

Further, if the determination results in both S07 and S09 are negative or if the determination results in S07, S09, and S15 are negative, affirmative, and negative, respectively, then it is assessed that the motional state of the robot 1 is inappropriate, and the processing by the external force target generator 27 is interrupted. Thus, with a simple algorithm, a motional state of the robot 1 that tends to lead to an excessive frictional force between a surface to be contacted and the robot 1 or a motional state of the robot 1 that tends to lead to an excessive internal force of the robot 1 can be efficiently assessed as inappropriate for implementing the compensation total translational external force Fall_ad. This makes it possible to prevent the occurrence of a situation where the motion of the robot 1 is continued in a state where it is difficult to stably implement the motion of the robot 1 (for example, the motion of the robot 1 can be suspended).

Further, after determining the provisional values of the required virtual surface translational forces (N_i, F_i) that enable the compensation total translational external force Fall_ad to be accomplished as described above, the processing from S19 to S37 (except for the processing in S29) determines the on-virtual-surface external force action point correction amount Δrpc_i as the additional manipulated variable (the moment compensation amount) for implementing the compensation total moment external force Mall_ad related to a rotational motion of the entire robot 1, or determines the set of the on-virtual-surface external force action point restricted correction amount Δrpc_lim_i, the virtual surface frictional force component correction amount Δf_i, and the virtual surface twisting force R_i. These moment compensation amounts are manipulated variables that will not change the resultant force of the required on-virtual-surface translational forces before and after an object to be corrected is corrected using the moment compensation amounts.

Thus, simply combining the provisional values of the required virtual surface translational forces (N_i, F_i) determined by the processing in S05 to S15 and the moment compensation amounts determined by the processing in S19 to S37 (except for the processing in S29) makes it possible to determine the set of the required on-virtual-surface translational force, the on-virtual-surface twisting force, and the on-virtual-surface external force action point (including the case where the on-virtual-surface twisting force is zero) that allow both the compensation total translational external force Fall_ad and the compensation total moment external force Mall_ad to be properly accomplished. Then, the set of the required on-virtual-surface translational force, the on-virtual-surface twisting force, and the on-virtual-surface external force action point makes it possible to efficiently and properly determine a desired external force (a desired translational force and a desired twisting force) to be applied to the robot 1 from surfaces to be contacted and a desired external force action point.

In this case, if the determination results in S39 and S43 are both negative, then the motional state of the robot 1 is assessed as inappropriate and the processing by the external force target generator 27 is interrupted. This makes it possible to efficiently assess that a motional state of the robot 1 which tends to lead to an excessive frictional force between a surface to be contacted and the robot 1 is inappropriate in achieving the compensation total translational external force Fall_ad and the compensation total moment external force Mall_ad. This makes it possible to prevent the occurrence of a situation where the motion of the robot 1 is continued in a state where it is difficult to stably implement the motion of the robot 1 (for example, the motion of the robot 1 can be suspended).

In the present embodiment, a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement except for the case where the processing by the external force target generator 27 causes any one of the determination results in S09, S15 and S43 to be negative (in the case where a motional state of the robot 1 is inappropriate).

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, the desired translational force applied from each surface to be contacted to the robot 1 can be determined such that the compensation total translational external force Fall_ad is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

In particular, according to the present embodiment, the on-virtual-surface external force action point correction amount Δrpc_i (the first compensation amount) is preferentially determined as the moment compensation amount. This means that if the determination result in S27 is affirmative, then the moment compensation amount includes neither the virtual surface frictional force component correction amount f_i nor the virtual surface twisting force R_i.

Thus, the magnitude of the virtual surface frictional force component F_i in each virtual surface can be controlled to a minimum within a range in which the first A requirement, the first B requirement, the second requirement, and the third requirement are satisfied. As a result, the magnitude of the frictional force component of the desired translational force in each surface to be contacted can be also controlled to a minimum or approximated to a minimum.

Further, if the virtual surfaces set in S01 include the opposing virtual surfaces Sna and Snb, in the case where the determination result in S27 is affirmative and also in the case where the determination result in S39 is affirmative, the magnitude of the internal force generated in the robot 1 between the opposing virtual surfaces Sna and Snb (the magnitude of N_na or N_nb, whichever is smaller) can be controlled to a minimum within a range in which the first A requirement, the first B requirement, the second requirement, and the third requirement are satisfied. Accordingly, the magnitude of the internal force generated in the robot 1 between the two surfaces to be contacted corresponding to the opposing virtual surfaces Sna and Snb (e.g., the wall surfaces WL1 and WL2 in the wall climbing gait) can be also controlled to a minimum or approximated to a minimum.

Thus, the desired translational forces in the surfaces to be contacted including the two surfaces to be contacted corresponding to the opposing virtual surfaces Sna and Snb can be determined such that the share of the motive power (the driving torque in the present embodiment) that can be generated by the joint actuators 11 of the robot 1, which share is necessary for generating the internal force will be reduced.

Here, a supplementary description will be given of the relationship of correspondence between the present embodiment described above and the present invention. In the present embodiment, the external force target generator 27 of the control unit 21 functions as the external force target generating device in the present invention.

In addition, in the processing carried out by the external force target generator 27, the processing in S01 implements the virtual surface group setting unit in the present invention.

Further, the processing in S02 implements the basic required total external force determining unit in the present invention (or the basic required total external force determining unit in the thirteenth aspect of the invention). In this case, the required total translational external force Fall corresponds to the basic required total translational external force in the present invention, and the required total moment external force Mall corresponds to the basic required total moment external force in the present invention.

Further, the processing in S03 implements the translational external force compensation amount determining unit and the moment external force compensation amount determining unit in the present invention. In this case, in the present embodiment, a position of an overall center-of-gravity point of the robot 1 is used as the first motional state amount, and the difference ΔPg corresponds to the first motional state amount error in the present invention (or the motional state amount error in the thirteenth aspect of the invention). In addition, in the present embodiment, an angular momentum about the overall center-of-gravity point of the robot 1 is used as the second motional state amount, and the difference ΔLg corresponds to the second motional state amount error in the present invention.

Further, the compensation total translational external force Fall_ad and the compensation total moment external force Mall_ad calculated in the processing of S04 correspond to the compensation total translational external force and the compensation total moment external force in the present invention.

The processing in S05 to S15 except for the processing in S13 and S15 that follow S45 of FIG. 9 implements the provisional required virtual surface translational force determining unit in the present invention. In this case, the frictional force upper limit value (μ_i*|N_i|) and the internal force upper limit value IFC_n correspond to the first predetermined value and the second predetermined value, respectively, in the present invention.

The processing in S19 implements the provisional required virtual surface translational force dependent moment calculating unit in the present invention.

The processing in S21 to S37 except for the processing in S29 implements the moment compensation amount determining unit in the present invention. In this case, the processing in S23 to S31 except for the processing in S29 implements the first processing unit in the present invention, the processing in S33 implements the second processing unit in the present invention, and the processing in S35 and S37 implements the third processing unit in the present invention. The case where the determination result in S27 is negative corresponds to the case where the moment error errM cannot be canceled by the first compensation amount (on-virtual-surface external force action point correction amount).

Further, the processing in S39 implements the first determining unit and the second determining unit. In this case, the twisting force upper limit value (μr_i*|N_i|) corresponds to the third predetermined value in the present invention.

The processing in S45 and the processing in S13 and S15 that follow S45 implement the provisional required virtual surface translational force re-determining unit in the present invention.

Further, the processing in S29 and S41 implements the surface-to-be-contacted desired external force and desired action point determining unit in the present invention.

The processing in S05 to S15 and S19 to S45 implements the required virtual surface translational force determining unit in the present invention (the thirteenth aspect of the invention).

In addition, in the processing carried out in S29 and S41, the processing for determining the desired translational force implements the desired surface-to-be-contacted translational force determining unit in the present invention (the thirteenth aspect of the invention).

[Second Embodiment]

Figure 14:
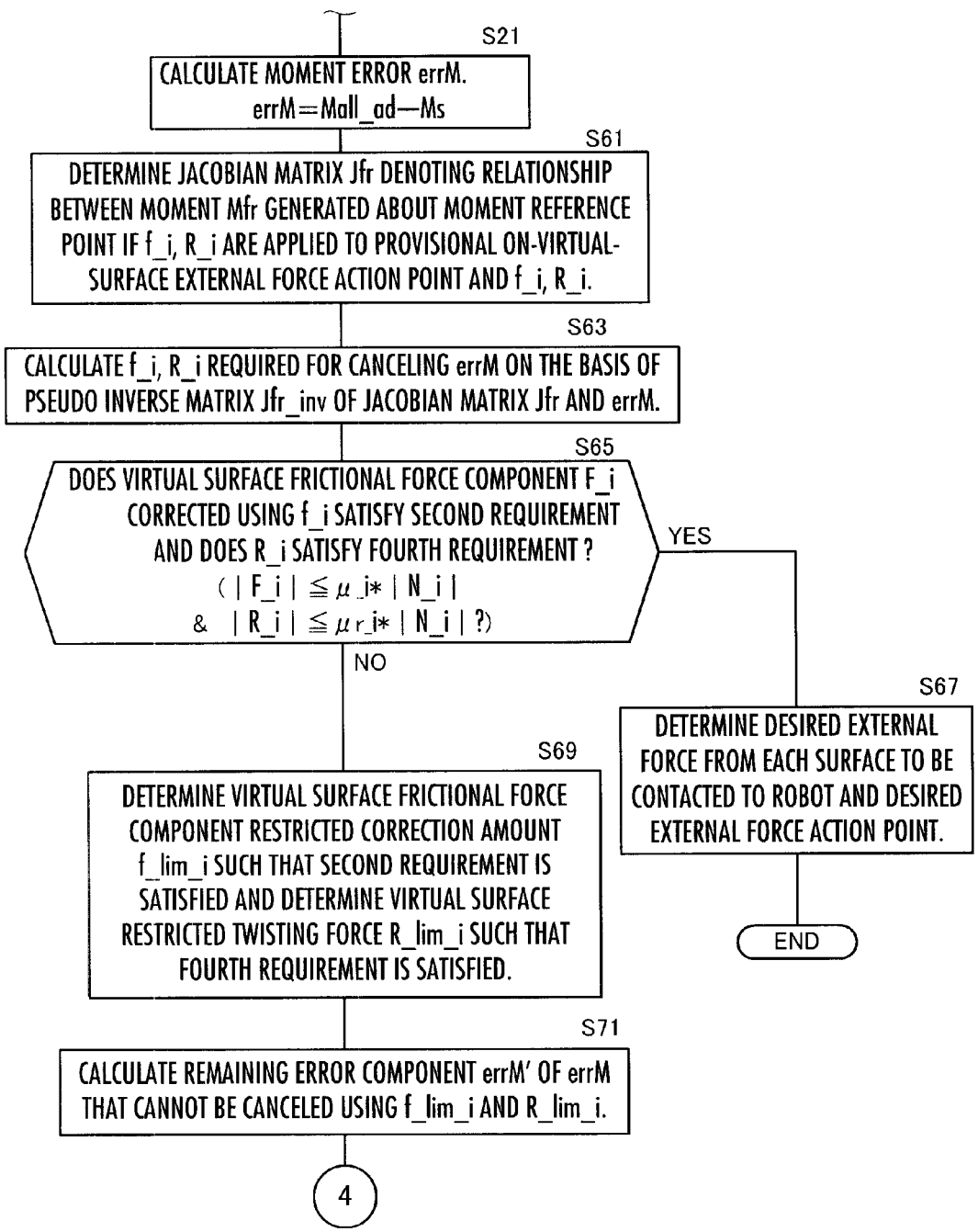
FIG. 14 and FIG. 15 are flowcharts illustrating the processing in the second embodiment by the external force target generator shown in FIG. 2.

A second embodiment of the present invention will now be described with reference to FIG. 14 and FIG. 15. The present embodiment differs from the first embodiment only partly in the processing carried out by the external force target generator 27, so that the description of the same aspects as those of the first embodiment will be omitted.

In the first embodiment, the on-virtual-surface external force action point correction amount as the first compensation amount has been preferentially determined in the processing for determining the moment compensation amount for canceling the moment error errM (the processing in S21 to S37).

However, it is alternately possible to determine, for example, the virtual surface frictional force component correction amount f_i serving as the second compensation amount or the virtual surface twisting force R_i serving as the third compensation amount in preference to the on-virtual-surface external force action point correction amount. The present embodiment illustrates an example where the second compensation amount or the third compensation amount is preferentially determined as the moment compensation amount as described above.

According to the present embodiment, the processing in S01 to S21 carried out by an external force target generator 27 is the same as that of the first embodiment. Further, in the present embodiment, the external force target generator 27 executes the processing illustrated by the flowcharts of FIG. 14 and FIG. 15 after the processing in S21 (the processing for calculating the moment error errM).

The external force target generator 27 carries out the processing in S61 after the processing in S21. In this step S61, the external force target generator 27 carries out the same processing as that in S35 described in the first embodiment so as to determine the Jacobian matrix Jfr that denotes the relationship between the virtual surface frictional force component correction amount f_i (the second compensation amount) and the virtual surface twisting force R_i (the third compensation amount) and the moment Mfr generated about the moment reference point by these f_i and R_i according to the aforesaid expression 11. However, in the present embodiment, the provisional on-virtual-surface external force action point (the point obtained by projecting the provisional external force action point on a surface to be contacted generated by the desired motion generator 25 onto the virtual surface corresponding to the surface to be contacted) is used as the external force action point on each virtual surface to which the f_i and R_i are applied in S61.

Subsequently, the external force target generator 27 carries out the processing in S63. In this step S63, the external force target generator 27 calculates the set of f_i and R_i, namely, $(f\_i \; R\_i)^T$, in the case where Mfr of the aforesaid expression 11 coincides with the moment error errM determined in S21.

It is not always necessary to calculate both f_i and R_i, and either one thereof may be set to zero.

In this case, by the same processing as that in S37 in the first embodiment, the external force target generator 27 calculates a pseudo inverse matrix Jfr_inv of the Jacobian matrix Jfr determined in S61, and multiplies the pseudo inverse matrix Jfr_inv by the moment error errM so as to calculate the set of f_i and R_i, namely, $(f\_i \; R\_i)^T$. Thus, the set of f_i and R_i necessary for canceling errM is calculated.

By the processing up to S63 described above, the set of the required virtual surface translational force (the required virtual surface translational force that has been corrected on the basis of f_i), the on-virtual-surface external force action point (=provisional on-virtual-surface external force action point), and the virtual surface twisting force R_i, which set satisfies the first A requirement and the first B requirement and makes it possible to achieve the compensation total moment external force related to a rotational motion (a rotational motion that changes the angular momentum about the moment reference point) of the entire robot 1. In this case, however, the required virtual surface translational force is corrected on the basis of f_i, so that the virtual surface frictional force component of the corrected required virtual surface translational force does not necessarily satisfy the second requirement. In addition, the virtual surface twisting force R_i does not necessarily satisfy the fourth requirement described in the first embodiment.

The external force target generator 27, therefore, subsequently carries out the processing in S65. In this step S65, the external force target generator 27 carries out the same determination processing as that in S39 in the first embodiment. More specifically, the external force target generator 27 determines whether the virtual surface frictional force component F_i that has been corrected on the basis of f_i (the frictional force component based on the total sum of F_i and f_i determined by the processing up to S15) satisfies the second requirement and also determines whether the magnitude of R_i satisfies the fourth requirement in each virtual surface.

If the determination results are affirmative, then the external force target generator 27 carries out the processing in S67 and terminates the processing at the current time. In the processing carried out in S67, the external force target generator 27 determines, by the same processing as that in S41 of the first embodiment, the desired external force to be applied to the robot 1 from each surface to be contacted at the current time.

Meanwhile, regarding the desired external force action point of each surface to be contacted, the external force target generator 27 determines the provisional external force action point generated by the desired motion generator 25 directly as the desired external force action point by the processing in S67 in the present embodiment.

If the determination result in S65 is negative, then the external force target generator 27 carries out the processing in S69. In this step S69, the external force target generator 27 determines the virtual surface frictional force component limited correction amount f_lim_i obtained by restricting the virtual surface frictional force component correction amount f_i such that the second requirement is satisfied and also determines the virtual surface restricted twisting force R_lim_i obtained by restricting the virtual surface twisting force R_i such that the fourth requirement is satisfied.

More specifically, the external force target generator 27 determines f_lim_i such that the virtual surface frictional force component F_i that has been corrected on the basis of f_lim_i is not more than the frictional force upper limit value set according to the virtual surface normal force component Ni determined by the processing up to S15 (=$\mu\_i*|N\_i|$) and also determines the R_lim_i such that the R_lim_i is not more than the twisting force upper limit value set according to the virtual surface normal force component Ni determined by the processing up to S15 (=μr_i*|N_i|).

In this case, the f_lim_i is determined such that the total sum (resultant force) thereof is maintained at zero in addition to satisfying the second requirement.

To be more specific, for example, the f_lim_i is determined such that the value obtained by multiplying the virtual surface frictional force component correction amount f_i in each virtual surface determined in S63 by a certain coefficient k of the same value coincides with the virtual surface frictional force component restricted correction amount f_lim_i. This causes the total sum (the resultant force) of the f_lim_i to become k-fold of the total sum of f_i (=0), that is, zero. In this case, the value of the coefficient k is taken as an unknown, and the value of the coefficient k is determined such that the magnitude of the frictional force obtained by adding k*f_i to the virtual surface frictional force component F_i before a correction, which has been determined by the processing up to S15, i.e., (=|F_i+k*f_i|), satisfies the second requirement (such that |F_i+k*f_i|≦μ_i*|N_i| applies) in each virtual surface. Then, the f_i in each virtual surface calculated in S63 is multiplied by the determined coefficient k to determine the f_lim_i in each virtual surface.

If the virtual surface frictional force component F_i that has been corrected on the basis of f_i satisfies the second requirement in every virtual surface set in S01, then the value of the coefficient k is set to 1. In this case, therefore, the f_i in each virtual surface calculated in S63 is directly determined as f_lim_i.

The virtual surface restricted twisting force R_lim_i in each virtual surface is determined, for example, as follows. In a virtual surface that does not satisfy the fourth requirement in S65, the virtual surface restricted twisting force R_lim_i is determined such that the magnitude thereof coincides with the twisting force upper limit value (=μr_i*|N_i|). Further, in each virtual surface that satisfies the fourth requirement, the virtual surface twisting force R_i calculated in S63 is determined directly as the virtual surface restricted twisting force R_lim_i.

Alternatively, the virtual surface restricted twisting force R_lim_i in each virtual surface that does not satisfy the fourth requirement may be determined to be a twisting force having a magnitude that is slightly smaller than the twisting force upper limit value.

After determining the virtual surface frictional force component restricted correction amount f_lim_i and the virtual surface restricted twisting force R_lim_i as described above, the external force target generator 27 carries out the processing in S71. In this step S71, the external force target generator 27 calculates a remaining error component errM' of the moment error errM, the remaining error component errM' denoting an error component that cannot be canceled by the f_lim_i and R_lim_i in each virtual surface determined in S69.

More specifically, the external force target generator 27 calculates a difference Δf_i between the virtual surface frictional force component correction amount f_i before being restricted and the virtual surface frictional force component restricted correction amount f_lim_i (=f_i−f_lim_i) and also calculates a difference ΔR_i between the virtual surface twisting force R_i before being restricted and the virtual surface restricted twisting force R_lim_i (=R_i−R_lim_i) in each virtual surface. In addition, the external force target generator 27 replaces components f_i and R_i of the vertical vector (f_i R_i)$^T$ in the right side of the aforesaid expression 11 by Δf_i and ΔR_i respectively corresponding thereto, and calculates the remaining error component errM' according to an expression obtained by replacing the left side of the aforesaid expression 11 by errM'.

Alternatively, the moment generated about a moment reference point when f_lim_i and R_lim_i are applied to a provisional on-virtual-surface external force action point may be calculated, and the obtained moment may be subtracted from the moment error errM thereby to calculate the remaining error component errM'.

Subsequently, the external force target generator 27 carries out the processing in S73 of FIG. 15. In this step S73, the external force target generator 27 calculates a Jacobian matrix J representing the sensitivity of a change in a required virtual surface translational force dependent moment Ms (the Jacobian matrix J in the aforesaid relational expression 07) in response to a change in the position of the on-virtual-surface external force action point (a change from the provisional on-virtual-surface external force action point) by carrying out the same processing as that in S23 of the first embodiment.

Subsequently, the external force target generator 27 carries out the processing in S75. In this step S75, the external force target generator 27 calculates, as a set counterpart of the on-virtual-surface external force action point correction amount Δrpc_i in each virtual surface for canceling errM, a vertical vector (Δrp_i) that satisfies the relationship denoted by the aforesaid expression 07 when the ΔMs (the change amount of the required virtual surface translational force dependent moment Ms) in expression 07 is set to coincide with the remaining error component errM' calculated in S71 by the same processing as that in S25 in the first embodiment. More specifically, the external force target generator 27 calculates the pseudo inverse matrix Jinv of the Jacobian matrix J determined in S73 by the same processing as that in S25, and multiplies errM' by the Jinv to calculate the set counterpart of the on-virtual-surface external force action point correction amount Δrpc_i in each virtual surface.

Subsequently, the external force target generator 27 carries out the determination processing in S77. The determination processing in S77 is the same as the determination processing in S27 in the first embodiment. More specifically, the external force target generator 27 determines whether the position of the on-virtual-surface external force action point that has been corrected on the basis of the Δrpc_i determined in S75 satisfies an external force action point existence region condition in all virtual surfaces.

If the determination result in this step S77 is affirmative, then the external force target generator 27 carries out the processing in S79 and terminates the processing at the current time. By this processing in S79, the external force target generator 27 determines the desired external force to be applied from each surface to be contacted to the robot 1 and the desired external force action point at the current time.

To be more specific, the external force target generator 27 determines the required virtual surface translational force in each virtual surface at the current time from the required virtual surface translational force (N_i, F_i) in each virtual surface determined by the processing up to S15 and the virtual surface frictional force component restricted correction amount f_lim_i determined by the processing in S69. In this case, the virtual surface normal force component N_i determined by the processing up to S15 is directly determined as the virtual surface normal force component in the virtual surface and the frictional force component obtained by adding the virtual surface frictional force component correction amount f_lim_i to the virtual surface frictional force component F_i determined by the processing up to S15 is determined as the virtual surface frictional force component in the virtual surface.

The external force target generator 27 determines the virtual surface restricted twisting force R_lim_i determined by the processing in S69 as the virtual surface twisting force in the virtual surface corresponding to the R_lim_i.

Further, the external force target generator 27 converts the required virtual surface translational force and the virtual surface twisting force in each virtual surface determined as described above into the translational force and the twisting force, respectively, to be applied from the surface to be contacted to the robot 1 by the same processing as that in S29 or S41 in the first embodiment, and determines the converted translational force and twisting force as the desired value of the translational external force (the desired translational force) and the desired value of the twisting force (the desired twisting force), respectively, which are constituent elements of the desired external force.

Further, as with the case of the processing in S29 in the first embodiment, the external force target generator 27 determines the point, which is obtained by inversely projecting the external force action point on each virtual surface that has been corrected on the basis of the on-virtual-surface external force action point correction amount Δrpc_i determined in S75 onto a surface to be contacted corresponding to the virtual surface, as the desired external force action point on the surface to be contacted.

In a situation where the determination result in S77 is negative, the remaining error component errM' cannot be canceled by correcting the on-virtual-surface external force action point within the range in which the external force action point existence region condition. In this case, therefore, it is necessary to increase the magnitude of the virtual surface normal force component N_i such that the frictional force or the twisting force to be applied to each virtual surface may be further increased (such that the determination result in S65 eventually turns to be affirmative).

Hence, in the case where the determination result in S77 is negative, the external force target generator 27 subsequently carries out the processing in S81. In this step S81, the external force target generator 27 determines whether the virtual surface that does not satisfy the second requirement or the fourth requirement in the determination processing in S65 is the opposing virtual surface Sna or Snb (n=1 or 2 or 3).

In a situation where the determination result in S65 is negative, the magnitude of the virtual surface normal force component in the virtual surface that does not satisfy the second requirement or the fourth requirement in the determination result in S65 cannot be increased while satisfying the first A requirement. In this case, therefore, the external force target generator 27 decides in S85 that the motional state of the robot 1 is inappropriate (the desired motion needs to be corrected or the like), and then interrupts the processing at the current time. In this case, the external force target generator 27 outputs error information to the desired motion generator 25. Then, on the basis of the error information, the desired motion generator 25 creates a desired motion once again or creates a desired motion that suspends the motion of the robot 1.

Accordingly, in the present embodiment, if the determination result in S77 is negative, then the motional state of the robot 1 is assessed by the determination processing in S81. Further, if the determination result in S81 is negative, then the motional state of the robot 1 is assessed as inappropriate.

Meanwhile, in a situation where the determination result in S81 is affirmative, the magnitudes of the virtual surface normal force components N_na and N_nb of the opposing virtual surfaces Sna and Snb (n=1 or 2 or 3), which include a virtual surface that does not satisfy the second requirement or the fourth requirement and which are parallel to each other, can be increased while satisfying the first A requirement (while maintaining N_na+N_nb constant).

In the case where the determination result in S81 is affirmative, the external force target generator 27 carries out the processing in S83. In this step S83, the external force target generator 27 determines an increment IN_n of the magnitudes of the virtual surface normal force components N_na and N_nb of the opposing virtual surfaces Sna and Snb. In this case, according to the present embodiment, the increment IN_n determined in S83 is set to a predetermined value.

Alternatively, however, the increment IN_n may be determined by, for example, the same processing as that in S45 in the first embodiment.

Subsequently, the external force target generator 27 carries out the processing from S13 of FIG. 7 again.

This completes the detailed description of the processing carried out by the external force target generator 27 in the present embodiment.

In the processing by the external force target generator 27 described above, as with the first embodiment, first, the processing from S05 to S15 provisionally determines the required virtual surface translational forces (N_i, F_i) necessary for accomplishing the compensation total translational external force Fall_ad related to a translational motion of the entire robot 1. Therefore, provisional values of the required virtual surface translational forces (N_i, F_i) capable of accomplishing the compensation total translational external force Fall_ad can be efficiently determined by a simple algorithm.

Further, as with the first embodiment, if the determination results in both S07 and S09 are negative, or the determination results in S07, S09, and S15 are negative, affirmative, and negative, respectively, then the motional state of the robot 1 is assessed as inappropriate and the processing by the external force target generator 27 is interrupted. Thus, as with the first embodiment, with a simple algorithm, a motional state of the robot 1 that tends to lead to an excessive frictional force between a surface to be contacted and the robot 1 or a motional state of the robot 1 that tends to lead to an excessive internal force of the robot 1 can be efficiently assessed as inappropriate for implementing the compensation total translational external force Fall_ad. This makes it possible to prevent the occurrence of a situation where the motion of the robot 1 is continued in a state where it is difficult to stably implement the motion of the robot 1 (for example, the motion of the robot 1 can be suspended).

Further, according to the present embodiment, after determining the provisional values of the required virtual surface translational forces (N_i, F_i) that enable the compensation total translational external force Fall_ad to be accomplished as described above, the processing in S19, S21 and S61 to S75 (except for the processing in S67) determines the set of the virtual surface frictional force component correction amount Δf_i and the virtual surface twisting force R_i as the additional manipulated variable (the moment compensation amount) for implementing the compensation total moment external force Mall_ad related to a rotational motion of the entire robot 1, or determines the set of the virtual surface frictional force component correction amount Δf_i, the virtual surface twisting force R_i, and the on-virtual-surface external force action point correction amount Δrpc_i.

Thus, as with the case of the first embodiment, simply combining the provisional values of the required virtual surface translational forces (N_i, F_i) determined by the processing from S05 to S15 and the moment compensation amount determined by the processing in S19, S21 and S61 to S75 (except for the processing in S67) makes it possible to determine the set of the required virtual surface translational force, the virtual surface twisting force, and virtual surface external force action point (including the case where the virtual surface twisting force is zero), which set allows both the compensation total translational external force Fall_ad and the compensation total moment external force Mall_ad to be properly achieved. Then, the set of the required on-virtual-surface translational force, the on-virtual-surface twisting force, and the on-virtual-surface external force action point makes it possible to efficiently and properly determine a desired external force (a desired translational force and a desired twisting force) to be applied to the robot 1 from surfaces to be contacted and a desired external force action point.

In this case, if the determination results in S77 and S81 are both negative, then the motional state of the robot 1 is assessed as inappropriate and the processing by the external force target generator 27 is interrupted. With this arrangement, a motional state of the robot 1 that makes it difficult to accomplish the compensation total moment external force Mall_ad while satisfying at least the first A requirement and the first B requirement can be assessed as an inappropriate motional state. This makes it possible to prevent the occurrence of a situation where the motion of the robot 1 is continued in a state where it is difficult to stably implement the motion of the robot 1 (for example, the motion of the robot 1 can be suspended).

Figure 15:
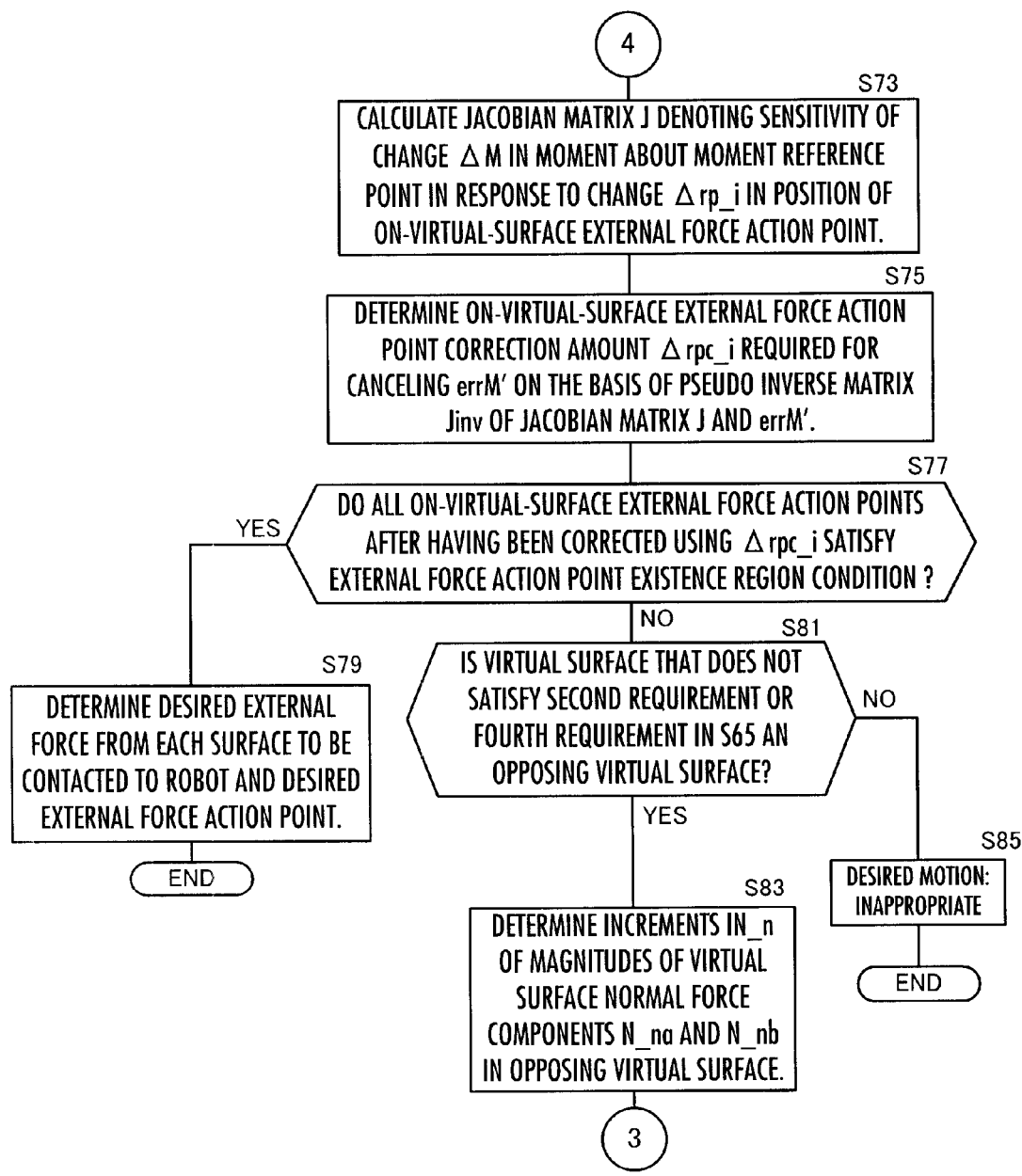

Further, as with the first embodiment, a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement except for the case where the determination result in any one of S09 and S15 of FIG. 7 and S81 of FIG. 15 is negative (in the case where a motional state of the robot 1 is inappropriate).

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, as with the first embodiment, the desired translational force applied from each surface to be contacted to the robot 1 can be determined such that the required total translational external force is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

Further, in the case where the virtual surfaces set in S01 include the opposing virtual surfaces Sna and Snb, and the determination result in S65 or S77 is affirmative, the magnitude of the internal force generated in the robot 1 between the opposing virtual surfaces Sna and Snb (the magnitude of N_na or N_nb, whichever is smaller) can be controlled to a minimum within a range in which the first A requirement, the first B requirement, the second requirement, and the third requirement are satisfied, as with the first embodiment. Thus, as with the first embodiment, the desired translational forces in the surfaces to be contacted including the two surfaces to be contacted corresponding to the opposing virtual surfaces Sna and Snb can be determined such that the share of the motive power (the driving torque in the present embodiment) that can be generated by the joint actuators 11 of the robot 1, which share is necessary for generating the internal force, will be reduced.

Here, a supplementary description will be given of the relationship of correspondence between the present embodiment described above and the present invention. In the present embodiment, the external force target generator 27 of the control unit 21 functions as the external force target generating device in the present invention.

In addition, in the processing carried out by the external force target generator 27, the processing in S01 implements the virtual surface group setting unit in the present invention.

Further, as with the first embodiment, the processing in S02 implements the basic required total external force determining unit in the present invention (or the basic required total external force determining unit in the thirteenth aspect of the invention), and the processing in S03 implements the translational external force compensation amount determining unit and the moment external force compensation amount determining unit in the present invention.

Further, as with the first embodiment, the compensation total translational external force Fall_ad and the compensation total moment external force Mall_ad calculated in the processing of S04 correspond to the compensation total translational external force and the compensation total moment external force in the present invention.

In addition, as with the first embodiment, the processing in S05 to S15 except for the processing in S13 and S15 that follow S45 of FIG. 9 implements the provisional required virtual surface translational force determining unit in the present invention.

The processing in S19 implements the provisional required virtual surface translational force dependent moment calculating unit in the present invention.

The processing in S21 and S61 to S75 except for the processing in S67 implements the moment compensation amount determining unit in the present invention.

Further, the processing in S67 and S79 implements the surface-to-be-contacted desired external force and desired action point determining unit in the present invention.

The processing in S05 to S15, S19, S21, and S61 to S83 implements the required virtual surface translational force determining unit in the present invention (the thirteenth aspect of the invention).

In addition, in the processing carried out in S67 and S79, the processing for determining the desired translational force implements the desired surface-to-be-contacted translational force determining unit in the present invention (the thirteenth aspect of the invention).

[Third Embodiment]

The third embodiment of the present invention will now be described with reference to FIG. 16. The present embodiment differs from the first embodiment only partly in the processing carried out by the external force target generator 27, so that the description of the same aspects as those of the first embodiment will be omitted.

If the surfaces to be contacted in an outside world of a robot 1 have two surfaces to be contacted that oppose each other with an interval provided therebetween, as with the aforesaid wall surfaces WL1 and WL2, and the virtual surface group set in S01 includes opposing virtual surfaces Sna and Snb, then the moment generated about a moment reference point can be changed by manipulating (increasing or decreasing) an internal force (=min (|N_na|, |N_nb|)) between the opposing virtual surfaces Sna and Snb while maintaining the resultant force of the virtual surface normal force components N_na and N_nb in the opposing virtual surfaces Sna and Snb constant. Hence, the internal force can be used as the moment compensation amount for canceling or reducing a moment error errM (or a remaining error component errM').

According to the present embodiment, therefore, if the virtual surface group set in S01 includes the opposing virtual surfaces Sna and Snb, then a set of a second compensation amount (a virtual surface frictional force component correction amount f_i) and a third compensation amount (a virtual surface twisting force R_i) and an internal force correction amount ΔIN as a fourth compensation amount is determined as the moment compensation amount for canceling the remaining error component errM' calculated in S33.

To be more specific, the processing up to the aforesaid S33 in the processing carried out by the external force target generator 27 in the present embodiment is the same as that in the first embodiment. A part of the processing after S33 is different from the processing in the first embodiment.

Figure 16:
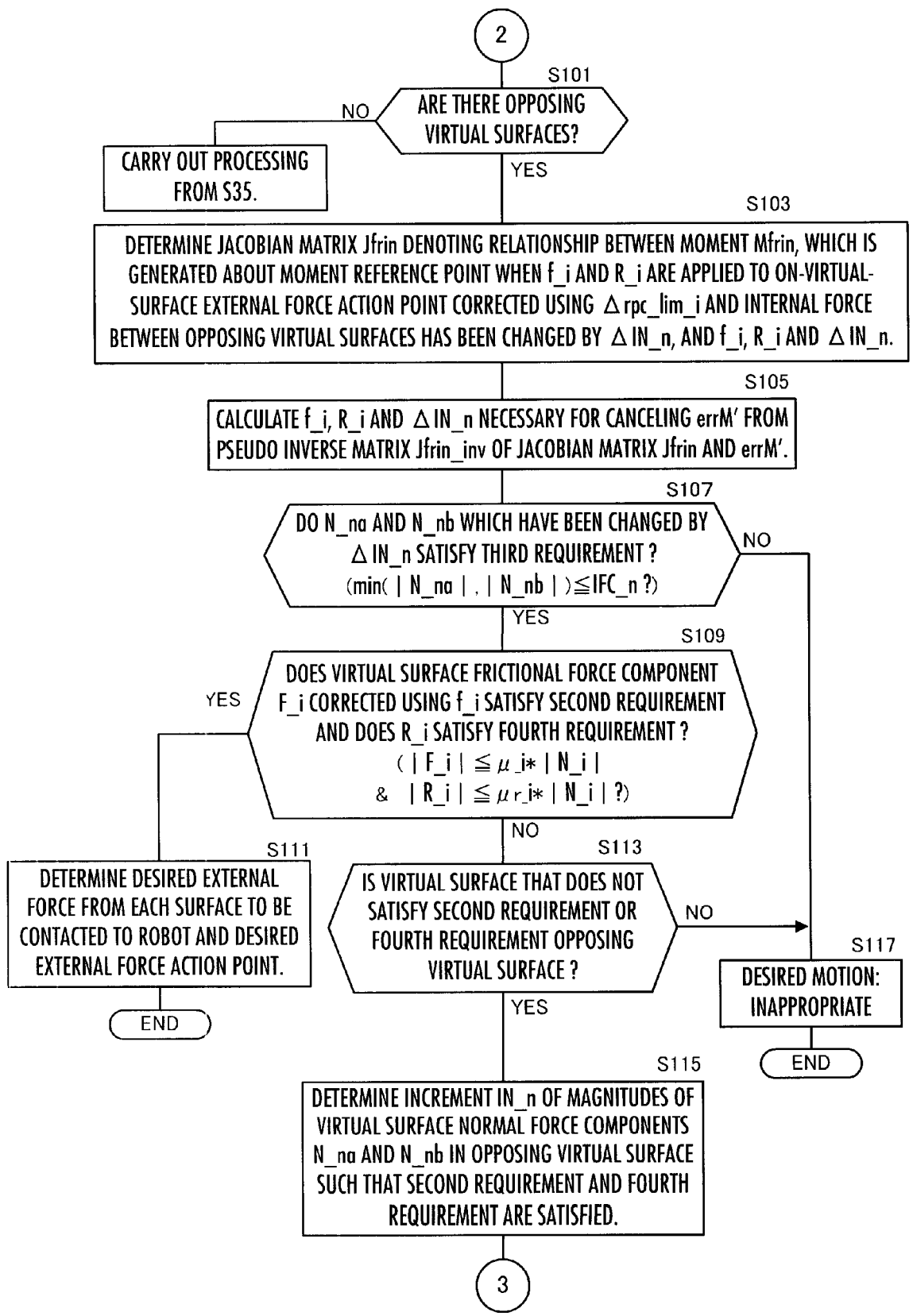
FIG. 16 is a flowchart illustrating the processing in a third embodiment by the external force target generator shown in FIG. 2.

Referring to FIG. 16, the external force target generator 27 carries out the processing in S101 after the processing in S33. In this step S101, the external force target generator 27 determines whether the virtual surface group set in S01 includes the opposing virtual surfaces Sna and Snb. If the determination result is negative, then the external force target generator 27 carries out the processing from S35 illustrated in FIG. 9 in the same manner as that in the first embodiment.

According to the present embodiment, in the case where the determination result in S101 is negative, when the processing in S35, S37, S39, and S43 illustrated in FIG. 9 is carried out thereafter, the determination result in S43 will be always negative. Hence, the processing in S43 and S45 is substantially unnecessary in the processing after the determination result in S101 turns negative, so that if the determination result in S39 is negative, then the processing in S47 may be immediately carried out.

Meanwhile, if the determination result in S101 is affirmative, then the external force target generator 27 carries out the processing in S103. In this step S103, the external force target generator 27 calculates, according to the following expression 13, a Jacobian matrix Jfrin representing the relationship between a moment Mfrin, which is generated about the moment reference point by the virtual surface frictional force component correction amount f_i, the virtual surface twisting force R_i, and an internal force correction amount ΔIN_n when the f_i and the R_i in arbitrary values are applied to the on-virtual-surface restricted corrected external force action point of each virtual surface (each virtual surface set in S01) and the magnitudes of the virtual surface normal force components N_na and N_nb of the opposing virtual surfaces Sna and Snb of each pair are changed by an internal force correction amount ΔIN_n in an arbitrary value, and the f_i, the R_i, and the ΔIN_n.

$$Mfrin = Jfrin * (f\_i \, R\_i \, \Delta IN\_n)^T tm \quad \text{Expression 13}$$

In this expression 13, $(f\_i \, R\_i \, \Delta IN\_n)^T$ denotes the vertical vector composed of f_i, R_i and ΔIN_n. The virtual surface frictional force component correction amount f_i is a moment compensation amount that should be determined such that the total sum (resultant force) thereof is zero. Hence, f_i as a component of the vertical vector $(f\_i \, R\_i \, \Delta IN\_n)^T$ in expression 13 is obtained by removing f_i corresponding to any one virtual surface f_i0), as with f_i in the aforesaid expression 11 described in the first embodiment. If the virtual surface group set in S01 includes a plurality of pairs of opposing virtual surfaces Sna and Snb, then the internal force correction amount ΔIN_n associated with the opposing virtual surfaces Sna and Snb of all the pairs will be included as a component of the vertical vector $(f\_i \, R\_i \, \Delta IN\_n)^T$ in expression 13.

Subsequently, the external force target generator 27 carries out the processing in S105. In this step S105, the external force target generator 27 calculates the set of f_i, R_i and ΔIN_n, i.e., $(f\_i \, R\_i \, \Delta IN\_n)^T$, that satisfies the relationship denoted by expression 13 when Mfrin in expression 13 is set to coincide with the remaining error component errM' calculated in S33.

More specifically, the external force target generator 27 calculates a pseudo inverse matrix Jfrin_inv of the Jacobian matrix Jfrin determined in S103, and multiplies the remaining error component errM' by the pseudo inverse matrix Jfrin_inv so as to calculate the set of f_i, R_i and ΔIN_n. In this case, the pseudo inverse matrix Jfrin_inv is determined such that, for example, the mean value (or the weighted mean value) of the squared value or the absolute value of each of the f_i, R_i and ΔIN_n constituting the vertical vector $(f\_i \, R\_i \, \Delta IN\_n)^T$ of expression 13 will be minimized, in the same manner as that for calculating the pseudo inverse matrix Jfr_inv by the processing in S37 of FIG. 9 described in the first embodiment. Further, the aforesaid f_i0 removed from the vertical vector $(f\_i \, R\_i \, \Delta IN\_n)^T$ in expression 13 is determined as a value obtained by reversing the sign of the total sum of f_i calculated as described above.

It is not always necessary to calculate all of the f_i, R_i and ΔIN_n. For example, the f_i in a virtual surface having a relatively small frictional coefficient μ_i may be set to zero or the R_i in a virtual surface having a relatively small twisting force coefficient μr_i may be set to zero.

In the case where the desired motion is the wall climbing gait, the processing in the aforesaid S103 and S105 is carried out, for example, as described below.

For instance, as with the case described in the first embodiment, the position vectors of on-virtual-surface restrictedly corrected external force action points (the position vectors relative to a moment reference point) in virtual surfaces S3a, S2a and S2b corresponding to the floor surface FL, the wall surface WL1 and the wall surface WL2, respectively, in the motional state illustrated in FIG. 11(b) are denoted by rp_3a, rp_2a, and rp_2b, respectively. At this time, the relationship between on-virtual-surface frictional force component correction amounts f_3a, f_2a, f_2b and virtual surface twisting forces R_3a, R_2a, R_2b in the virtual surfaces S3a, S2a and S2b, and an internal force correction amount ΔIN_2 between the virtual surfaces S2a and S2b, and the moment Mfrin generated about a moment reference point by the f_3a, f_2a, f_2b, R_3a, R_2a, R_2b, and ΔIN_2 is denoted by the following expression 13a.

$$Mfrin = rp\_3a * f\_3a + rp\_2a * f\_2a + rp\_2b * f\_2b + R\_3a + R\_2a + R\_2b + (rp\_2a - rp\_2b) * \Delta IN\_2 \quad \text{Expression 13a}$$

In expression 13a, (rp_3a*f_3a), (rp_2a*f_2a), (rp_2b*f_2b), and (rp_2a−rp_2b)*ΔIN_2 respectively denote vector products. In this case, ΔIN_2 is denoted as a vector (having a magnitude of ΔIN_2) moving from the virtual surface S2a to the virtual surface S2b in expression 13a.

In this case, regarding the virtual surface frictional force component correction amount, f_3a+f_2a+f_2b=0 applies, leading to f_2b=−(f_3a+f_2a). Hence, expression 13a is rewritten to, for example, the following expression 13b, which does not include f_2b.

$$Mfrin = (rp\_3a - rp\_2b) * f\_3a + (rp\_2a - rp\_2b) * f\_2a + R\_3a + R\_2a + R\_2b + (rp\_2a - rp\_2b) * \Delta IN\_2 \quad \text{Expression 13b}$$

Hence, in S103, the right side of the expression 13b is denoted by a coordinate component to determine the Jacobian matrix Jfrin in the aforesaid expression 13.

Further, in S105, the pseudo inverse matrix Jfrin_inv of the Jacobian matrix Jfrin is calculated as described above and the remaining error component errM' is multiplied by the obtained Jfr_inv so as to calculate f_3a, f_2a, R_3a, R_2a, R_2b, and ΔIN_2. Further, f_3b is calculated from f_3a and f_2a according to the relationship denoted by f_2b=−(f_3a+f_2a).

If the processing up to S105 described above causes the determination result in the aforesaid S27 to become negative and the determination result in S101 to become affirmative, then the set of the virtual surface frictional force component correction amount f_i, the virtual surface twisting force R_i, and the internal force correction amount ΔIN_n is calculated, in addition to the on-virtual-surface external force action point restricted correction amount Δrpc_lim_i, as the moment compensation amount for achieving the compensation total moment external force Mall_ad while satisfying the first A requirement and the first B requirement.

Subsequently, the external force target generator 27 carries out the determination processing in S107. In this step S107, the external force target generator 27 determines whether a corrected internal force satisfies the third requirement in the opposing virtual surfaces Sna and Snb in which the internal force is corrected on the basis of the internal force correction amount ΔIN_n. More specifically, the external force target generator 27 determines whether the magnitude of the virtual surface normal force component N_na or N_nb, whichever is smaller, after the magnitude of only the internal force correction amount ΔIN_n is changed in the opposing virtual surfaces Sna and Snb (i.e., the magnitude of the internal force that has been corrected on the basis of ΔIN_n) is the aforesaid internal force upper limit value IFC_n or less.

If the determination result in S107 is negative, then the external force target generator 27 decides in S117 that the motional state of the robot 1 is inappropriate (the desired motion needs to be corrected or the like), and interrupts the processing for generating a target related to an external force. In this case, the external force target generator 27 outputs error information to the desired motion generator 25. Then, on the basis of the error information, the desired motion generator 25 creates a desired motion once again or creates a desired motion that suspends the motion of the robot 1.

If the determination result in S107 is affirmative, then the external force target generator 27 carries out the same determination processing as that in S39 of FIG. 9 (the determination processing related to the second requirement and the fourth requirement) in S109. In this case, the magnitudes of the virtual surface normal force components N_na and N_nb related to the frictional force upper limit values in the opposing virtual surfaces Sna and Snb indicate the values which have been corrected on the basis of the internal force correction amount ΔIN_n (more specifically, the values obtained by changing the magnitudes of the virtual surface normal force components N_na and N_nb, which have been determined by the processing up to S15 of FIG. 7, by the internal force correction amount ΔIN_n).

If the determination result in S109 is affirmative, then the external force target generator 27 carries out the same processing as that in S41 of FIG. 9 in S111 to determine the desired external force applied from each surface to be contacted to the robot 1 and the desired external force action point at the current time.

If the determination result in S109 is negative, then the external force target generator 27 carries out in S113 the same determination processing as that in S43 of FIG. 9. If the determination result is negative, then the external force target generator 27 decides in S117 that the motional state of the robot 1 is inappropriate and interrupts the processing by the external force target generator 27 (the processing for generating a target related to an external force).

Thus, according to the present embodiment, if the determination result in S107 is negative or if the determination results in both S109 and S113 are negative, then the motional state of the robot 1 will be assessed as inappropriate.

If the determination result in S113 is affirmative, then the same processing as that in S45 of FIG. 9 is carried out in S115 to determine the increment IN_n of the magnitudes of the virtual surface normal force components N_na and N_nb in the opposing virtual surfaces Sna and Snb. To be more specific, the increment IN_n determined in S115 indicates the increment from the magnitudes of the virtual surface normal force components N_na and N_nb used in the determination processing in S109 (i.e., the value obtained after having been corrected on the basis of the internal force correction amount ΔIN_n).

Subsequently, the external force target generator 27 carries out the processing from S13 of FIG. 7 again.

In the case where the processing from S13 is carried out again as mentioned above, if the determination result in S15 is affirmative, then the processing from S35 may alternatively be carried out without carrying out the determination processing in S101 (or without depending upon the determination result in S101).

This completes the detailed description of the processing carried out by the external force target generator 27 in the present embodiment.

In the processing by the external force target generator 27 described above, as with the first embodiment, first, the processing from S05 to S15 provisionally determines the required virtual surface translational forces (N_i, F_i) necessary for accomplishing the compensation total translational external force Fall_ad related to a translational motion of the entire robot 1. Therefore, provisional values of the required virtual surface translational forces (N_i, F_i) capable of accomplishing the compensation total translational external force Fall_ad can be efficiently determined by a simple algorithm.

Further, as with the first embodiment, if the determination results in both S07 and S09 are negative, or the determination results in S07, S09, and S15 are negative, affirmative, and negative, respectively, then the motional state of the robot 1 is assessed as inappropriate and the processing by the external force target generator 27 is interrupted. Thus, as with the first embodiment, with a simple algorithm, a motional state of the robot 1 that tends to lead to an excessive frictional force between a surface to be contacted and the robot 1 or a motional state of the robot 1 that tends to lead to an excessive internal force of the robot 1 can be efficiently assessed as inappropriate for implementing the compensation total translational external force Fall_ad. This makes it possible to prevent the occurrence of a situation where the motion of the robot 1 is continued in a state where it is difficult to stably implement the motion of the robot 1 (for example, the motion of the robot 1 can be suspended).

Further, after determining the provisional values of the required virtual surface translational forces (N_i, F_i) that enable the compensation total translational external force Fall_ad to be accomplished as described above, the processing from S19 to S37 (except for the processing in S29) determines the on-virtual-surface external force action point correction amount Δrpc_i as the additional manipulated variable (the moment compensation amount) for implementing the compensation total moment external force Mall_ad related to a rotational motion of the entire robot 1, or determines the set of the on-virtual-surface external force action point restricted correction amount Δrpc_lim_i, the virtual surface frictional force component correction amount Δf_i, and the virtual surface twisting force R_i, or determines the set of Δrpc_lim_i, Δf_i, R_i, and the internal force correction amount ΔIN_n.

Thus, as with the case of the first embodiment, simply combining the provisional values of the required virtual surface translational forces (N_i, F_i) determined by the processing in S05 to S15 and the moment compensation amounts determined by the processing in S19 to S37 (except for the processing in S29) or S19 to S33 (except for the processing in S29) and the processing in S103 to S105 makes it possible to determine the set of the required virtual surface translational force, the virtual surface twisting force, and virtual surface external force action point (including the case where the virtual surface twisting force is zero), which set allows both the compensation total translational external force Fall_ad and the compensation total moment external force Mall_ad to be properly achieved. Then, the set of the required on-virtual-surface translational force, the on-virtual-surface twisting force, and the on-virtual-surface external force action point makes it possible to efficiently and properly determine a desired external force (a desired translational force and a desired twisting force) to be applied to the robot 1 from surfaces to be contacted and a desired external force action point.

In this case, if the determination results in S109 and S113 are both negative, then the motional state of the robot 1 is assessed as inappropriate and the processing by the external force target generator 27 is interrupted. This makes it possible to assess that a motional state of the robot 1 which makes it difficult to accomplish the compensation total moment external force Mall_ad while satisfying at least the first A requirement and the first B requirement as an inappropriate motional state. This makes it possible to prevent the occurrence of a situation where the motion of the robot 1 is continued in a state where it is difficult to stably implement the motion of the robot 1 (for example, the motion of the robot 1 can be suspended).

Further, as with the first embodiment, a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement except for the case where the determination result in any one of S09 and S15 illustrated in FIG. 7 and S107 and S113 of FIG. 16 is negative (in the case where a motional state of the robot 1 is inappropriate).

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, as with the first embodiment, the desired translational force applied from each surface to be contacted to the robot 1 can be determined such that the compensation total translational external force Fall_ad is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

In particular, according to the present embodiment, as with the first embodiment, the on-virtual-surface external force action point correction amount Δrpc_i (the first compensation amount) is preferentially determined as the moment compensation amount. This means that the magnitude of the virtual surface frictional force component F_i in each virtual surface can be controlled to a minimum within a range in which the first A requirement, the first B requirement, the second requirement, and the third requirement are satisfied. As a result, the magnitude of the frictional force component of the desired translational force in each surface to be contacted can be also controlled to a minimum or approximated to a minimum.

Further, in the case where the virtual surfaces set in S01 include the opposing virtual surfaces Sna and Snb, except for the case where a desired motion is determined as inappropriate, the virtual surface normal force components N_na and N_nb are determined such that the magnitude of the internal force generated in the robot 1 between the opposing virtual surfaces Sna and Snb (the magnitude of N_na or N_nb, whichever is smaller) is the internal force upper limit value IFC_n or less (such that the third requirement is satisfied). This makes it possible to determine the desired translational forces in the surfaces to be contacted that include two surfaces to be contacted corresponding to the opposing virtual surfaces Sna and Snb such that the share, which is required for generating an internal force, in the motive power (the driving torque in the present embodiment) that can be generated by joint actuators 11 of the robot 1 will not become excessive.

Here, a supplementary description will be given of the relationship of correspondence between the present embodiment described above and the present invention. In the present embodiment, the external force target generator 27 of the control unit 21 functions as the external force target generating device in the present invention.

In addition, in the processing carried out by the external force target generator 27, the processing in S01 implements the virtual surface group setting unit in the present invention.

Further, as with the first embodiment, the processing in S02 implements the basic required total translational external force determining unit in the present invention (or the basic required total translational external force determining unit in the thirteenth aspect of the invention), and the processing in S03 implements the translational external force compensation amount determining unit and the moment external force compensation amount determining unit in the present invention.

Further, the compensation total translational external force Fall_ad and the compensation total moment external force Mall_ad calculated in the processing of S04 correspond to the compensation total translational external force and the compensation total moment external force in the present invention.

The processing in S05 to S15 except for the processing in S13 and S15 that follow S115 of FIG. 16 implements the provisional required virtual surface translational force determining unit in the present invention. In this case, the frictional force upper limit value ($|\mu\_i*|N\_i|$) and the internal force upper limit value IFC_n correspond to the first predetermined value and the second predetermined value, respectively, in the present invention.

The processing in S19 implements the provisional required virtual surface translational force dependent moment calculating unit in the present invention.

The processing in S21 to S37 (except for the processing in S29) or the processing in S19 to S33 (except for the processing in S29) and the processing in S103 to S105 implement the moment compensation amount determining unit in the present invention. In this case, the processing in S23 to S31 (except for the processing in S29) implements the first processing unit in the present invention, the processing in S33 implements the second processing unit in the present invention, and the processing in S35 and S37 or the processing in S103 and S105 implements the third processing unit in the present invention. The case where the determination result in S27 is negative corresponds to the case where the moment error errM cannot be canceled by the first compensation amount (on-virtual-surface external force action point correction amount).

Further, the processing in S29, S41 and S111 implements the surface-to-be-contacted desired external force and desired action point determining unit in the present invention.

Further, the processing in S05 to S15, S19 to S45, and S103 to S115 implements the required virtual surface translational force determining unit in the present invention (the thirteenth aspect of the invention).

In addition, in the processing carried out in S29, S41 and S111, the processing for determining the desired translational force implements the desired surface-to-be-contacted translational force determining unit in the present invention (the thirteenth aspect of the invention).

[Fourth Embodiment]

A fourth embodiment of the present invention will now be described with reference to FIG. 17 and FIG. 18. The present embodiment differs from the second embodiment or the third embodiment only partly in the processing carried out by an external force target generator 27, so that the description of the same aspects as those of the second embodiment or the third embodiment will be omitted.

As with the third embodiment, the present embodiment uses, as appropriate, an internal force correction amount $\Delta IN\_n$ (a fourth compensation amount) as a moment compensation amount for canceling or reducing a moment error errM. In this case, according to the present embodiment, when a virtual surface group set in S01 includes opposing virtual surfaces, the set of a virtual surface frictional force component correction amount f_i (a second compensation amount), a virtual surface twisting force R_i (a third compensation amount), and an internal force correction amount $\Delta IN\_n$ (the fourth compensation amount) is determined as a moment compensation amount, and then an on-virtual-surface external force action point correction amount $\Delta rpc\_i$ (a first compensation amount) is determined to cancel a remaining error component errM' that cannot be canceled by the aforesaid set of compensation amounts.

To be more specific, the processing up to the aforesaid S21 in the processing carried out by the external force target generator 27 in the present embodiment is the same as that in the second embodiment. The processing after S21 is partly different from that in the second embodiment.

Figure 17:
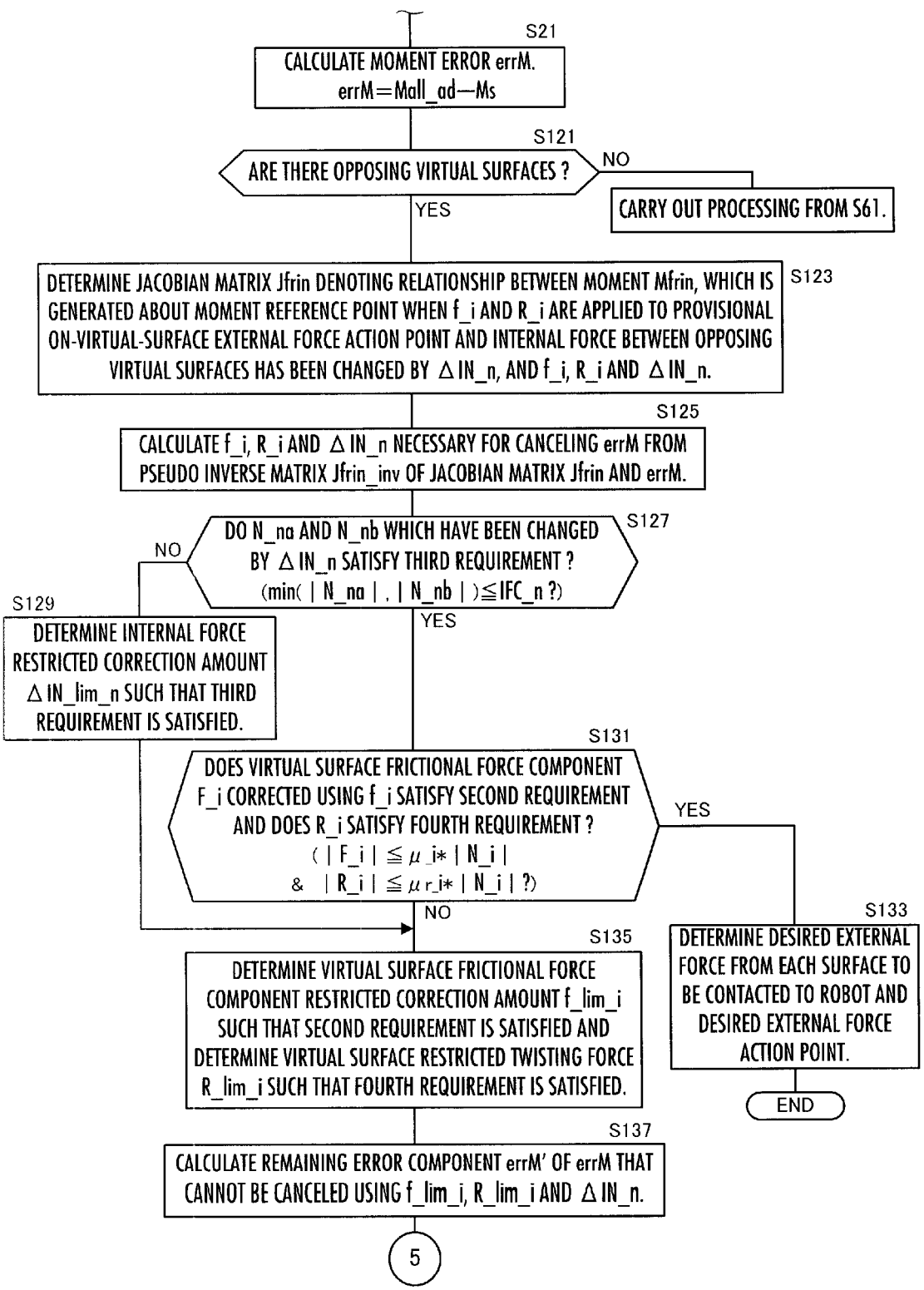
FIG. 17 and FIG. 18 are flowcharts illustrating the processing in a fourth embodiment by the external force target generator shown in FIG. 2.
Figure 18:
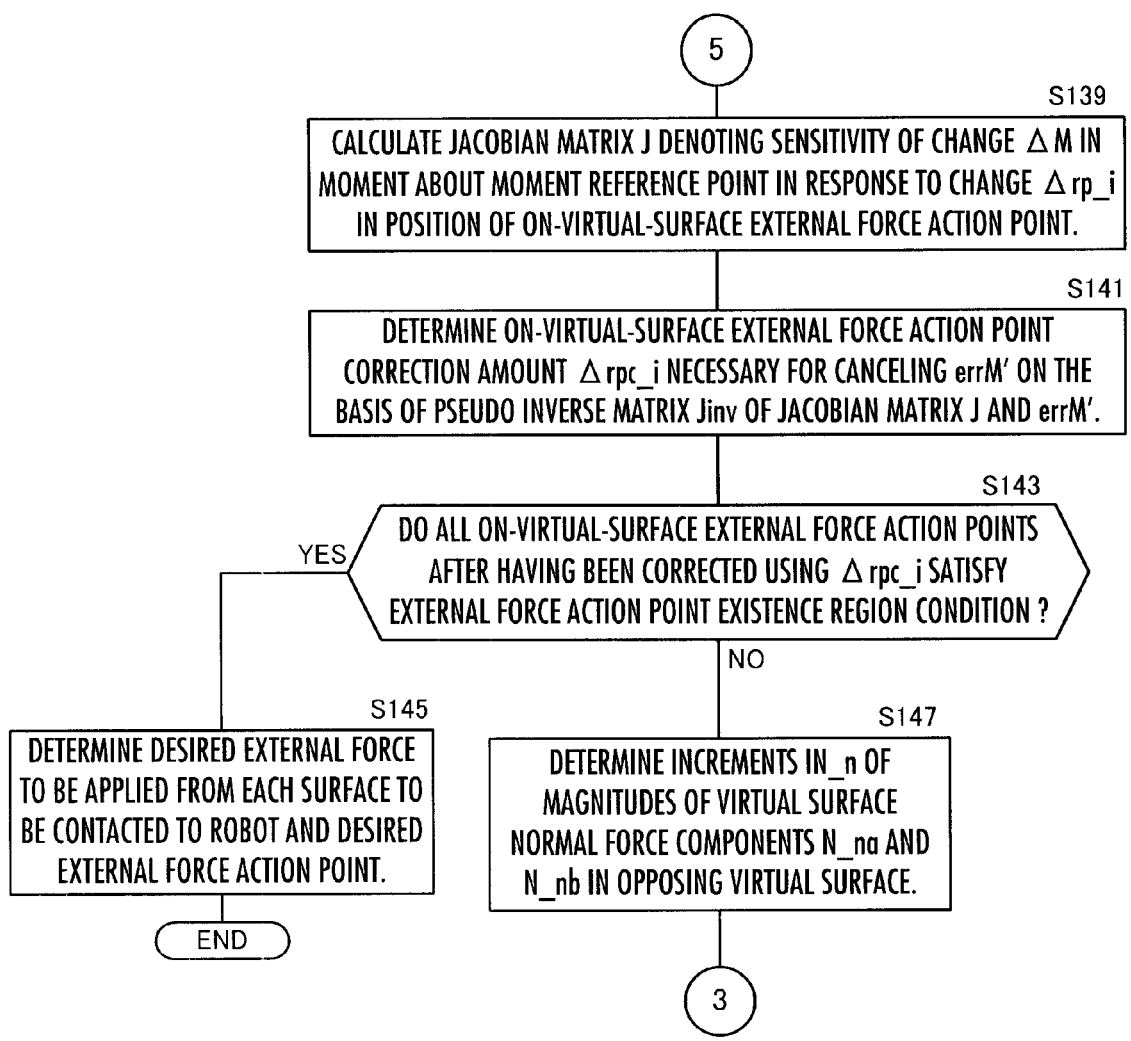

Referring to FIG. 17 and FIG. 18, the external force target generator 27 carries out the determination processing in S121 after S21. In this step S121, the external force target generator 27 determines whether the virtual surface group set in S01 includes opposing virtual surfaces Sna and Snb. If the determination result is negative, then the external force target generator 27 carries out the processing from S61 illustrated in FIG. 14 and FIG. 15 in the same manner as that in the second embodiment.

According to the present embodiment, in the case where the determination result in S121 is negative, when the determination processing in S81 illustrated in FIG. 15 is carried out thereafter, the determination result will be always negative. Hence, the processing in S81 and S83 is substantially unnecessary in the processing after the determination result in S121 turns negative, so that if the determination result in S77 is negative, then the processing in S85 may be immediately carried out.

Meanwhile, if the determination result in S121 is affirmative, then the external force target generator 27 carries out the processing in S123. In this step S123, the external force target generator 27 carries out the same processing as that in S103 described in the third embodiment to determine a Jacobian matrix Jfrin representing, by the aforesaid expression 13, the relationship between a virtual surface frictional force component correction amount f_i (a second compensation amount), a virtual surface twisting force R_i (a third compensation amount) and an internal force correction amount $\Delta IN\_n$ (a fourth compensation amount) and a moment Mfrin, which is generated about a moment reference point by the f_i, R_i and $\Delta IN\_n$. According to the present embodiment, however, a provisional virtual surface external force action point (a point obtained by projecting the provisional external force action point on a surface to be contacted, which has been determined by a desired motion generator 25, onto a virtual surface corresponding to the surface to be contacted) is used as an external force action point on each virtual surface in the processing in S123.

Subsequently, the external force target generator 27 carries out the processing in S125. In this step S125, the external force target generator 27 calculates the set of f_i, R_i and $\Delta IN\_n$, i.e., $(f\_i\ R\_i\ \Delta IN\_n)^T$, that satisfies the relationship denoted by expression 13 when Mfrin in expression 13 is set to coincide with a moment error errM determined in S21.

In this case, the external force target generator 27 calculates a pseudo inverse matrix Jfrin_inv of the Jacobian matrix Jfrin determined in S123 by carrying out the same processing as that in S105 in the third embodiment, and multiplies the moment error errM by the pseudo inverse matrix Jfrin_inv so as to calculate the set of f_i, R_i and $\Delta IN\_n$, i.e., $(f\_i\ R\_i\ \Delta IN\_n)^T$. Thus, the set of f_i, R_i and $\Delta IN\_n$ necessary for canceling errM is calculated.

It is not always necessary to calculate all of the f_i, R_i and $\Delta IN\_n$. For example, the f_i in a virtual surface having a relatively small frictional coefficient $\mu\_i$ may be set to zero or the R_i in a virtual surface having a relatively small twisting force coefficient $\mu r\_i$ may be set to zero.

If the processing up to S125 described above causes the determination result in S121 to become negative, then the set of the virtual surface frictional force component correction amount f_i, the virtual surface twisting force R_i, and the internal force correction amount $\Delta IN\_n$ is calculated as the moment compensation amount for achieving a compensation total moment external force Mall_ad while satisfying the first A requirement and the first B requirement.

Subsequently, the external force target generator 27 carries out, in S127, the same determination processing as that in S107 in the third embodiment. More specifically, the external force target generator 27 determines whether the internal force corrected on the basis of $\Delta IN\_n$ (=min (|N_na|, |N_nb|)) satisfies the aforesaid third requirement.

If the determination result in S127 is affirmative, then the external force target generator 27 carries out the processing in S131. In this step S131, the external force target generator 27 carries out the same determination processing as that in S65 in the second embodiment. More specifically, the external force target generator 27 determines whether the virtual surface frictional force component F_i that has been corrected on the basis of f_i (the frictional force component based on the total sum of F_i and f_i determined by the processing up to S15) satisfies the second requirement and also determines whether the magnitude of R_i satisfies the fourth requirement in each virtual surface.

If the determination result in S131 is affirmative, then the external force target generator 27 carries out the processing in S133 and terminates the processing at current time. The processing in this step S133, the external force target generator 27 carries out the same processing as that in S67 in the second embodiment to determine a desired external force from each surface to be contacted to the robot 1 and a desired external force action point at the current time.

More specifically, the external force target generator 27 determines the required virtual surface translational force in each virtual surface at the current time on the basis of the required virtual surface translational force (N_i, F_i) in each virtual surface determined by the processing up to S15 and the virtual surface frictional force component correction amount f_i and the internal force correction amount $\Delta IN\_n$ determined by the processing in S125. In this case, the normal force component obtained by changing the magnitude of the virtual surface normal force component N_i determined by the processing up to S15 by $\Delta IN\_n$ is determined as the virtual surface normal force component in the virtual surface, and the frictional force component obtained by adding the virtual surface frictional force component correction amount f_i to the virtual surface frictional force component F_i determined by the processing up to S15 is determined as the virtual surface frictional force component in the virtual surface.

Further, the external force target generator 27 determines the virtual surface twisting force R_i determined by the processing in S125 as the twisting force in the virtual surface corresponding to the R_i.

Then, the external force target generator 27 converts the required virtual surface translational force and the virtual surface twisting force R_i in each virtual surface determined as described above into a translational force and a twisting force, respectively, to be applied to the robot 1 from a surface to be contacted corresponding to the virtual surface in the same manner as that of the processing in S67, thereby determining the desired translational force and the desired twisting force, which are constituent elements of a desired external force.

Further, the external force target generator 27 determines the provisional external force action point generated by the desired motion generator 25 directly as a desired external force action point.

If the determination result in the aforesaid step S131 is negative, then the external force target generator 27 carries out the processing in S135. In this step S135, the external force target generator 27 carries out the same processing as that in S69 in the second embodiment to determine a virtual surface frictional force component restricted correction amount f_lim_i obtained by restricting the virtual surface frictional force component correction amount f_i such that the second requirement is satisfied and to also determine the virtual surface restricted twisting force R_lim_i obtained by restricting the virtual surface twisting force R_i such that the fourth requirement is satisfied.

Meanwhile, if the determination result in S127 is negative, then the external force target generator 27 carries out the processing in S129 and then carries out the processing in S135.

In this case, the external force target generator 27 determines in S129 an internal force restricted correction amount $\Delta IN\_lim\_n$ obtained by restricting the internal force correction amount $\Delta IN\_n$ such that the third requirement is satisfied. To be more specific, for the opposing virtual surfaces Sna and Snb, on which the determination result in S127 is negative, the $\Delta IN\_lim\_n$ is determined such that the magnitude of the virtual surface normal force component N_na or Nnb, whichever is smaller, after changing the magnitudes of the virtual surface normal force components N_na and N_nb, which have been determined by the processing up to S15, by the $\Delta IN\_lim\_n$ (the magnitude of the internal force that has been corrected on the basis of the $\Delta IN\_lim\_n$) coincides with the aforesaid internal force upper limit value IFC_n (or takes a value that is slightly smaller than IFC_n).

In the case where the virtual surface group set in S01 has two pairs or more opposing virtual surfaces Sna and Snb, for the opposing virtual surfaces Sna and Snb, on which the determination result in S127 is not negative, then the internal force correction amount $\Delta IN\_n$ calculated in S125 is determined directly as the internal force restricted correction amount $\Delta IN\_lim\_n$.

Further, in the processing carried out in S135 following the processing in S129, the values obtained by correcting the magnitudes of the virtual surface normal force components, which have been determined by the processing up to S15, by the $\Delta IN\_lim\_n$ determined in S129 are used for the magnitudes of the virtual surface normal force components N_na and N_nb for determining the frictional force upper limit values and the twisting force upper limit values of the opposing virtual surfaces Sna and Snb, respectively.

In the processing in S135 following the processing in S129, on all virtual surfaces set in S01, there is a case where the virtual surface frictional force component F_i that has been corrected on the basis of f_i calculated in S125 satisfies the second requirement and R_i calculated in S125 satisfies the fourth requirement. In this case, the f_i and R_i calculated in S125 will be determined directly as the virtual surface frictional force component restricted correction amount f_lim_i and the virtual surface restricted twisting force R_lim_i in each virtual surface.

Although not illustrated, according to the present embodiment, if the determination result in S127 is affirmative and the determination result in S131 is negative, then the internal force correction amount $\Delta IN\_n$ calculated in S125 will be determined directly as the internal force correction amount $\Delta IN\_lim\_n$ in the processing in S135 for the convenience of the processing thereafter.

After determining the $\Delta IN\_lim\_n$, f_lim_i and R_lim_i as described above, the external force target generator 27 carries out the processing in S137. In this step S137, the external force target generator 27 calculates a remaining error component errM' of the moment error errM. The remaining error component errM' denotes an error component that cannot be canceled by the set of $\Delta IN\_lim\_n$, f_lim_i and R_lim_i.

More specifically, the external force target generator 27 calculates a difference $\Delta f\_i$ between the virtual surface frictional force component correction amount f_i before being restricted and the virtual surface frictional force component restricted correction amount f_lim_i (=f_i−f_lim_i) and also calculates a difference ΔR_i between the virtual surface twisting force R_i before being restricted and the virtual surface restricted twisting force R_lim_i (=R_i−R_lim_i) in each virtual surface. Further, the external force target generator 27 calculates a difference ΔΔIN_n between the internal force correction amount ΔIN_n before being restricted and the internal force restricted correction amount ΔIN_lim_i (=ΔIN_n−ΔIN_lim_n).

Then, the external force target generator 27 replaces the components f_i, R_i and ΔIN_n of the vertical vector (f_i R_i ΔIN_n)$^T$ in the right side of the aforesaid expression 13 by Δf_i, ΔR_i and ΔΔIN_n corresponding thereto, and calculates the remaining error component errM' according to an expression obtained by replacing the left side of the aforesaid expression 13 by errM'.

Alternatively, by using an expression obtained by replacing the components f_i, R_i and ΔIN_n of the vertical vector (f_i R_i ΔIN_n)$^T$ in the right side of expression 13 by f_lim_i, R_lim_i and ΔIN_lim_n, respectively, the moment generated about a moment reference point due to the f_lim_i, R_lim_i and ΔIN_lim_n may be calculated, and the calculated moment may be subtracted from the moment error errM so as to calculate the remaining error component errM'.

Subsequently, the external force target generator 27 carries out the processing from S139 in FIG. 18. In this case, the processing from S139 to S143 is the same as the processing from S73 to S77 in the second embodiment.

If the determination result in S143 is affirmative, then the external force target generator 27 carries out the processing in S145 and terminates the processing at the current time. In this step S145, the external force target generator 27 carries out the same processing as that in S79 of the second embodiment to determine the desired external force applied from each surface to be contacted to the robot 1 and the desired external force action point at the current time.

To be more specific, the external force target generator 27 determines the required virtual surface translational force in each virtual surface at the current time on the basis of the required virtual surface translational forces (N_i, F_i) in each virtual surface determined by the processing up to S15 and the internal force restricted correction amount ΔIN_lim_n and the virtual surface frictional force component restricted correction amount f_lim_i determined by the processing up to S135. In this case, for the opposing virtual surfaces Sna and Snb, the normal force component obtained by changing the magnitudes of the virtual surface normal force components N_na and N_nb, which have been determined by the processing up to S15, by the ΔIN_lim_n is determined as the virtual surface normal force component in the opposing virtual surfaces Sna and Snb. For the remaining virtual surfaces, the virtual surface normal force component N_i determined by the processing up to S15 is directly determined as the virtual surface normal force component in the virtual surfaces. Further, for every virtual surface, the frictional force component obtained by adding the virtual surface frictional force component restricted correction amount f_lim_i to the virtual surface frictional force component F_i determined by the processing up to S15 is determined as the virtual surface frictional force component in the virtual surface.

Further, the external force target generator 27 determines the virtual surface restricted twisting force R_lim_i determined by the processing in S135 as the virtual surface twisting force in the virtual surface corresponding to the determined R_lim_i.

Then, the external force target generator 27 converts the required virtual surface translational force and the virtual surface twisting force in each virtual surface, which have been determined as described above, into the translation force and the twisting force, respectively, to be applied from the surface to be contacted, which corresponds to the virtual surface, to the robot 1, thereby determining the desired translational force and the desired twisting force, which are constituent elements of the desired external force, by the same processing as that in S79.

Further, the external force target generator 27 determines the point obtained by inversely projecting the external force action point on each virtual surface, which has been corrected on the basis of the on-virtual-surface external force action point correction amount Δrpc_i determined in S141, onto a surface to be contacted corresponding to the virtual surface as the desired external force action point on the surface to be contacted.

If the determination result in S143 is negative, then the external force target generator 27 carries out the processing in S147 and then carries out the processing from S13 of FIG. 7 again. In this case, the external force target generator 27 determines in S147 an increment IN_n of the magnitude of the virtual surface normal force components N_na and N_nb in the opposing virtual surfaces Sna and Snb (more specifically, the increment from the virtual surface normal force components N_na and N_nb determined by the processing up to S15). In this case, according to the present embodiment, the increment IN_n determined in S83 is set to a predetermined value.

When carrying out the aforesaid processing from S13 again, the processing from S61 may alternatively be carried out without carrying out the determination processing in S121 after the processing in S21 (or without depending on the determination result in S121).

This completes the detailed description of the processing carried out by the external force target generator 27 in the present embodiment.

In the processing by the external force target generator 27 described above, as with the first embodiment, first, the processing from S05 to S15 provisionally determines the required virtual surface translational forces (N_i, F_i) necessary for accomplishing the compensation total translational external force Fall_ad related to a translational motion of the entire robot 1. Therefore, provisional values of the required virtual surface translational forces (N_i, F_i) capable of accomplishing the compensation total translational external force Fall_ad can be efficiently determined by a simple algorithm.

Further, as with the first embodiment, if the determination results in both S07 and S09 are negative, or the determination results in S07, S09, and S15 are negative, affirmative, and negative, respectively, then the motional state of the robot 1 is assessed as inappropriate and the processing by the external force target generator 27 is interrupted. Thus, as with the first embodiment, with a simple algorithm, a motional state of the robot 1 that tends to lead to an excessive frictional force between a surface to be contacted and the robot 1 or a motional state of the robot 1 that tends to lead to an excessive internal force of the robot 1 can be efficiently assessed as inappropriate for implementing the compensation total translational external force Fall_ad. This makes it possible to prevent the occurrence of a situation where the motion of the robot 1 is continued in a state where it is difficult to stably implement the motion of the robot 1 (for example, the motion of the robot 1 can be suspended).

Further, according to the present embodiment, after determining the provisional values of the required virtual surface translational forces (N_i, F_i) that enable the compensation total translational external force Fall_ad to be accomplished as described above, the processing in S19, S21 and S61 to S75 (except for the processing in S67) or the processing in S19, S21 and S123 to S141 (except for the processing in S133) determines the pair of the virtual surface frictional force component correction amount f_i and the virtual surface twisting force R_i or the set of the f_i, the R lim i and the internal force correction amount ΔIN_n, or the set of the f_lim_i, the R_lim_i, the Δrpc_i and the internal force restricted correction amount ΔIN_lim_n, or the set of the f_lim_i, the R_lim_i, Δrpc_i, and the internal force restricted correction amount ΔIN_lim_n as the additional manipulated variable (the moment compensation amount) for implementing the compensation total moment external force Mall_ad related to a rotational motion of the entire robot 1.

Thus, as with the first embodiment, simply combining the provisional values of the required virtual surface translational forces (N_i, F_i) determined by the processing in S05 to S15 and the moment compensation amounts determined by the processing in S19, S21 and S61 to S75 (except for the processing in S67) or S19, S21 and S123 to S141 (except for the processing in S133) makes it possible to determine the set of the required on-virtual-surface translational force, the on-virtual-surface twisting force, and the on-virtual-surface external force action point (including the case where the on-virtual-surface twisting force is zero) that allow both the compensation total translational external force Fall_ad and the compensation total moment external force Mall_ad to be properly achieved. Then, the set of the required on-virtual-surface translational force, the on-virtual-surface twisting force, and the on-virtual-surface external force action point makes it possible to efficiently and properly determine desired external forces (a desired translational force and a desired twisting force) to be applied to the robot 1 from surfaces to be contacted and a desired external force action point.

Further, as with the first embodiment, except for a case where the determination result in any one of S09 and S15 in FIG. 7 and S81 is negative (in the case where the motional state of the robot 1 is inappropriate), a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement.

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, as with the first embodiment, the desired translational force applied from each surface to be contacted to the robot 1 can be determined such that the required total translational external force is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

Further, in the case where the virtual surfaces set in S01 include the opposing virtual surfaces Sna and Snb, except for a case where the motional state of the robot 1 is determined to be inappropriate, the magnitude of the internal force generated in the robot 1 between the opposing virtual surfaces Sna and Snb (the magnitude of N_na or N_nb, whichever is smaller) can be controlled to a minimum within a range in which the first A requirement, the first B requirement, the second requirement, and the third requirement are satisfied, as with the first embodiment. Thus, as with the first embodiment, the desired translational forces in the surfaces to be contacted including the two surfaces to be contacted corresponding to the opposing virtual surfaces Sna and Snb can be determined such that the share of the motive power (the driving torque in the present embodiment) that can be generated by the joint actuators 11 of the robot 1, which share is necessary for generating the internal force, will be reduced.

Here, a supplementary description will be given of the relationship of correspondence between the present embodiment described above and the present invention. In the present embodiment, the external force target generator 27 of the control unit 21 functions as the external force target generating device in the present invention.

In addition, in the processing carried out by the external force target generator 27, the processing in S01 implements the virtual surface group setting unit in the present invention.

Further, as with the first embodiment, the processing in S02 implements the basic required total external force determining unit in the present invention (or the basic required total external force determining unit in the thirteenth aspect of the invention), and the processing in S03 implements the translational external force compensation amount determining unit and the moment external force compensation amount determining unit in the present invention.

Further, the compensation total translational external force Fall_ad and the compensation total moment external force Mall_ad calculated in the processing of S04 correspond to the compensation total translational external force and the compensation total moment external force in the present invention.

In addition, as with the first embodiment, the processing in S05 to S15 except for the processing in S13 and S15 that follow S45 of FIG. 9 implements the provisional required virtual surface translational force determining unit in the present invention.

The processing in S19 implements the provisional required virtual surface translational force dependent moment calculating unit in the present invention.

The processing in S21 and S61 to S75 (except for the processing in S67) or the processing in S21 and S123 to S141 (except for the processing in S133) implements the moment compensation amount determining unit in the present invention.

Further, the processing in S67, S79, S133 and S145 implements the surface-to-be-contacted desired external force and desired action point determining unit in the present invention.

Further, the processing in S05 to S15, S19, S21, S61 to S83, and S123 to S147 implements the required virtual surface translational force determining unit in the present invention (the thirteenth aspect of the invention).

In addition, in the processing carried out in S67, S79, S133, and S145, the processing for determining the desired translational force implements the desired surface-to-be-contacted translational force determining unit in the present invention (the thirteenth aspect of the invention).

The above embodiments have been described, assuming the case where there are the surfaces to be contacted WL1 and WL2 opposing each other with an interval provided therebetween in an outside world (operating environment) of the robot 1, as with the aforesaid wall climbing gait. The present invention, however, can be applied also for causing a robot to implement a motion in an operating environment where there are no surfaces to be contacted opposing each other with an interval provided therebetween. For example, the present invention can be applied also for causing the robot to effect a motion while maintaining a plurality of portions of the robot to be in contact with three surfaces to be contacted or two surfaces to be contacted that intersect with each other.

Examples of desired motions other than the aforesaid wall climbing gait are illustrated in FIG. 19 and FIG. 20.

FIGS. 19(a) to 19(e) illustrate, in a time-series order, the instantaneous motional states of the robot 1 in an example of a desired motion for causing a robot 1 to implement a motion in an operating environment in which there are, for example, a floor surface FL and a wall surface WL1 as two surfaces to be contacted that intersect with each other.

Figure 19A:
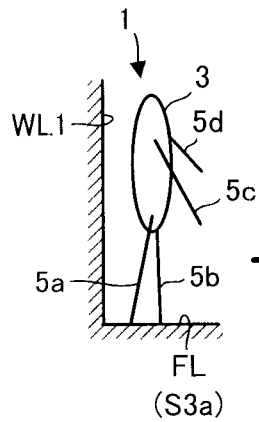
FIGS. 19(a) to 19(e) are diagrams illustrating in a time-series manner the instantaneous motional states of the robot in another example of a desired motion of the robot shown in FIG. 1.
Figure 19B:
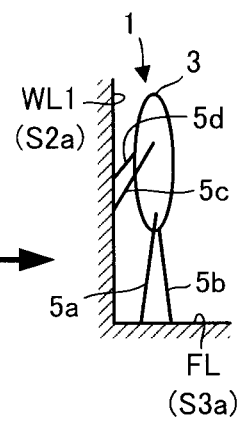
Figure 19C:
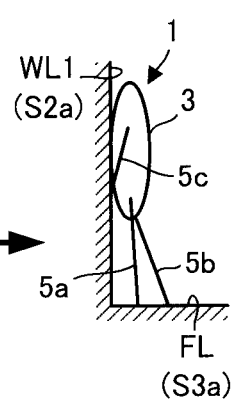
Figure 19D:
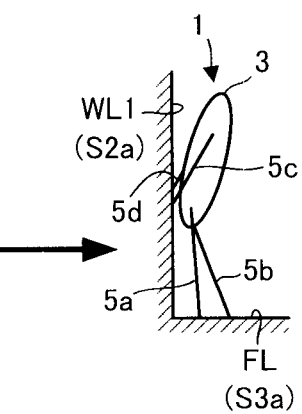
Figure 19E:
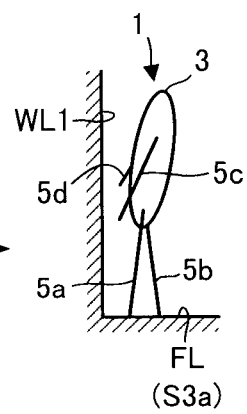

The desired motion is the following type of motion. From the state where the robot 1 is standing with two link mechanisms 5a and 5b in contact with the floor surface FL, as illustrated in FIG. 19(a), the robot 1 brings link mechanisms 5c and 5d into contact with a wall surface WL1, as illustrated in FIG. 19(b). Then, in this state, the robot 1 moves the body 3 thereof toward the wall surface WL1 into contact with the wall surface WL1, leaning the body 3 against the wall surface WL1, as illustrated in FIG. 19(c). Thereafter, the robot 1 pushes the wall surface WL1 by the link mechanisms 5c and 5d to move the body 3 off of the wall surface WL1, as illustrated in FIG. 19(d), and finally moves the link mechanisms 5c and 5d off the wall surface WL1, as illustrated in FIG. 19(e).

Further, FIGS. 20(a) to 20(d) illustrate, in a time-series order, the instantaneous motional states of the robot 1 in an example of a desired motion for causing the robot 1 to implement a motion in an operating environment in which there are, for example, a floor surface FL and two wall surfaces WL1 and WL3 as three surfaces to be contacted that intersect with each other (e.g., a corner of an indoor room). FIGS. 20(a) to 20(d) are the plan views of the robot 1 and the operating environment observed from above. In each of FIGS. 20(a) to 20(d), the robot 1 is standing with link mechanisms 5a and 5d (not shown) in contact with a floor surface FL.

Figure 20A:
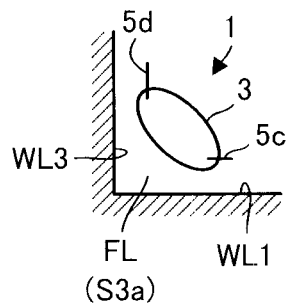
FIGS. 20(a) to 20(d) are diagrams illustrating in a time-series manner the instantaneous motional states of the robot in yet another example of a desired motion of the robot shown in FIG. 1.
Figure 20B:
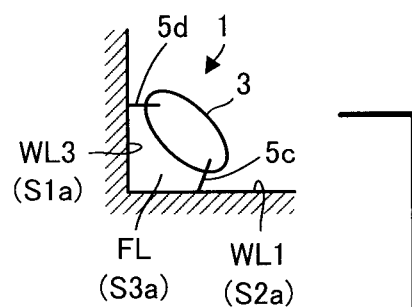
Figure 20C:
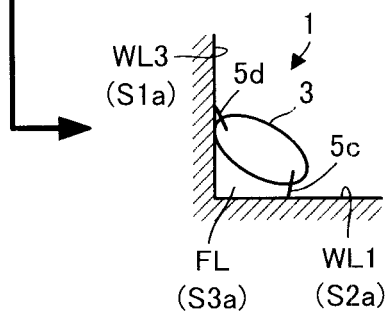

This motion is the following type of motion. From the state where the robot 1 is standing in contact with the floor surface FL, as illustrated in FIG. 20(a), the robot 1 brings the link mechanisms 5c and 5d into contact with wall surfaces WL1 and WL3, respectively, as illustrated in FIG. 20(b). Then, in this state, the robot 1 moves the body 3 thereof toward the wall surface WL3 into contact with the wall surface WL3, leaning the body 3 against the wall surface WL3, as illustrated in FIG. 20(c). Thereafter, the robot 1 pushes the wall surfaces WL1 and WL2 by the link mechanisms 5c and 5d, respectively, to move the body 3 and the link mechanism 5c off of the wall surface WL1 and to move the link mechanism 5d off the wall surface WL3, as illustrated in FIG. 20(d).

Also in a case of causing the robot 1 to implement a motion according to the desired motions illustrated in FIG. 19 or FIG. 20, the desired external force to be applied to the robot 1 from the surfaces to be contacted FL and WL1 and the desired external force action point can be properly determined by the processing by the external force target generator 27 in the embodiments described above.

In this case, in the processing by the external force target generator 27 related to a desired motion illustrated in FIG. 19, one virtual surface (a virtual surface S3a in the illustrated example) is set by the processing in the aforesaid S01 in the motional states shown in FIGS. 19(a) and 19(e), and two virtual surfaces (virtual surfaces S2a and S3a in the illustrated example) are set by the processing in the aforesaid S01 in the motional states shown in FIGS. 19(b) to 19(d).

Figure 20D:
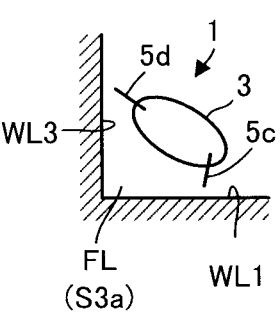

Further, in the processing by the external force target generator 27 related to a desired motion illustrated in FIG. 20, one virtual surface (a virtual surface S3a in the illustrated example) is set by the processing in the aforesaid S01 in the motional states shown in FIGS. 20(a) and 20(d), and three virtual surfaces (virtual surfaces S1a, S2a and S3a in the illustrated examples) are set by the processing in the aforesaid S01 in the motional states shown in FIGS. 20(b) and 20(c).

As with the case illustrated in FIG. 19 or FIG. 20, if no surfaces to be contacted corresponding to the opposing virtual surfaces Sna and Snb exist in the operating environment of the robot 1, then the determination results of the determination processing in S09 of FIG. 7, S43 of FIG. 9, S81 of FIG. 15, S101 of FIG. 16, and S121 of FIG. 17 will be always negative. Hence, no exclusive processing is required in the case where the above determination results are affirmative.

What is claimed is:

1. An external force target generating device of a legged mobile robot, which sequentially generates a target related to an external force to be applied to the robot in a state where a motion of the robot is being controlled so that an actual motion of the robot follows a desired motion of the robot, to cause the robot to implement a motion while having a plurality of portions of the robot in contact with a plurality of different surfaces to be contacted, which exists in an operating environment of the robot, the external force target generating device comprising at least one processor, the at least one processor comprising:

a virtual surface group setting unit which uses a virtual surface group that is constituted of a plurality of virtual surfaces having a predetermined posture relationship to each other to virtually set the virtual surface group in the space of an operating environment of the robot such that the plurality of virtual surfaces of the virtual surface group turn into surfaces that match or approximate the plurality of surfaces to be contacted;

a basic required total external force determining unit which determines, on the basis of the desired motion, a basic required total translational external force, which is a translational force component of a total external force to be applied to the robot to implement the desired motion and a basic required total moment external force, which is a moment component of the total external force about a predetermined reference point fixed relative to the virtual surface group;

a translational external force compensation amount determining unit which sequentially calculates a first motional state amount error that is a difference between an observed value of a predetermined first motional state amount of the robot and a desired value of the first motional state amount in the desired motion, and based on the first motional state amount error, determines a translational external force compensation amount that is a translational force to be additionally applied to the robot in order to approximate the first motional state amount error to zero;

a moment external force compensation amount determining unit which sequentially calculates a second motional state amount error that is a difference between an observed value of a predetermined second motional state amount of the robot and a desired value of the second motional state amount in the desired motion, and based on the second motional state amount error, determines a moment external force compensation amount that is a moment generated about the reference point to be additionally applied to the robot in order to approximate the second motional state amount error to zero;

a provisional required virtual surface translational force determining unit, which is a unit that determines a provisional value of a required virtual surface translational force, which is the translational force to be applied to the robot from each of the plurality of virtual surfaces of the virtual surface group to attain a compensation total translational external force obtained by adding the determined translational external force compensation amount to the determined basic required total translational external force, and determines the provisional value of the required virtual surface translational force in each virtual surface such that at least a first requirement that the resultant force of the required virtual surface translational forces in the plurality of virtual surfaces coincide with the determined compensation total translational external force, and, regarding a virtual surface normal force component of a required virtual surface translational force in each virtual surface, which is a component perpendicular to the virtual surface, and a virtual surface frictional force component, which is a component parallel to the virtual surface, a second requirement that the magnitude of the virtual surface frictional force component be not more than a first predetermined value set on the basis of at least the virtual surface normal force component, are satisfied;

a provisional required virtual surface translational force dependent moment calculating unit which calculates a provisional value of a required virtual surface translational force dependent moment, which is a total moment generated about the predetermined reference point by a required virtual surface translational force on each of the plurality of virtual surfaces, assuming that the provisional value of the determined required virtual surface translational force in each virtual surface acts on a provisional on-virtual-surface external force action point, which is a point obtained by projecting a provisional external force action point that is an external force action point provisionally set on the surface to be contacted corresponding to the virtual surface, onto the virtual surface;

a moment compensation amount determining unit which calculates a moment error, which is a difference between a compensation total moment external force obtained by adding the determined moment external force compensation amount to the determined basic required total moment external force and the calculated provisional value of the required virtual surface translational force dependent moment, and determines, by using the moment error, a moment compensation amount which is formed of a correction amount of one or more of the provisional on-virtual-surface external force action points and includes at least one of a first compensation amount which satisfies an external force action point existence region condition that each provisional on-virtual-surface external force action point after having been corrected using the correction amount exists in an on-virtual-surface external force action point permissible region obtained by projecting an external force action point existence permissible region set on the surface to be contacted corresponding to a virtual surface, on which the provisional on-virtual-surface external force action point exists, onto the virtual surface, a second compensation amount which is composed of the correction amounts of virtual surface frictional force components in two or more virtual surfaces and the total sum of the correction amounts is zero, and a third compensation amount composed of a twisting force additionally applied to the robot from the virtual surface about an axis in a direction perpendicular to one or more virtual surfaces, as a compensation amount for canceling the moment error; and a desired surface-to-be-contacted external force and action point determining unit which determines a desired external force to be applied to the robot from a surface to be contacted corresponding to each virtual surface and a desired external force action point, which indicates the desired position of the action point of the desired external force, on the basis of at least the provisional value of the required virtual surface translational force determined in association with each virtual surface and the determined moment compensation amount, and outputs the determined desired external force and the determined desired external force action point as constituent elements of the target related to the external force.

2. The external force target generating device of a legged mobile robot according to claim 1, wherein the provisional required virtual surface translational force determining unit determines the provisional value of the required virtual surface translational force in each virtual surface such that a first A requirement that the resultant force of the virtual surface normal force components of the plurality of virtual surfaces coincide with a component of the compensation total translational external force excluding a component parallel to all virtual surfaces of the virtual surface group and a first B requirement that the resultant force of the virtual surface frictional force components in the plurality of virtual surfaces coincide with a component of the compensation total translational external force, which component is parallel to all virtual surfaces of the virtual surface group are satisfied in order to satisfy the first requirement.

3. The external force target generating device of a legged mobile robot according to claim 2, wherein in the case where the component of the compensation total translational external force, which component is parallel to all the virtual surfaces of the virtual surface group, is not zero, the provisional required virtual surface translational force determining unit determines the provisional value of the required virtual surface translational force in each virtual surface such that, in a virtual surface where the virtual surface normal force component is not zero among the plurality of virtual surfaces of the virtual surface group, the magnitude of the virtual surface frictional force component of the virtual surface increases as the first predetermined value set in association with the virtual surface increases, while satisfying the first A requirement, the first B requirement, and the second requirement.

4. The external force target generating device of a legged mobile robot according to claim 1, wherein the plurality of surfaces to be contacted includes two surfaces to be contacted which oppose each other with an interval provided therebetween, the virtual surface group includes opposing virtual surfaces, which are two virtual surfaces opposing each other in parallel as the virtual surfaces corresponding to the two surfaces to be contacted, and in the case where the compensation total translational external force has an opposing virtual surface orthogonal component, which is a component in a direction orthogonal to the two opposing virtual surfaces, the provisional required virtual surface translational force determining unit determines the provisional value of the required virtual surface translational force in each virtual surface such that a third requirement that the magnitude of the virtual surface normal force component which is the smaller one of the virtual surface normal force components in the two opposing virtual surfaces be not more than a preset second specified value is satisfied in addition to satisfying the first requirement and the second requirement.

5. The external force target generating device of a legged mobile robot according to claim 1, wherein the moment compensation amount determining unit comprises a first processor that determines, on the basis of the moment error, the first compensation amount, which makes it possible to reduce the moment error, within a range in which the external force action point existence region condition can be satisfied, a second processor that calculates a remaining error component, which is an error component obtained by removing an error component canceled by the determined first compensation amount from the moment error in the case where the entire moment error cannot be canceled by the determined first compensation amount, and a third processor that determines one or both of the second compensation amount and the third compensation amount on the basis of the remaining error component such that the remaining error component is canceled.

6. The external force target generating device of a legged mobile robot according to claim 5, wherein the plurality of surfaces to be contacted includes two surfaces to be contacted which oppose each other with an interval provided therebetween, the virtual surface group includes opposing virtual surfaces, which are two virtual surfaces opposing each other in parallel as the virtual surfaces corresponding to the two surfaces to be contacted, and the moment compensation amount determined by the third processing unit includes the second compensation amount, the external force target generating device comprising:

a first determining unit which determines, after the second compensation amount is determined by the third processing unit, whether or not the provisional value of a virtual surface frictional force component corrected on the basis of the second compensation amount satisfies the second requirement in each virtual surface in which the virtual surface frictional force component is corrected on the basis of the determined second compensation amount among the plurality of virtual surfaces of the virtual surface group; and a provisional required virtual surface translational force re-determining unit which re-determines, in the case where there is the virtual surface in which the determination result of the first determining unit is negative and the virtual surface with the negative determination result is one of the two opposing virtual surfaces, the provisional value of the required virtual surface translational force in each virtual surface such that at least the first requirement is satisfied and the magnitudes of the virtual surface normal force components in the two opposing virtual surfaces including the virtual surface in which the determination result given by the first determining unit is negative are larger than that of the virtual surface normal force component in the provisional value of the determined required virtual surface translational force, and in the case where the provisional value of the required virtual surface translational force is re-determined by the provisional required virtual surface translational force re-determining unit, the provisional required virtual surface translational force dependent moment calculating unit uses the provisional value of the re-determined required virtual surface translational force and the provisional external force action point on a virtual surface that has been corrected by the first compensation amount determined by the first processor so as to re-calculate the provisional value of the required virtual surface translational force dependent moment, and the moment compensation amount determining unit re-executes processing for determining the moment compensation amount by using the moment error which has been re-calculated on the basis of the compensation total moment external force and the re-calculated provisional value of the required virtual surface translational force dependent moment.

7. The external force target generating device of a legged mobile robot according to claim 5, wherein the plurality of surfaces to be contacted includes two surfaces to be contacted which oppose each other with an interval provided therebetween, the virtual surface group includes opposing virtual surfaces, which are two virtual surfaces opposing each other in parallel as the virtual surfaces corresponding to the two surfaces to be contacted, and the moment compensation amount determined by the third processing unit includes the third compensation amount, the external force target generating device comprising:

a second determining unit which determines whether or not a fourth requirement that the magnitude of a twisting force added to a virtual surface on the basis of the determined third compensation amount in the virtual surface, to which the twisting force is added on the basis of the determined third compensation amount, among a plurality of virtual surfaces of the virtual surface group after the third compensation amount is determined by the third processing unit be not more than a third predetermined value set on the basis of at least the virtual surface normal force component of the provisional value of the determined required virtual surface translational force in the virtual surface is satisfied; and a provisional required virtual surface translational force re-determining unit which re-determines the provisional value of the required virtual surface translational force in each virtual surface such that at least the first requirement is satisfied and the magnitudes of the virtual surface normal force components in the two opposing virtual surfaces including the virtual surface in which the determination result given by the second determining unit is negative are larger than that of the virtual surface normal force component in the provisional value of the determined required virtual surface translational force in a case where there is the virtual surface in which the determination result of the second determining unit is negative and the virtual surface with the negative determination result is one of the two opposing virtual surfaces, and in the case where the provisional value of the required virtual surface translational force is re-determined by the provisional required virtual surface translational force re-determining unit, the provisional required virtual surface translational force dependent moment calculating unit uses the provisional value of the re-determined required virtual surface translational force and the provisional external force action point on a virtual surface that has been corrected by the first compensation amount determined by the first processor so as to re-calculate the provisional value of the required virtual surface translational force dependent moment, and the moment compensation amount determining unit re-executes processing for determining the moment compensation amount by using the moment error which has been re-calculated on the basis of the compensation total moment external force and the re-calculated provisional value of the required virtual surface translational force dependent moment.

8. An external force target generating device of a legged mobile robot which generates targets related to external forces to be applied to the robot in a state where a motion of the robot is controlled so that an actual motion of the robot follows a desired motion of the robot for causing the robot to implement a motion while keeping a plurality of portions of the robot in contact with a plurality of surfaces to be contacted, which is a plurality of mutually different surfaces to be contacted, which exists in an operating environment of the robot, and which includes two surfaces to be contacted opposing each other with an interval provided therebetween, the external force target generating device comprising at least one processor, the at least one processor comprising:

a gait basic element generating unit which generates a desired motion of the robot and a provisional external force action point, which is the provisional value of a desired position of the action point of an external force in each surface to be contacted, the external force acting from each of the plurality of surfaces to be contacted onto the robot;

a virtual surface group setting unit which uses a virtual surface group that is constituted of a plurality of virtual surfaces having a predetermined mutual posture relationship and which includes opposing virtual surfaces, which are two virtual surfaces opposing each other in parallel, to virtually set the virtual surface group in the space of an operating environment of the robot such that the plurality of virtual surfaces of the virtual surface group turns into surfaces that match or approximate the plurality of surfaces to be contacted and the two opposing virtual surfaces turn into virtual surfaces corresponding to the two surfaces to be contacted that oppose each other with an interval provided therebetween;

a basic required total external force determining unit which determines, on the basis of the desired motion, a basic required total translational external force, which is a translational force component of a total external force to be applied to the robot to implement the desired motion and a basic required total moment external force, which is a moment component of the total external force about a predetermined reference point fixed relative to the virtual surface group;

a translational external force compensation amount determining unit which sequentially calculates a first motional state amount error that is a difference between an observed value of a predetermined first motional state amount of the robot and a desired value of the first motional state amount in the desired motion, and based on the first motional state amount error, determines a translational external force compensation amount that is a translational force to be additionally applied to the robot in order to approximate the first motional state amount error to zero;

a moment external force compensation amount determining unit which sequentially calculates a second motional state amount error that is a difference between an observed value of a predetermined second motional state amount of the robot and a desired value of the second motional state amount in the desired motion, and based on the second motional state amount error, determines a moment external force compensation amount that is a moment generated about the reference point to be additionally applied to the robot in order to approximate the second motional state amount error to zero;

a provisional required virtual surface translational force determining unit, which is a unit that determines a provisional value of a required virtual surface translational force, which is the translational force to be applied to the robot from each of the plurality of virtual surfaces of the virtual surface group to attain a compensation total translational external force obtained by adding the determined translational external force compensation amount to the determined basic required total translational external force, and determines the provisional value of the required virtual surface translational force in each virtual surface such that at least a first requirement that the resultant force of the required virtual surface translational forces in the plurality of virtual surfaces coincide with the determined compensation total translational external force, and, regarding a virtual surface normal force component of a required virtual surface translational force in each virtual surface, which is a component perpendicular to the virtual surface, and a virtual surface frictional force component, which is a component parallel to the virtual surface, a second requirement that the magnitude of the virtual surface frictional force component be not more than a first predetermined value set on the basis of at least the virtual surface normal force component, are satisfied;

a provisional required virtual surface translational force dependent moment calculating unit which calculates a provisional value of a required virtual surface translational force dependent moment, which is a total moment generated about the predetermined reference point by a required virtual surface translational force on each of the plurality of virtual surfaces, assuming that the provisional value of the determined required virtual surface translational force in each virtual surface acts on a provisional on-virtual-surface external force action point, which is a point obtained by projecting a provisional external force action point that is an external force action point provisionally set on the surface to be contacted corresponding to the virtual surface, onto the virtual surface;

a moment compensation amount determining unit that calculates a moment error, which is a difference between a compensation total moment external force obtained by adding the determined moment external force compensation amount to the determined basic required total moment external force and the calculated provisional value of the required virtual surface translational force dependent moment, and determines, by using the moment error, a moment compensation amount which includes at least one of a first compensation amount which is constituted of the correction amount of one or more of the provisional on-virtual-surface external force action points, and which satisfies an external force action point existence region condition that each provisional on-virtual-surface external force action point after having been corrected using the correction amount exists in an on-virtual-surface external force action point permissible region obtained by projecting an external force action point existence permissible region set on the surface to be contacted corresponding to a virtual surface, on which the provisional on-virtual-surface external force action point exists, onto the virtual surface, a second compensation amount which is composed of the correction amounts of virtual surface frictional force components in two or more virtual surfaces and the total sum of the correction amounts is zero, a third compensation amount composed of a twisting force additionally applied to the robot from the virtual surface about an axis in a direction perpendicular to one or more virtual surfaces, and a fourth compensation amount, which is a correction amount for correcting the magnitudes of the virtual surface normal force components of the individual opposing virtual surfaces by the same amount while maintaining the total sum of the virtual surface normal force components in the two opposing virtual surfaces at a constant level, as a compensation amount for canceling the moment error; and a desired surface-to-be-contacted external force and action point determining unit which determines a desired external force to be applied to the robot from a surface to be contacted corresponding to each virtual surface and a desired external force action point, which indicates the desired position of the action point of the desired external force, on the basis of at least the provisional value of the required virtual surface translational force determined in association with each virtual surface and the determined moment compensation amount, then outputs the determined desired external force and the determined desired external force action point as constituent elements of the target related to the external force.

9. The external force target generating device of a legged mobile robot according to claim 8, wherein
the provisional required virtual surface translational force determining unit determines the provisional value of the required virtual surface translational force in each virtual surface such that a first A requirement that the resultant force of the virtual surface normal force components of the plurality of virtual surfaces coincide with a component in the compensation total translational external force excluding a component parallel to all virtual surfaces of the virtual surface group and a first B requirement that the resultant force of the virtual surface frictional force components in the plurality of virtual surfaces coincide with a component of the compensation total translational external force, which component is parallel to all virtual surfaces of the virtual surface group are satisfied in order to satisfy the first requirement.

10. The external force target generating device of a legged mobile robot according to claim 9, wherein
in the case where the component of the compensation total translational external force, which component is parallel to all the virtual surfaces of the virtual surface group, is not zero, the provisional required virtual surface translational force determining unit determines the provisional value of the required virtual surface translational force in each virtual surface such that, in a virtual surface where the virtual surface normal force component is not zero among the plurality of virtual surfaces of the virtual surface group, the magnitude of the virtual surface frictional force component of the virtual surface increases as the first predetermined value set in association with the virtual surface increases, while satisfying the first A requirement, the first B requirement, and the second requirement.

11. The external force target generating device of a legged mobile robot according to claim 8, wherein
in the case where the compensation total translational external force has an opposing virtual surface orthogonal component, which is a component in a direction orthogonal to the two opposing virtual surfaces, the provisional required virtual surface translational force determining unit determines the provisional value of the required virtual surface translational force in each virtual surface such that a third requirement that the magnitude of the virtual surface normal force component which is the smaller one of the virtual surface normal force components in the two opposing virtual surfaces be not more than a preset second specified value is satisfied in addition to satisfying the first requirement and the second requirement.

12. The external force target generating device of a legged mobile robot according to claim 8, wherein
the moment compensation amount determining unit includes a first processor that determines, on the basis of the moment error, the first compensation amount, which makes it possible to reduce the moment error, within a range in which the external force action point existence region condition can be satisfied, a second processor which calculates a remaining error component, which is an error component obtained by removing an error component canceled by the determined first compensation amount from the moment error in the case where the entire moment error cannot be canceled by the determined first compensation amount, and a third processor which determines at least one of the second compensation amount, the third compensation amount, and the fourth compensation amount on the basis of the remaining error component such that the remaining error component is canceled.

13. An external force target generating device of a legged mobile robot, which sequentially generates a target related to an external force to be applied to the robot in a state where a motion of the robot is being controlled so that an actual motion of the robot follows a desired motion of the robot, to cause the robot to implement a motion while having a plurality of portions of the robot in contact with a plurality of different surfaces to be contacted, which exists in an operating environment of the robot, the external force target generating device comprising at least one processor, the at least one processor comprising:
a virtual surface group setting unit which uses a virtual surface group that is constituted of a plurality of virtual surfaces having a predetermined posture relationship to each other to virtually set the virtual surface group in the space of an operating environment of the robot such that the plurality of virtual surfaces of the virtual surface group turn into surfaces that match or approximate the plurality of surfaces to be contacted;
a basic required total translational external force determining unit which determines, on the basis of the desired motion, a basic required total translational external force, which is a translational force component of a total external force to be applied to the robot so as to implement the desired motion;
a translational external force compensation amount determining unit which sequentially calculates a motional state amount error that is a difference between an observed value of a predetermined motional state amount of the robot and a desired value of the motional state amount in the desired motion, and based on the motional state amount error, determines a translational external force compensation amount that is a translational force to be additionally applied to the robot in order to approximate the motional state amount error to zero;

a required virtual surface translational force determining unit, which is a unit determining a required virtual surface translational force, which is a translational force to be applied to the robot from each of the plurality of virtual surfaces of the virtual surface group to achieve a compensation total translational external force obtained by adding the determined translational external force compensation amount to the determined basic required total translational external force and which determines the required virtual surface translational force in each virtual surface such that at least a first A requirement that the resultant force of the virtual surface normal force components, which are the components of the required virtual surface translational forces in the plurality of virtual surfaces, the components being perpendicular to the virtual surfaces, coincide with a component of the compensation total translational external force excluding a component parallel to all virtual surfaces of the virtual surface group, a first B requirement that the resultant force of the virtual surface frictional force components, which are the components of the required virtual surface translational forces in the plurality of virtual surfaces, the components being parallel to the virtual surfaces, coincide with a component of the compensation total translational external force, which component is parallel to all virtual surfaces of the virtual surface group, and a second requirement that the magnitude of a virtual surface frictional force component in each virtual surface be not more than a first predetermined value set on the basis of at least the virtual surface normal force component in the virtual surface, are satisfied; and a desired surface-to-be-contacted translational force determining unit which determines a desired translational force to be applied to the robot from a surface to be contacted corresponding to each virtual surface on the basis of at least the required virtual surface translational force determined in association with each of the virtual surfaces and outputs the determined desired translational force as a constituent element of the target related to the external force.

14. The external force target generating device of a legged mobile robot according to claim 13, wherein in the case where the component of the compensation total translational external force, which component is parallel to all the virtual surfaces of the virtual surface group, is not zero, the required virtual surface translational force determining unit determines the required virtual surface translational force in each virtual surface such that, in a virtual surface where the virtual surface normal force component is not zero among the plurality of virtual surfaces of the virtual surface group, the magnitude of the virtual surface frictional force component of the virtual surface increases as the first predetermined value set in association with the virtual surface increases, while satisfying the first A requirement, the first B requirement, and the second requirement.

15. The external force target generating device of a legged mobile robot according to claim 13, wherein the plurality of surfaces to be contacted includes two surfaces to be contacted which oppose each other with an interval provided therebetween, the virtual surface group includes opposing virtual surfaces, which are two virtual surfaces opposing each other in parallel as the virtual surfaces corresponding to the two surfaces to be contacted, and in the case where the compensation total translational external force has an opposing virtual surface orthogonal component, which is a component in a direction orthogonal to the two opposing virtual surfaces, the required virtual surface translational force determining unit determines the required virtual surface translational force in each virtual surface such that a third requirement that the magnitude of the virtual surface normal force component which is the smaller one of the virtual surface normal force components in the two opposing virtual surfaces be not more than a preset second specified value is satisfied in addition to satisfying the first A requirement, the first B requirement, and the second requirement.

* * * * *